United States Patent [19]
Kyuma et al.

[11] Patent Number: 5,883,666
[45] Date of Patent: *Mar. 16, 1999

[54] IMAGE PICKUP DEVICE HAVING SELECTABLE PHOTOGRAPHING MODES

[75] Inventors: Kenji Kyuma; Kyoji Tamura; Koji Takahashi, all of Yokohama; Yuji Tsuda, Musashino, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 323,585

[22] Filed: Oct. 17, 1994

Related U.S. Application Data

[63] Continuation of Ser. No. 184,908, Jan. 19, 1994, abandoned, which is a continuation of Ser. No. 932,711, Aug. 19, 1992, abandoned.

[30] Foreign Application Priority Data

| Aug. 21, 1991 | [JP] | Japan | 3-209477 |
| Aug. 21, 1991 | [JP] | Japan | 3-209479 |
| Aug. 22, 1991 | [JP] | Japan | 3-210878 |
| Aug. 30, 1991 | [JP] | Japan | 3-220145 |
| Aug. 30, 1991 | [JP] | Japan | 3-220150 |

[51] Int. Cl.$^6$ ............ H04N 5/235; H04N 5/225; H04N 5/238
[52] U.S. Cl. ............ 348/229; 348/220; 348/363
[58] Field of Search .......... 348/229, 362, 348/363, 296, 297, 220, 221; 354/446, 442; 396/242; H04N 5/335

[56] References Cited

U.S. PATENT DOCUMENTS

| 4,739,409 | 4/1988 | Baumeister | 358/213 |
| 4,739,411 | 4/1988 | Bolton | 358/227 |
| 4,849,783 | 7/1989 | Kiyohara et al. | 354/442 |
| 4,884,144 | 11/1989 | Jinnai | 354/446 |
| 4,959,727 | 9/1990 | Imaide et al. | 358/228 |
| 5,331,345 | 7/1994 | Akimoto et al. | 348/362 |

FOREIGN PATENT DOCUMENTS

| 0356123 | 2/1990 | European Pat. Off. | H04N 9/73 |
| 63-202187 | 8/1988 | Japan | H04N 5/235 |
| 2057072 | 2/1990 | Japan | H04N 5/293 |

*Primary Examiner*—Bipin Shalwala
*Attorney, Agent, or Firm*—Robin, Blecker & Daley

[57] ABSTRACT

A video camera having a plurality of photographing modes each having different control characteristics in accordance with the photographing condition, comprising:

mode selection means for selecting arbitrary photographing mode from said plurality of photographing modes; and control means for transferring said photographing mode via a neutral mode having control characteristics intermediate to control characteristics of each photographing mode when the photographing mode is switched by said mode selection means, whereby abrupt change in the characteristics of control parameters or set values is avoided, and any disorder or unnatural change in the image or unstable transient control state caused by the switching can be prevented, so that the optimal photographing can be performed without respect to photographing situation or photographing environment, when the photographing mode is switched.

66 Claims, 38 Drawing Sheets

F I G. 2
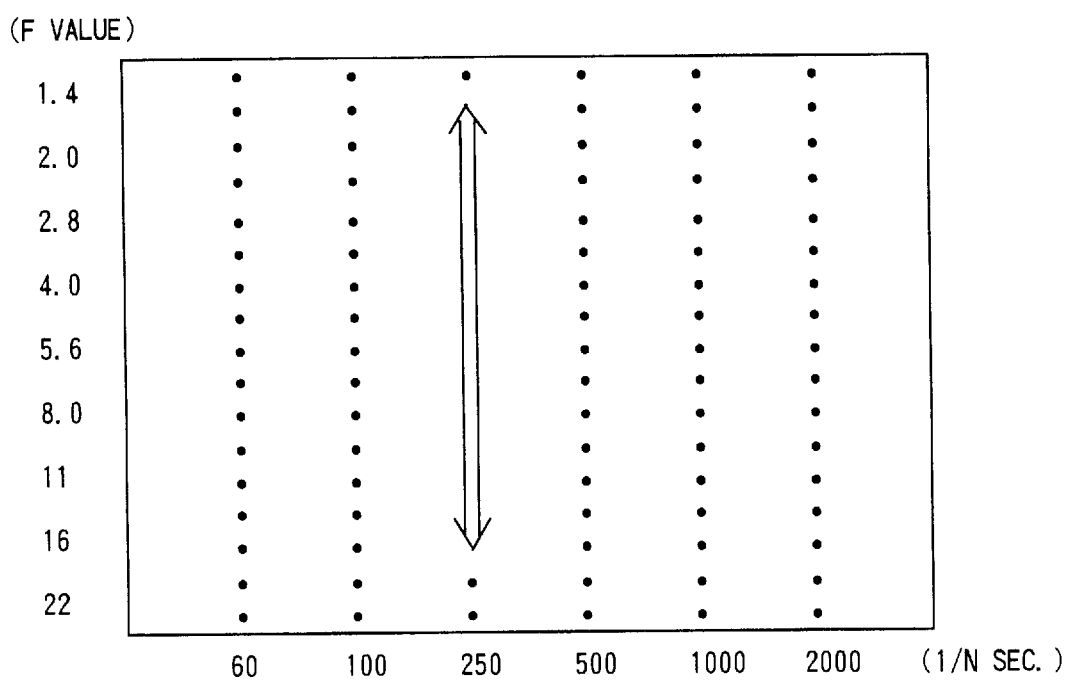

FIG. 6

| 01 | 02 | 03 | 04 | 05 | 06 |
|----|----|----|----|----|----|
| 07 | 08 | 09 | 10 | 11 | 12 |
| 13 | 14 | 15 | 16 | 17 | 18 |
| 19 | 20 | 21 | 22 | 23 | 24 |

FIG. 7

| 0.5 | 0.5 | 0.5 | 0.5 | 0.5 | 0.5 |
|-----|-----|-----|-----|-----|-----|
| 0.5 | 1.0 | 1.0 | 1.0 | 1.0 | 0.5 |
| 0.5 | 1.0 | 1.0 | 1.0 | 1.0 | 0.5 |
| 0.5 | 0.5 | 0.5 | 0.5 | 0.5 | 0.5 |

FIG. 8

| 0.0 | 0.0 | 0.0 | 0.0 | 0.0 | 0.0 |
|-----|-----|-----|-----|-----|-----|
| 0.5 | 0.5 | 0.5 | 0.5 | 0.5 | 0.5 |
| 1.0 | 1.0 | 1.0 | 1.0 | 1.0 | 1.0 |
| 1.0 | 1.0 | 1.0 | 1.0 | 1.0 | 1.0 |

| PARAMETER | AREA · A | AREA · B | AREA · C |
|---|---|---|---|
| P1 : IRIS | F16~OPEN VALUE | OPEN VALUE | OPEN VALUE |
| P2 : SHUTTER | 1/500SEC. | 1/500SEC. | 1/500~/60SEC. |
| P3 : GAIN | ±0dB | +0~18dB | +18dB |

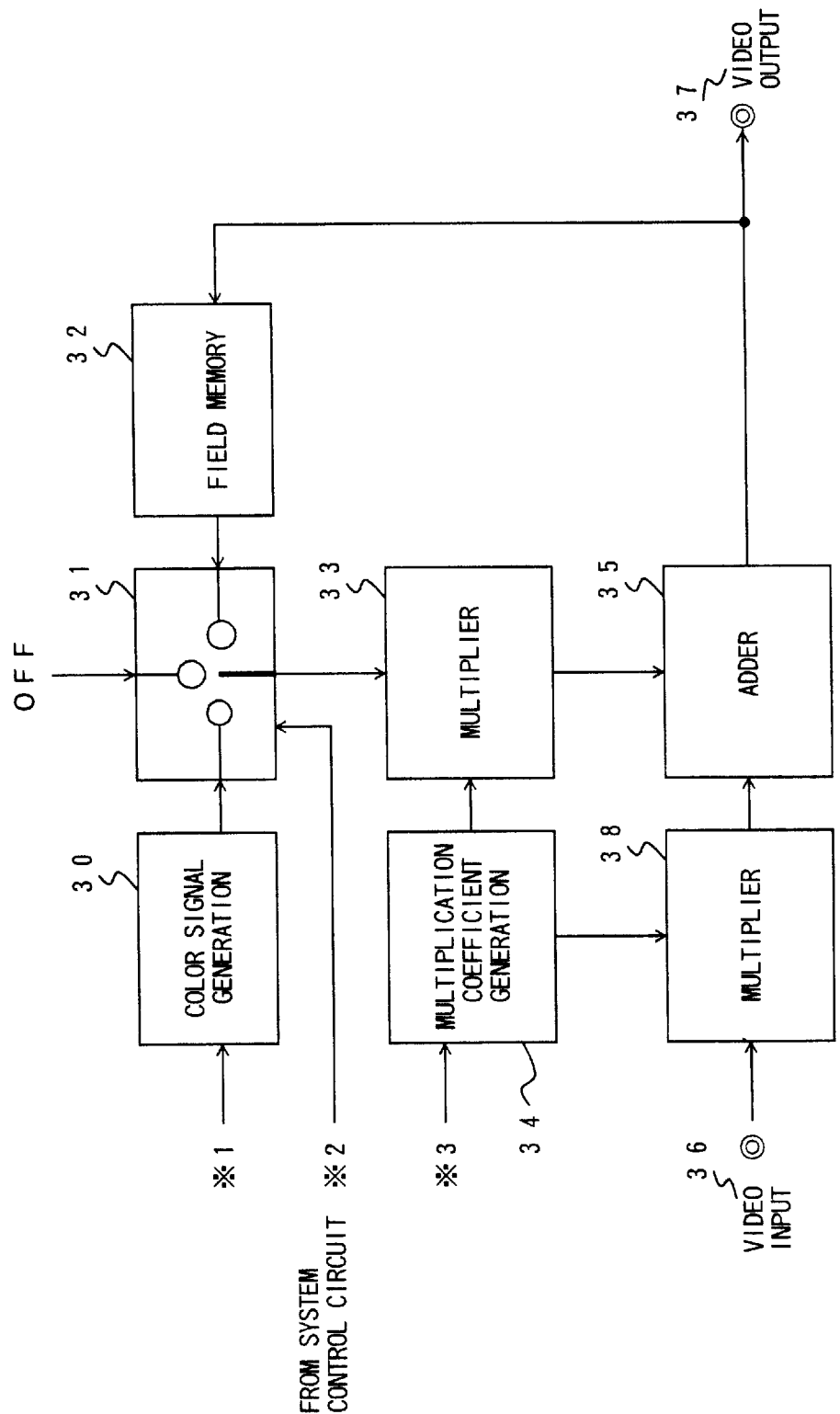

FIG. 14

EXAMPLE OF LUT DATA STRUCTURE (FULL AUTO : WITH FLICKER)

| No. | PARAMETER | ATTRIBUTION | DATA FORMAT | DATA | | | | |
|---|---|---|---|---|---|---|---|---|
| 01 | IRIS | f(Y) | THRESHOLD DEFINITION | Y≧y1 ⇔CAL<br>y1>Y≧y2 ⇔F1<br>y2>Y≧y3 ⇔CAL<br>y3>Y ⇔OPEN | | | | |
| 02 | SHUTTER | f(Y) | THRESHOLD DEFINITION | Y≧y1 ⇔T1<br>y1>Y≧y2 ⇔CAL<br>y2>Y≧y4 ⇔T2<br>y4>Y≧y5 ⇔CAL<br>y5>Y ⇔STANDARD VALUE | | | | |
| 03 | AGC GAIN | f(Y) | THRESHOLD DEFINITION | Y≧y3 ⇔±0dB<br>y3>Y≧y4 ⇔CAL<br>y4>Y≧y5 ⇔G1<br>y5>Y ⇔CAL | | | | |
| 04 | AE WAITING | FIXED | MAP DEFINITION | 0.5 | 0.5 | 0.5 | 0.5 | 0.5 |
|   |   |   |   | 0.5 | 1.0 | 1.0 | 1.0 | 0.5 |
|   |   |   |   | 0.5 | 1.0 | 1.0 | 1.0 | 0.5 |
|   |   |   |   | 0.5 | 1.0 | 1.0 | 1.0 | 0.5 |
|   |   |   |   | 0.5 | 0.5 | 0.5 | 0.5 | 0.5 |
| 05 | AE REFERENCE VALUE | FIXED | NUMERICAL DEFINITION | 50 [IRE] | | | | |
| 06 | IMAGE QUALITY ADJUSTMENT | FIXED | CODE DEFINITION | NORMAL | | | | |
| 07 | IMAGE EFFECT PROCESSING | FIXED | CODE DEFINITION | NORMAL | | | | |

FIG. 16

EXAMPLE OF LUT DATA STRUCTURE (FULL AUTO : WITHOUT FLICKER)

| No. | PARAMETER | ATTRIBUTION | DATA FORMAT | DATA | | | | | |
|---|---|---|---|---|---|---|---|---|---|
| 01 | IRIS | f(Y) | THRESHOLD DEFINITION | Y≧y6<br>y6>Y≧y7<br>y7>Y≧y8<br>y8>Y | ⇨CAL<br>⇨F1<br>⇨CAL<br>⇨OPEN | | | | |
| 02 | SHUTTER | f(Y) | THRESHOLD DEFINITION | Y≧y6<br>y6>Y≧y7<br>y7>Y | ⇨T1<br>⇨CAL<br>⇨STANDARD VALUE | | | | |
| 03 | AGC GAIN | f(Y) | THRESHOLD DEFINITION | Y≧y8<br>y8>Y | ⇨±0dB<br>⇨CAL | | | | |
| 04 | AE WAITING | FIXED | MAP DEFINITION | 0.5 | 0.5 | 0.5 | 0.5 | 0.5 | 0.5 |
|  |  |  |  | 0.5 | 1.0 | 1.0 | 1.0 | 1.0 | 0.5 |
|  |  |  |  | 0.5 | 1.0 | 1.0 | 1.0 | 1.0 | 0.5 |
|  |  |  |  | 0.5 | 0.5 | 0.5 | 0.5 | 0.5 | 0.5 |
| 05 | AE REFERENCE VALUE | FIXED | NUMERICAL DEFINITION | 50 [IRE] | | | | | |
| 06 | IMAGE QUALITY ADJUSTMENT | FIXED | CODE DEFINITION | NORMAL | | | | | |
| 07 | IMAGE EFFECT PROCESSING | FIXED | CODE DEFINITION | NORMAL | | | | | |

FIG. 18

EXAMPLE OF LUT DATA STRUCTURE (PORTRAIT)

| No. | PARAMETER | ATTRIBUTION | DATA FORMAT | DATA | | | | |
|---|---|---|---|---|---|---|---|---|
| 01 | IRIS | f(Y) | THRESHOLD DEFINITION | $y1 > Y$ $Y \geq y1$ ⇔CAL ⇔OPEN | | | | |
| 02 | SHUTTER | f(Y) | THRESHOLD DEFINITION | $y1 > Y \geq y2$ $Y \geq y1$ $y2 > Y$ ⇔T1 ⇔CAL ⇔STANDARD VALUE | | | | |
| 03 | AGC GAIN | f(Y) | THRESHOLD DEFINITION | $Y \geq y2$ $y2 > Y$ ⇔±0 dB ⇔CAL | | | | |
| 04 | AE WAITING | FIXED | MAP DEFINITION | 0.5 | 0.5 | 0.5 | 0.5 | 0.5 |
|  |  |  |  | 0.5 | 1.0 | 1.0 | 1.0 | 0.5 |
|  |  |  |  | 0.5 | 1.0 | 1.0 | 1.0 | 0.5 |
|  |  |  |  | 0.5 | 0.5 | 0.5 | 0.5 | 0.5 |
| 05 | AE REFERENCE VALUE | FIXED | NUMERICAL DEFINITION | 50 [IRE] | | | | |
| 06 | IMAGE QUALITY ADJUSTMENT | FIXED | CODE DEFINITION | SOFT | | | | |
| 07 | IMAGE EFFECT PROCESSING | FIXED | CODE DEFINITION | WHITE-FADE | | | | |

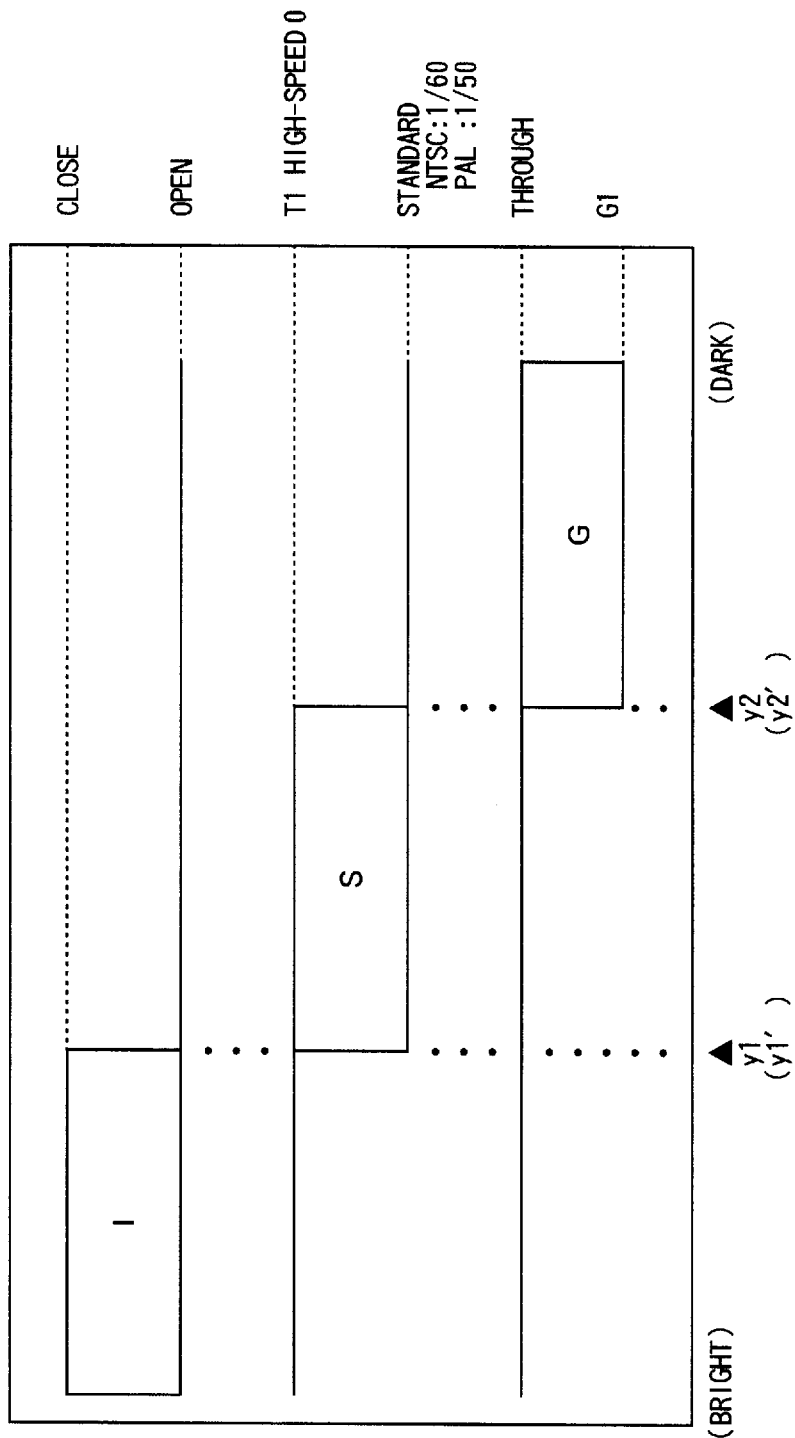

FIG. 20

EXAMPLE OF LUT DATA STRUCTURE (SPORT)

| No. | PARAMETER | ATTRIBUTION | DATA FORMAT | DATA | | | |
|---|---|---|---|---|---|---|---|
| 01 | IRIS | f(Y) | THRESHOLD DEFINITION | $y1 > Y$ $Y \geq y1$ | ⇒CAL ⇒OPEN | | |
| 02 | SHUTTER | f(Y) | THRESHOLD DEFINITION | $Y \geq y2$ $y2 > Y \geq y3$ $y3 > Y \geq y4$ $y4 > Y \geq y5$ $y5 > Y$ | ⇒T1 ⇒CAL ⇒T2 ⇒CAL ⇒STANDARD VALUE | | |
| 03 | AGC GAIN | f(Y) | THRESHOLD DEFINITION | $Y \geq y1$ $y1 > Y \geq y2$ $y2 > Y \geq y3$ $y3 > Y \geq y4$ $y4 > Y \geq y5$ $y5 > Y$ | ⇒±0 dB ⇒CAL ⇒G1 ⇒CAL ⇒G2 ⇒CAL | | |
| 04 | AE WAITING | FIXED | MAP DEFINITION | 0.5 | 0.5 | 0.5 | 0.5 |
| | | | | 0.5 | 1.0 | 1.0 | 0.5 |
| | | | | 0.5 | 1.0 | 1.0 | 0.5 |
| | | | | 0.5 | 0.5 | 0.5 | 0.5 |
| 05 | AE REFERENCE VALUE | FIXED | NUMERICAL DEFINITION | 50 [IRE] | | | |
| 06 | IMAGE QUALITY ADJUSTMENT | FIXED | CODE DEFINITION | NORMAL | | | |
| 07 | IMAGE EFFECT PROCESSING | FIXED | CODE DEFINITION | NORMAL | | | |

FIG. 22

EXAMPLE OF LUT DATA STRUCTURE (LANDSCAPE)

| No. | PARAMETER | ATTRIBUTION | DATA FORMAT | DATA | | | | |
|---|---|---|---|---|---|---|---|---|
| 01 | IRIS | f(Y) | THRESHOLD DEFINITION | $Y \geq y1$ ⇔ CAL <br> $y1 > Y$ ⇔ OPEN | | | | |
| 02 | SHUTTER | FIXED | NUMERICAL DEFINITION | ⇔ STANDARD VALUE | | | | |
| 03 | AGC GAIN | f(Y) | THRESHOLD DEFINITION | $Y \geq y2$ ⇔ ±0 dB <br> $y2 > Y$ ⇔ CAL | | | | |
| 04 | AE WAITING | FIXED | MAP DEFINITION | 0.0 | 0.0 | 0.0 | 0.0 | 0.0 |
|    |            |       |                | 0.5 | 0.5 | 0.5 | 0.5 | 0.5 |
|    |            |       |                | 1.0 | 1.0 | 1.0 | 1.0 | 1.0 |
|    |            |       |                | 1.0 | 1.0 | 1.0 | 1.0 | 1.0 |
| 05 | AE REFERENCE VALUE | FIXED | NUMERICAL DEFINITION | 50 [IRE] | | | | |
| 06 | IMAGE QUALITY ADJUSTMENT | FIXED | CODE DEFINITION | SOFT | | | | |
| 07 | IMAGE EFFECT PROCESSING | FIXED | CODE DEFINITION | WHITE-FADE | | | | |

FIG. 23

EXAMPLE OF LUT DATA STRUCTURE (SPOTLIGHT)

| No. | PARAMETER | ATTRIBUTION | DATA FORMAT | DATA |
|---|---|---|---|---|
| 01 | IRIS | f(Y) | THRESHOLD DEFINITION | $Y \geq y1 \Leftrightarrow CAL$<br>$y1 > Y \Leftrightarrow OPEN$ |
| 02 | SHUTTER | f(Y) | THRESHOLD DEFINITION | $\Leftrightarrow$ STANDARD VALUE |
| 03 | AGC GAIN | f(Y) | THRESHOLD DEFINITION | $Y \geq y2 \Leftrightarrow \pm 0 dB$<br>$y2 > Y \Leftrightarrow CAL$ |
| 04 | AE WAITING | f(Y) | HIST DEFINITION | HIGH-LIGHT<br>2/24 BLOCKS |
| 05 | AE REFERENCE VALUE | FIXED | NUMERICAL DEFINITION | 50 [IRE] |
| 06 | IMAGE QUALITY ADJUSTMENT | FIXED | CODE DEFINITION | NORMAL |
| 07 | IMAGE EFFECT PROCESSING | FIXED | CODE DEFINITION | NORMAL |

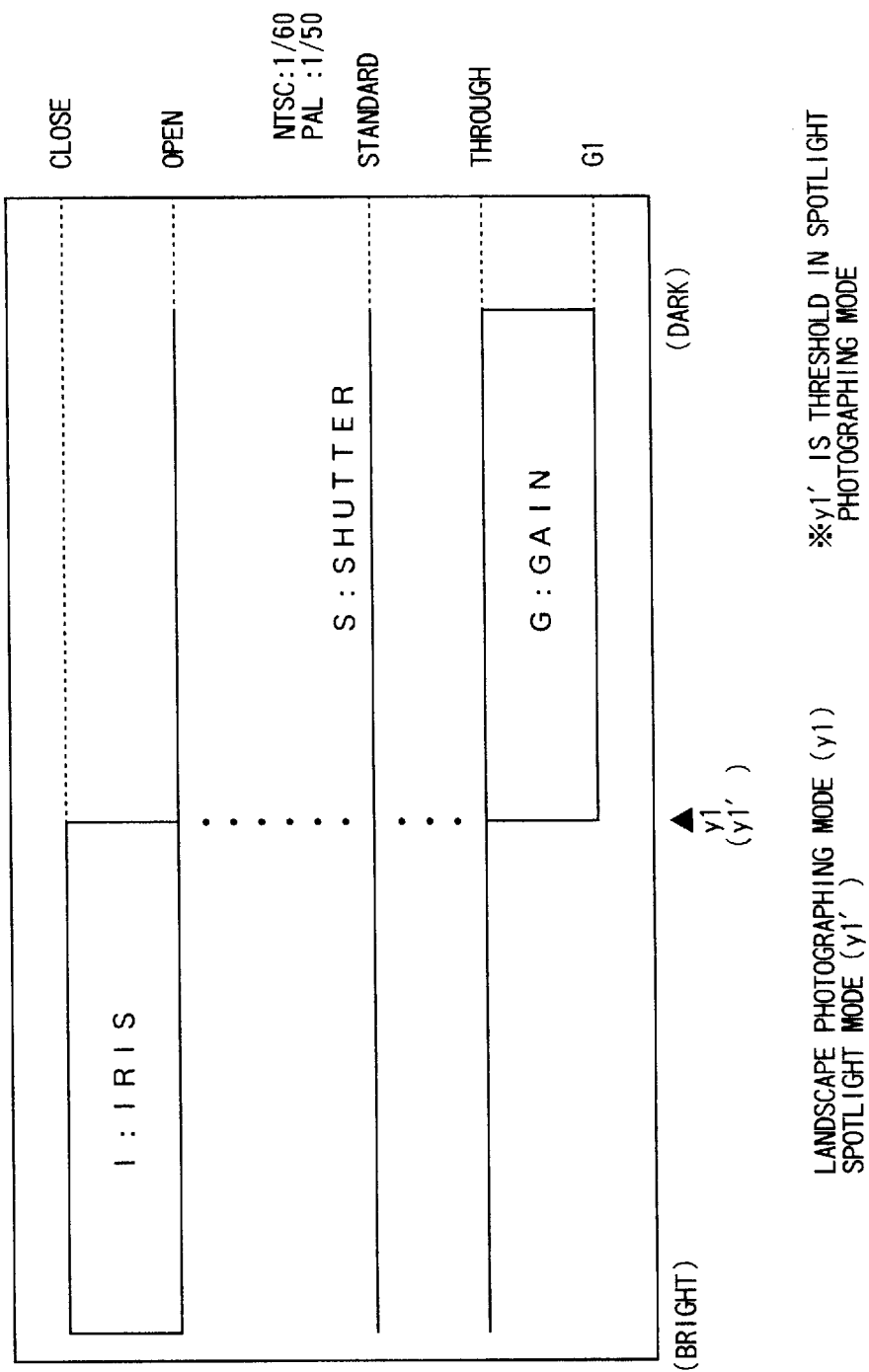

FIG. 26

EXAMPLE OF LUT DATA STRUCTURE (SURF & SNOW)

| No. | PARAMETER | ATTRIBUTION | DATA FORMAT | DATA |
|---|---|---|---|---|
| 01 | IRIS | f(Y) | THRESHOLD DEFINITION | $Y \geqq y1' \Rightarrow CAL$ <br> $y1' > Y \Rightarrow OPEN$ |
| 02 | SHUTTER | f(Y) | THRESHOLD DEFINITION | $Y \geqq y1' \Rightarrow T1'$ <br> $y1' > Y \geqq y2' \Rightarrow CAL$ <br> $y2' > Y \Rightarrow STANDARD\ VALUE$ |
| 03 | AGC GAIN | f(Y) | THRESHOLD DEFINITION | $Y \geqq y2' \Rightarrow \pm 0\,dB$ <br> $y2' > Y \Rightarrow CAL$ |
| 04 | AE WAITING | f(Y) | HIST DEFINITION | HIGH-LIGHT <br> 2/24 BLOCKS |
| 05 | AE REFERENCE VALUE | FIXED | NUMERICAL DEFINITION | 80 [IRE] |
| 06 | IMAGE QUALITY ADJUSTMENT | FIXED | CODE DEFINITION | NORMAL |
| 07 | IMAGE EFFECT PROCESSING | FIXED | CODE DEFINITION | NORMAL |

FIG. 28

EXAMPLE OF LUT DATA STRUCTURE (MANUAL)

| No. | PARAMETER | ATTRIBUTION | DATA FORMAT | DATA |
|---|---|---|---|---|
| 01 | IRIS | f(Y) | THRESHOLD DEFINITION | $Y \geq y1 \Rightarrow CAL$<br>$y1 > Y \Rightarrow OPEN$ |
| 02 | SHUTTER | MANUAL | NUMERICAL INPUT | $\Rightarrow$MANUALLY NUMERICAL SETTING |
| 03 | AGC GAIN | f(Y) | THRESHOLD DEFINITION | $Y \geq y2 \Rightarrow \pm 0 dB$<br>$y2 > Y \Rightarrow CAL$ |
| 04 | AE WAITING | FIXED | HIST DEFINITION | HIGH-LIGHT<br>2/24BLOCKS |
| 05 | AE REFERENCE VALUE | FIXED | NUMERICAL DEFINITION | 50[IRE] |
| 06 | IMAGE QUALITY ADJUSTMENT | FIXED | CODE DEFINITION | NORMAL |
| 07 | IMAGE EFFECT PROCESSING | FIXED | CODE DEFINITION | NORMAL |

FIG. 34

EXAMPLE OF LUT DATA STRUCTURE (NEUTRAL)

| No. | PARAMETER | ATTRIBUTION | DATA FORMAT | DATA | | | | |
|---|---|---|---|---|---|---|---|---|
| 01 | IRIS | f(Y) | THRESHOLD DEFINITION | $Y \geq y1$<br>$y1 > Y$ | 0.5<br>0.5 | ⇔CAL<br>⇔OPEN | | |
| 02 | SHUTTER | FIXED | NUMERICAL DEFINITION | ⇔STANDARD VALUE | | | | |
| 03 | AGC GAIN | f(Y) | THRESHOLD DEFINITION | $Y \geq y2$<br>$y2 > Y$ | 0.5<br>0.5 | ±0 dB<br>⇔CAL | | |
| 04 | AE WAITING | FIXED | MAP DEFINITION | 0.5 | 0.5 | 0.5 | 0.5 | 0.5 |
| | | | | 0.5 | 1.0 | 1.0 | 1.0 | 0.5 |
| | | | | 0.5 | 1.0 | 1.0 | 1.0 | 0.5 |
| | | | | 0.5 | 0.5 | 0.5 | 0.5 | 0.5 |
| 05 | AE REFERENCE VALUE | FIXED | NUMERICAL DEFINITION | 50 [IRE] | | | | |
| 06 | IMAGE QUALITY ADJUSTMENT | FIXED | CODE DEFINITION | NORMAL | | | | |
| 07 | IMAGE EFFECT PROCESSING | FIXED | CODE DEFINITION | NORMAL | | | | |

NOT UNDER RECORDING

IMAGE PICKUP DEVICE HAVING SELECTABLE PHOTOGRAPHING MODES

This is a continuation application under 37 CFR 1.62 of prior application Ser. No. 08/184,908, filed Jan. 19, 1994 (now abandoned), which is a continuation of Ser. No. 07/932,711, filed Aug. 19, 1992 (now abandoned).

BACKGROUND OF THE INVENTION

1. Field of the Invention

The present invention relates to an image pickup device such as a video camera.

2. Related Background Art

Recently, video apparatuses represented by the video camera have been drastically advanced, and a variety of automatic functions and the improvement in the operativity have been achieved. For example, automatic features such as the provision of a zoom lens, the automatic focus adjustment and the automatic exposure control are requisite. The automatic exposure control is an important factor in determining the quality of picked-up image, and has the great importance in all photographing environments because stable and excellent automatic exposure control is always required.

FIG. 1 is a block diagram showing the basic configuration of an exposure control system in a typical video camera. 101 is a taking lens optical system, 102 is an iris for adjusting the amount of incident light, 103 is an image pickup element such as a CCD for converting photoelectrically an image formed on an image pickup plane by the taking lens optical system, with the amount of light adjusted by the iris, into an image pickup signal, 104 is a camera signal processing circuit for applying a predetermined signal processing to the image pickup signal output from the image pickup element to obtain a normalized video signal, 105 is a video signal output terminal, 106 is a motor for varying the amount of opening by driving the iris, 107 is an iris driving circuit for driving and controlling the motor 106, 108 is a CCD driving circuit for setting a desired shutter speed by variably controlling the accumulation time (exposure time) as well as the accumulation, reading and reset timing of the image pickup element 103, 109 is an automatic exposure control circuit (AE circuit) for optimally controlling the exposure by evaluating the exposure state based on the level of a luminance signal out-put from the camera signal processing circuit and controlling the iris driving circuit 107 and the CCD driving circuit 108, and 110 is a switch panel for accepting the input of key operation.

For the exposure control, the AE circuit 109 is provided with a control system for controlling the iris driving circuit 107 by integrating the luminance signal output from the camera signal processing circuit 104 so that the level of integration may fall within a predetermined range, whereby a closed loop for the iris control is constituted to control the drive current to be output to the iris motor to vary the amount of opening in the iris, and the proper exposure state is obtained by controlling the CCD driving circuit 108 in accordance with the key operation on the switch panel 110, thereby changing the driving pulse to vary the accumulation time of image pickup element 103, and thus the exposure time or shutter speed.

This accumulation time control relies on a so-called electronic shutter, and allows for the selection of the light accumulation time at a plurality of steps from about $1/100$ to $1/10000$ second, in addition to the normal exposure time of $1/60$ second per picture, in NTSC method, for example.

When a high speed shutter is used, the system thus constituted is placed in a so-called shutter speed priority mode because of the action of an automatic exposure control mode for controlling a stop mechanism (iris) of the image pickup optical system based on a set exposure time or shutter speed which is arbitrarily selected. FIG. 2 shows the shutter speed priority mode, in which the shutter speed in the transversal axis is selected, and then the iris value in the longitudinal axis is varied with the shutter speed fixed.

However, as with the above-described video camera, in the shutter speed priority mode with the iris control based on the luminance level of an image pickup signal, the exposure control is not always appropriately made in various photographing environments and photographing situations, and frequently resulted in inappropriate exposure control.

In particular, in a camera for taking a still image instantaneously such as a silver salt camera, the appropriate exposure control at an instant of photographing is requisite, but as with a video camera, when photographing of a motion picture is made for a long time, the optimal exposure control is always necessary and must be made stably in the momentarily changing, photographing situation and image pickup environment, whereby the realization of an exposure control feature for the video camera meeting such conditions is eagerly desired.

Thus, in order to make the optimal photographing operation corresponding to all the photographing environments at all times, the photographing modes corresponding to various photographing situations are prepared and selected depending on a situation of photographing.

However, in the case where a plurality of photographing modes are switchable, the characteristics and set values of control parameters may be abruptly changed when the mode is switched, whereby there is a risk that unnatural change may occur, and the quality of image may be degraded, in particular, in a video camera for taking a motion picture.

SUMMARY OF THE INVENTION

The present invention has been achieved to resolve the aforementioned problems, and it is a first object of the invention to provide an image pickup device capable of taking a picture of any object always optimally and in all photographing conditions.

A second object of the present invention is to provide an image pickup device capable of making the switching between a plurality of photographing modes smoothly.

A third object of the present invention is to provide an image pickup device capable of switching the photographing mode even during the photographing.

A fourth object of the present invention is to provide an image pickup device capable of continuing a photographing operation without yielding any change in a picture even if the photographing mode is switched.

A fifth object of the present invention is to provide an image pickup device capable of making the switching smoothly when control parameter is changed in accordance with the photographing mode.

In order to accomplish the above objects, according to a preferred embodiment of the present invention, there is disclosed an image pickup device having a plurality of photographing modes in each of which control characteristics are set in accordance with the photographing condition, comprising mode selection means for selecting arbitrary photographing mode from said plurality of photographing modes, and control means for transferring the photographing mode via a specific mode when the photographing mode is switched by said mode selection means.

Also, according to a preferred embodiment of the present invention, there is disclosed an image pickup device having a plurality of photographing modes in each of which control characteristics are set in accordance with the photographing condition, comprising mode selection means for selecting arbitrary photographing mode from said plurality of photographing modes, and control means for transferring the photographing mode via a specific mode having control characteristics other than those of any one of said photographing modes when the photographing mode is switched by said mode selection means.

A sixth object of the present invention is to provide a video camera capable of making the selective switching between a plurality of photographing modes, in which a predetermined mode having the parameter settings different from those of any one of said photographing modes is provided, whereby a smooth photographing can be always made by interposing said predetermined mode when said photographing mode is switched.

A seventh object of the present invention is to provide a video camera capable of always making the optimal photographing without regard to the photographing situation and photographing environment, whereby when the photographing mode is switched, any abrupt change in the characteristics and set values of control parameter is prevented, so that any disorder in the picture, unnatural change, or unstable transient control state caused by the switching can be avoided.

In order to accomplish the above objects, according to a preferred embodiment of the present invention, there is disclosed an image pickup device having a plurality of photographing modes in each of which control characteristics are set in accordance with the photographing condition, comprising mode selection means for selecting arbitrary photographing mode from said plurality of photographing modes, and control means for transferring the photographing mode to a newly selected photographing mode after passage of a predetermined time when the photographing mode is switched by said mode selection means.

Also, according to a preferred embodiment of the present invention, there is disclosed an image pickup device having a plurality of photographing modes in each of which control characteristics are set in accordance with the photographing condition, comprising mode selection means for selecting arbitrary photographing mode from said plurality of photographing modes, and control means for changing the time required to transfer the photographing mode in accordance with the operation state of said image pickup device when the photographing mode is switched by said mode selection means.

An eighth object of the present invention is to provide an image pickup device capable of changing the time required to transfer the photographing mode in accordance with the operation state of the device, whereby the mode transfer is moderately made during the recording to place importance on the stability and quality of image, while during the non-recording, the mode setting is promptly made to give priority to the mode transfer speed.

Other objects and features of the present invention will be apparent from the following description and the accompanying drawings.

BRIEF DESCRIPTION OF THE DRAWINGS

FIG. 2 is a diagram for explaining a shutter speed priority mode.

FIG. 6 is a diagram showing the divisions of an image pickup plane in this invention.

FIG. 7 is a diagram for explaining the photometry range setting and weighting in "central priority photometry" in this invention.

FIG. 8 is a diagram for explaining the photometry range setting and weighting in "landscape photographing mode" in this invention.

FIG. 13 is a diagram showing the control of an image processing circuit which is executed upon the switching of photographing mode in this invention.

FIG. 14 is a diagram for explaining the data table in accordance with "full auto photographing mode" in this invention.

FIG. 16 is a diagram for explaining the data table referred to in a photographing situation different from that of FIG. 14 in accordance with the "full auto photographing mode" in this invention.

FIG. 18 is a diagram for explaining the data table in accordance with "portrait photographing mode" in this invention.

FIG. 19 is a program diagram for explaining the parameter processing in accordance with "portrait photographing mode" and "surf and snow photographing mode" in this invention.

FIG. 20 is a diagram for explaining a structure of data table in accordance with "sport photographing mode" in this invention.

FIG. 22 is a diagram for explaining a structure of data table in accordance with "landscape photographing mode" in this invention.

FIG. 23 is a diagram for explaining a structure of data table in accordance with "spotlight photographing mode" in this invention.

FIG. 24 is a program diagram for explaining the parameter processing in accordance with "landscape photographing mode" and "spotlight photographing mode" in this invention.

FIG. 26 is a diagram for explaining a structure of data table in accordance with "surf and snow photographing mode: in this invention.

FIG. 28 is a diagram for explaining a structure of data table in accordance with "manual photographing mode: in this invention.

FIG. 34 is a diagram for explaining a structure of data table in accordance with "neutral mode" in this invention.

DETAILED DESCRIPTION OF THE PREFERRED EMBODIMENTS

The preferred embodiments of the present invention for an image pickup device will be described below with reference to the drawings.

Figure 3:
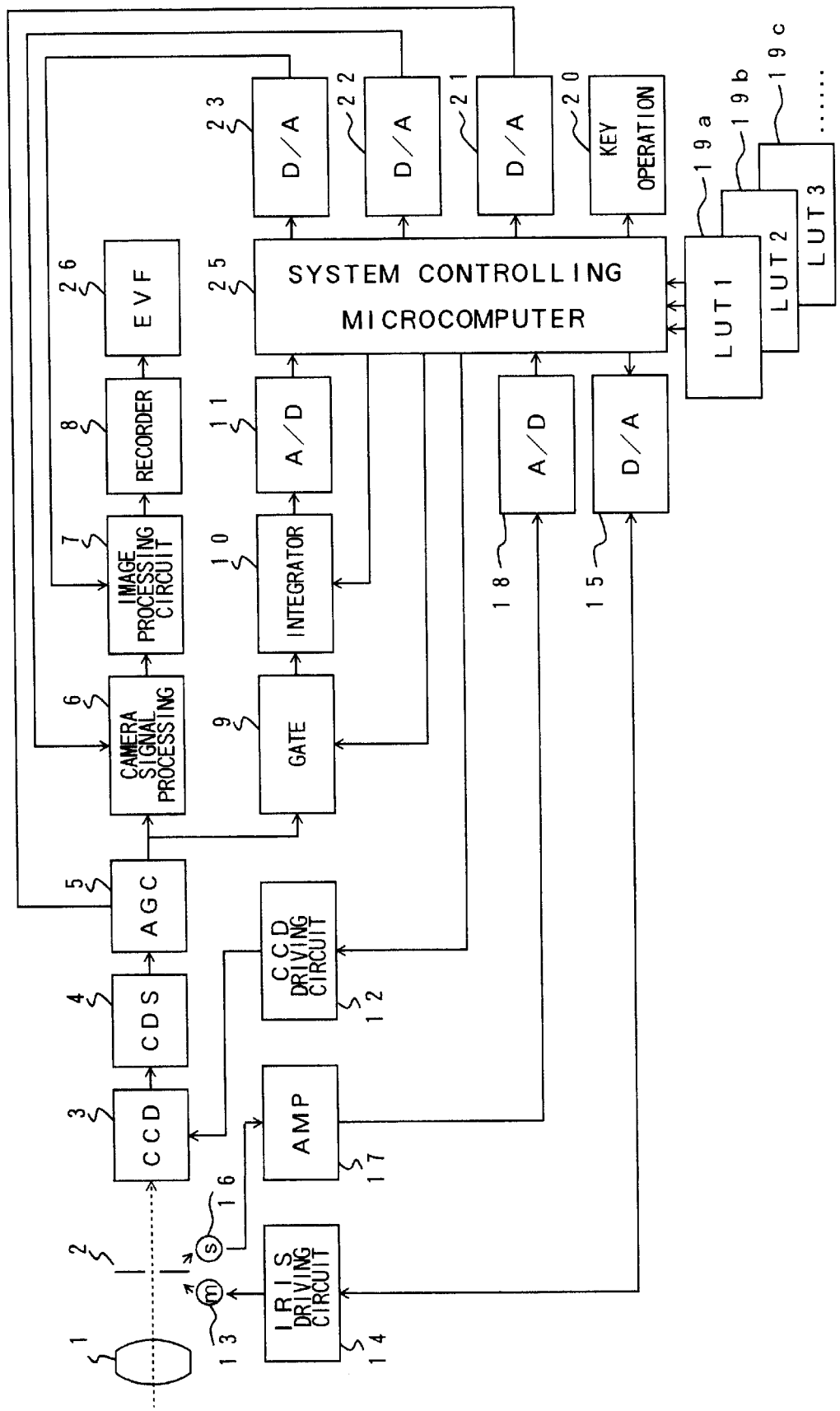
FIG. 3 is a block diagram showing a configuration of an image pickup device of the present invention applied to an exposure control device of a video camera.

FIG. 3 is a block diagram showing a configuration of an image pickup device applied to a video camera according to one embodiment of this invention. In the same figure, 1 is a taking lens optical system, 2 is an iris for adjusting the amount of incident light, 3 is an image pickup element such as a CCD for converting photoelectrically an image formed on an image pickup plane by the taking lens optical system, with the amount of light adjusted by the iris, into an image pickup signal, 4 is a correlation double sampling circuit (CDS) for reducing the noise in the accumulation charge of image pickup element, 5 is an AGC circuit for automatically adjusting the gain of an image pickup signal, 6 is a camera signal processing circuit for making a predetermined signal processing for the image pickup signal output from the AGC circuit 5 to be converted into a normalized video signal, 7 is an image signal processing circuit for converting a video signal output from the camera signal processing circuit into a signal suitable for recording onto a video tape recorder, etc., and 8 is a video tape recorder using a magnetic tape as the recording medium.

On the other hand, 9 is a gate circuit for gating a signal output from the AGC circuit 5 to extract an image signal corresponding to any one of a plurality of areas divided on the image pickup plane, 10 is an integrator for integrating the image pickup signal corresponding to a specified area within the image pickup plane selected by the gate circuit 9 to obtain an average amount of light, and 11 is an A/D convertor for converting a signal output from the integrator into digital signal processible by a system control circuit as will be described later. The area specification with the gate circuit 9 and the integration with the integrator 10 are concerned with the setting and weighting of the photometry range in accordance with the photographing mode, selective characteristics thereof being set arbitrarily by controlling a gate pulse output from the system control circuit 25 as will be described later and an integration reset pulse. The detail process will be described later.

12 is a CCD driving circuit for controlling the accumulation, reading and reset operations of the image pickup element 3, 13 is an iris motor for driving the iris 2, 14 is an iris driving circuit for driving the iris motor, 15 is a D/A convertor for converting the digital iris control signal output from the system control circuit as will be described later into an analog signal, 16 is an iris encoder constituted of Hall element or the like to detect the amount of opening or the iris value, 17 is an amplifier for amplifying the output of the iris encoder 16, and 18 is an A/D convertor for converting the output of the iris encoder amplified to a predetermined level by the amplifier 17 into digital signal processible by the system control circuit.

19a, 19b, 19c, . . . are data look-up tables (LUTs) which store various types of data for the exposure control, wherein in this embodiment three tables are illustrated to allow for a plurality of settings in accordance with the photographing situations, although actually they are provided corresponding to respective photographing modes prepared, and two data tables can be selectively used in a full auto photographing mode as will be described later. By the way, in this embodiment, there will be described "indoor photographing mode", "sport photographing mode", "landscape photographing mode", "portrait photographing mode", "full auto photographing mode", "spotlight photographing mode, "surf & snow photographing mode", and "manual photographing mode".

Specifically, the information about the control characteristics of exposure control parameters such as the iris, the shutter speed, and the gain corresponding to each of a plurality of photographing modes are stored, and necessary data is read out in accordance with a set photographing mode.

20 is an operation unit comprising a plurality of operation keys to make various types of operations, 21 is a D/A convertor for converting a digital gain control signal output from the system control circuit into an analog control signal to be supplied to the AGC circuit, and 22, 23 are D/A convertors for converting a digital control signal output from the system control circuit into an analog control signal to be supplied to the camera signal processing circuit 6 and the image processing circuit 7, respectively, to change or modify various characteristics in the camera signal processing and the image signal processing in accordance with the photographing situation, respectively.

25 is a system control circuit constituted of a microcomputer to control globally the whole of a video camera system in this embodiment.

The system control circuit controls the gate pulse to be supplied to the gate circuit 9 in accordance with the photographing mode to make the setting of photometry range to detect the amount of light on the image pickup plane, as well as outputting a control signal for controlling the characteristics of camera signal processing circuit 6 and image signal processing circuit 7 in accordance with the photographing mode operated by the operation unit 20 via the D/A convertors 22, 23. Also, it controls the selective characteristics of integration operation by controlling the integration reset pulse to be supplied to the integrator 10.

Figure 4:
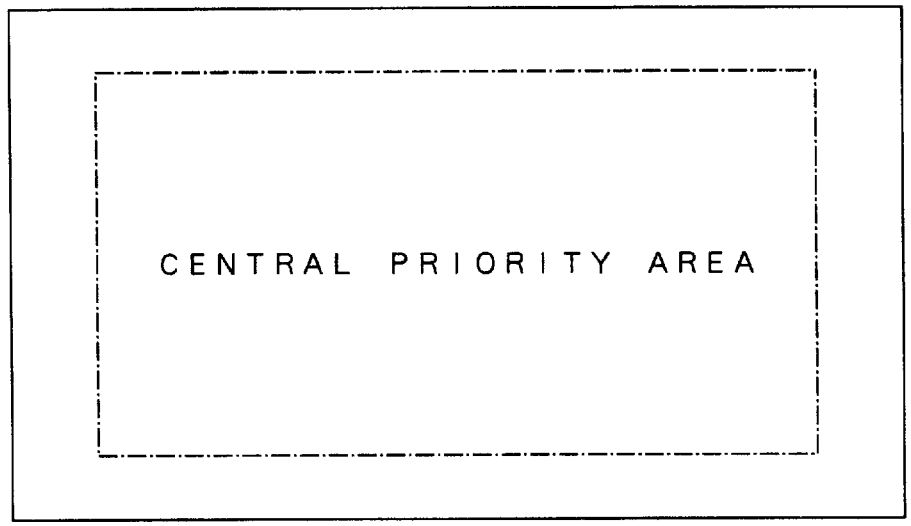
FIG. 4 is a diagram showing a photometry area in central priority photometry.

For example, FIG. 4 shows an instance of photometry range set on the image pickup plane, i.e., the set range state of "central priority photometry" in which the photometry range is set centrally within the image pickup plane to use a signal in this range for the exposure control.

This is based on a rule of thumb that a main object is most possibly located almost centrally in the image pickup plane, whereby the exposure control is performed with greater weighting in the central portion by allocating a larger operation factor to the signal inside the central range than the signal outside thereof.

The system control circuit 25 fetches an integration value for the image pickup signal within the photometry range input via the gate circuit 9 in accordance with the photographing mode, produces an iris control signal in accordance with the photographing situation with reference to data in LUT 19a, 19b, 19c, . . . and supplies that signal via the D/A convertor 15 to the iris driving circuit 14, as well as supplying a gain control signal via the D/A convertor 21 to the AGC circuit 5 to control the gain of the AGC circuit 5 variable in accordance with the photographing mode and the photographing situation, and further supplying a control signal to the CCD driving circuit to control the accumulation time, reading timing and reset timing of the image pickup element (electronic shutter).

These various types of controls are performed by referring to the output of the iris encoder 16 in accordance with the photographing mode to calculate and set various types of parameters, whereby each control can be selectively or simultaneously executed, or in a combination thereof.

In this way, the system control circuit 25 operates the iris control with the integration value, the gain control, the drive control of image pickup element (e.g., an electronic shutter with the accumulation time control) simultaneously or in a combination thereof, in accordance with the photographing mode, the photographing situation, and the iris driving state, so that the optimal exposure control can be performed under all the photographing situations.

26 is an electronic view finder (EVF) for displaying a photographed image, a reproduced image by the recorder unit 8, and data concerning a variety of operation modes.

The display of such various data will be described later.

The image pickup device of the present invention has a configuration as above described, and specific operations thereof will be described in due order.

Various types of parameters for use with the exposure control in the device of this invention will be first described.

(1) Amount of iris opening (parameter P1)

An iris control signal output from the system control circuit is supplied to the iris driving circuit 14 after being converted into an analog signal by the D/A convertor 15, then current amplified and supplied to the iris motor 13 to drive it. The iris motor 13 controls the stop state of the iris 2.

If the integration value of the integrator 10 supplied by the A/D convertor 11 is greater than the control value predefined in LUT 19a, 19b, 19c, . . . corresponding to the photographing mode, the iris motor 13 is driven in a direction of restricting the iris 2 because of the overexposure, by controlling the iris driving circuit 14, so that the amount of incident light is reduced to decrease the output level of the integrator 10.

Conversely, if the integration value supplied by the A/D convertor 11 is smaller than the control value predefined in LUT 19, the iris motor 13 is driven in an opposite direction to the above direction to open the iris 2, and controlled so that the amount of incident light is increased to make the integration value greater.

Figure 5A:
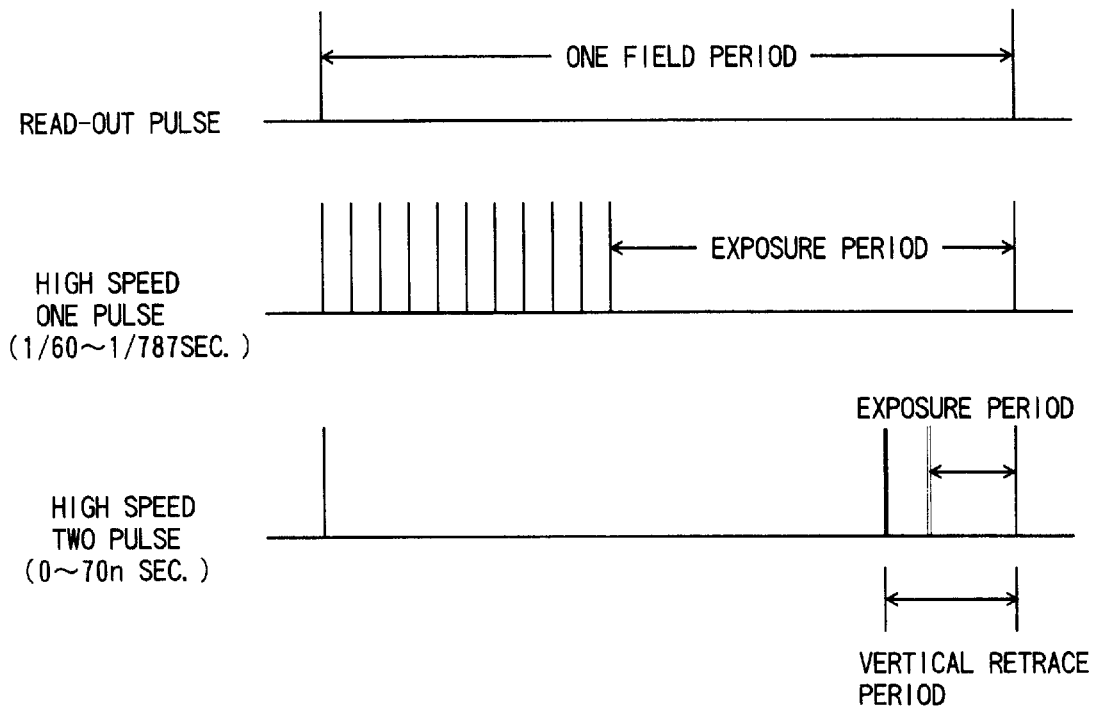
FIGS. 5A and 5B are diagrams for explaining the operation of an electronic shutter.
Figure 5B:
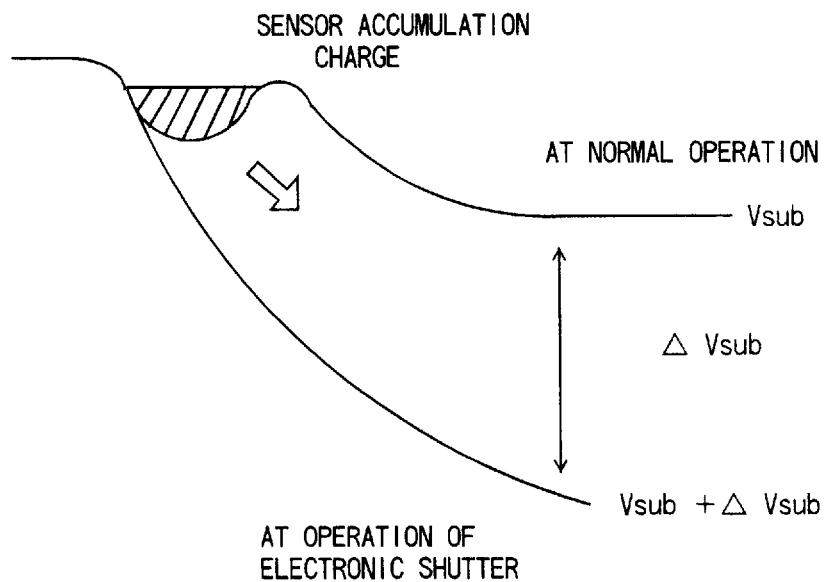

(2) Shutter speed (parameter P2) (FIGS. 5A and 5B)

As shown in FIG. 3, an accumulation time setting signal $D_t$ of image pickup element is output in the form of digital signal by the system control circuit 25 and supplied to the CCD driving circuit 12, whereupon the CCD driving circuit 12 generates a pulse for determining various timings of CCD to control the accumulation time.

The setting method and range of this accumulation time will greatly vary depending on the CCD structure, but in this embodiment a CCD having a structure in which unnecessary charges are discharged into OFD (overflow drain) during the H blanking period will be exemplified.

FIG. 5A shows the operation of this CCD, the period of which is settable within a permissible range of the image quality such as the amount of image pickup light or smear as long as it is within the H blanking on the high speed side. It is substantially about 1/10000 second. On the low speed side, it is settable at steps of H blanking period (about 63.5 m second) up to 1/60 second in NTSC.

Specific time control is performed in such a manner that the system control circuit 25 outputs $D_t$, as shown in FIG. B and the shutter speed T is determined by the following operations.

$$T_{NTSC} = (262.5 - D_t) * 63.5 \, \mu sec \qquad (1)$$

$$T_{PAL} = (312.5 - D_t) * 64.0 \, \mu sec \qquad (2)$$

Upon accepting an instruction, the CCD driving circuit 12 changes the potential distribution in a charge accumulation portion due to photoelectric transfer by adding $\Delta V_{sub}$ to $V_{sub}$ (vertical substraight applied voltage) to realize the operation of an electronic shutter, and discharges unnecessary charges in a direction toward the substrate. In this way, an arbitrary shutter speed can be realized. FIG. 5B shows this operation.

The system control circuit 25 changes the $D_t$ to a smaller value than the current value to make the shutter speed slower, if the current shutter speed is higher than the control value predefined in LUT19 corresponding to the integration value obtained from the A/D convertor 11, or conversely changes the $D_t$ to a larger value than the current value to make the shutter speed faster, if it is lower than the control value predefined in LUT19.

(3) Gain (parameter P3)

A gain set signal for determining the amplification factor of video signal is output from the D/A convertor 21 and supplied to the AGC circuit 5.

The setting of the AGC gain is provided for the AGC amplifier to subject the output signal of CDS4 to a proper signal processing in the camera signal processing circuit 6 at the next stage, and is dealt with as a part of AE loop component using a conventional iris, i.e., not a separate object to be controlled arbitrarily.

In recent years, the S/N ratio of CCD has been improved, so that the noise in the image pickup system is not greatly remarkable even if the amplification factor is increased with a larger gain of AGC, whereby the settable range as control parameter has been extended.

The gain is a parameter having a fast control response in the image pickup system, i.e., a parameter suitable for the AE control in the situation where quick reaction is required.

If the current AGC gain is larger than the control value predefined in LUT19 corresponding to the integration value from the A/D convertor 11, the system control circuit 25 updates the gain set value to make the AGC gain smaller.

Conversely, if the current AGC gain is smaller than the control value predefined in LUT19 corresponding to the integration value from the A/D convertor 11, the system control circuit 25 updates the gain set value to make the AGC gain larger.

According to the present invention, it is possible that a proper exposure state of the image pickup system be maintained in accordance with the photographing situation and the photographing mode, using three parameters. In the following, the exposure control using each parameter as above described will be described. First, the setting of photometry range on the image pickup plane depending on the exposure control mode will be described.

An object to be photographed by the video camera may vary depending on the place, environment and photographing situation. Accordingly, in order to always make the optimal automatic exposure control under such photographing situations, it is necessary to make a control suitable for such a situation by appropriately changing the set position of photometry range within the image pickup plane, as well as the weighting thereof.

Thus, it is necessary to provide an automatic photographing mode for setting the photometry range in which the luminance distribution within the image pickup plane is presumed, by taking into consideration the light ray condition corresponding to a typical set scene, so that a larger factor of AE (automatic exposure control) is allocated to the area within the image pickup plane capable of providing more effective information for the determination of light exposure value, which has a larger weighting.

According to this embodiment, FIG. 6 shows an instance in which the image pickup plane is divided into four sections longitudinally and six sections transversally, so that the whole image pickup plane is divided into twenty four sections (in the figure, each section is numbered as 1 to 24 for the convenience of explanation).

This dividing operation is controlled by the system control circuit 25, so that the opening or closing of the gate circuit 9 is controlled by a gate pulse output from the system control circuit 25, and the output signal of the AGC circuit 5 is extracted for each section 1 to 24 to be integrated as an independent value by the integrator 10 for each section, which result value is converted into digital signal by the A/D convertor 11 to be input into the system control circuit 25. In the system control circuit 25, a processing for the integration value in each section is performed by applying weighting factor predefined in accordance with the photographing mode. Note that such processings can be made in time division corresponding to 24 divisions.

FIGS. 7 and 8 show instances of the image pickup plane with weighting factors applied.

FIG. 7 shows an implementation of "central priority photometry" as previously described in the 24 division AE method of this invention, sections 8 to 11 and 14 to 17 corresponding to the central portion of the image plane having a weighting factor of 1.0, and surrounding sections therearound having a weighting factor of 0.5, whereby the centrally emphasized AE control is implemented. Specifically, if the iris, shutter speed and gain are controlled based on the summation of integration values for weighted areas, the above-described weighting can be reflected to the control.

FIG. 8 shows an instance of the photometry range suitable for "landscape photographing". Generally, when the landscape photographing is made, both the ground and the sky are often photographed in an image plane at the same time. The sky portion is much more luminous than the ground portion, even in a slightly cloudy sky. Therefore, if a picture is taken using the AE control without regard to a conventional photometry range, a figure placed in a background of ground or sky may be obscured in shadow detail due to shortage of light quantity in many cases.

To resolve these drawbacks, the weighting factor for areas 1 to 6 at a top portion of the image plane corresponding to the sky is made 0.0 to be ignored substantially, the weighting factor above the central portion of the image plane is set at 0.5, and the weighting factor under the central portion of the image plane is set at 1.0. With such allocation of operation factors, the AE operation with the under portion of image plane corresponding to the ground stressed is enabled.

Other than two instances as above described, the settings for a variety of AE characteristics are possible if the photographing mode is set in accordance with the photographing situation, and the photographing program can be appropriately selected in accordance with the setting of photometry range and the photographing situation.

Next, the actual AE control using three parameters in accordance with the photographing situation will be described below. As previously described, to make the photographing adapted to any of various photographing situations, more parameters are prepared in this invention to enable the optimal control because only the conventional iris control will be unsufficient.

That is, in this invention a photographing control method called "program mode" has been invented in which several typical photographing situations are supposed, and the automatic adjustment is made under the conditions optimal to respective situations. The program mode can be selected freely with the key operation on the operation unit 20.

To always take excellent picture under various places and situations for video photographing, it is necessary to suppose a typical scene in accordance with the photographing situation, and provide a plurality of automatic photographing (exposure control) modes to make the optimization in the scene.

To resolve this problem, a plurality of look-up tables (LUTs) storing a plurality of control functions for the control of parameters are set, wherein a plurality of tables such as LUT19a, LUT19b, LUT19c, ... are prepared in the memory such as a ROM, as shown in FIG. 3, and selectively read out by the system control circuit 25, and this selection can be made with the key operation in the operation unit 20.

Figure 9:
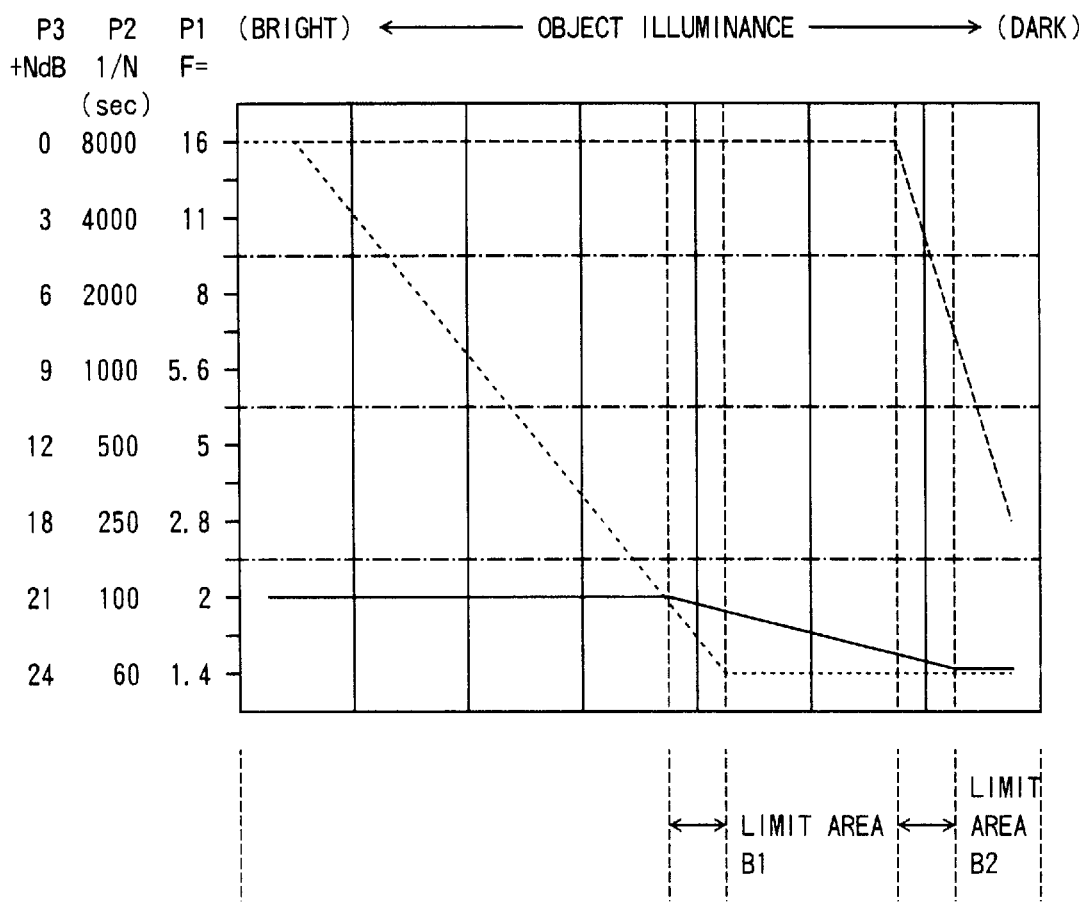
FIG. 9 is a program diagram for explaining the processing of parameters in accordance with "indoor photographing mode".
Figure 10:
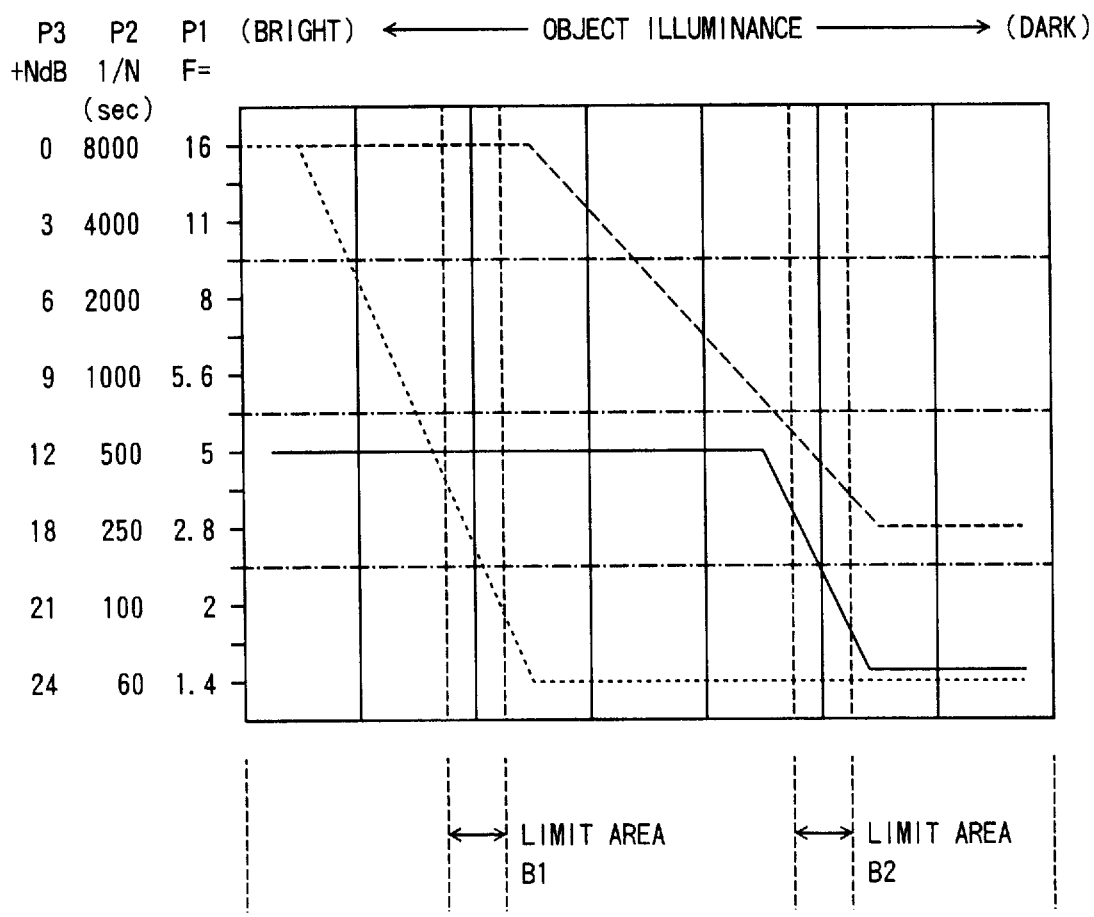
FIG. 10 is a program diagram for explaining the processing of parameters in accordance with "sport photographing mode".

The control characteristics of each parameter to be controlled by data read from the LUT 19a, 19b, 19c, . . . are exemplified in FIGS. 9 and 10.

FIG. 9 is a program diagram showing the operation of program control in which the proper exposure control is allowed by setting the shutter speed of parameter (2) as close to 1/100 second as possible, and by varying the iris of parameter (1) or the AGC gain of parameter (3) for the change in the luminance information of input parameter, this information being stored in LUT19a, for example.

This program mode is aimed to suppress the flicker of a fluorescent lamp when a video camera of the NTSC method is used at a place with a power frequency of 50 Hz, and this mode is called "indoor photographing mode".

In the figure, the transversal axis indicates an object illuminance as the input parameter, and the longitudinal axis indicates the set value of each parameter. As can be clear from the same figure, the set range of each parameter is divided into three areas A, B and C in accordance with the input parameter or object illuminance, whereby the exposure control is enabled by combining three parameters within each area.

That is, in the area A, the shutter speed (P2) is fixed at 1/100 second, and the gain (P3) is also fixed, whereby the exposure control can be made by controlling the iris (P1) in accordance with the illuminance. With this area A, most objects can be dealt with.

On the other hand, in the area B, where the illuminance is lower and the iris is opened, the iris is fixedly maintained at an open value as shown in the figure. Accordingly, the exposure control is performed by changing the shutter speed to 1/60 second. That is, the accumulation or reading is intrinsically performed at a period of 1/60 second in the NTSC method, 1/60 second indicating an intrinsic operation timing If the illuminance is further lower, the exposure control is performed by raising the gain (P3) because the iris and the shutter have reached their limits as shown in the area 3.

In this way it is possible to make the optimal exposure control in accordance with the photographing situation by changing the control parameters P1 to P3 correspondingly to the variation of input parameter indicating the object illuminance.

FIG. 10 shows another program mode, which is a program mode called "sport photographing mode" provided to be able to take a clear picture by setting the shutter speed (P2) to a high speed as close to 1/500 second as possible by using for example a program diagram stored in LUT19b, thereby suppressing the blurring for a rapidly moving object.

As will be clearly seen from the same figure, the exposure control is performed in such a manner that the shutter speed is maintained as close to 1/500 second as possible in the areas A and B, and the iris (P1) and the gain (P3) are adjusted if the object illuminance is changed, and in the area C where the object illuminance is lower and the shutter speed can not be maintained, the shutter speed is gradually varied to 1/60 second.

In this way, it is possible to make the optimal exposure control in all photographing situations by preparing a plurality of program modes corresponding to the photographing situations, and appropriately selecting one of them with the key operation on the operation unit 20.

Note that when the photographing program mode is switched by the operation unit 20, the setting of photometry range on the image pickup plane is also changed at the same time as previously described. For example, in the indoor photographing mode of FIG. 9 and the sport photographing mode of FIG. 10, an object, ordinarily a figure, positioned centrally in the image plane is photographed in most cases, whereby the image plane is made a "central priority photometry" as shown in FIG. 7.

Also, in the landscape photographing mode of FIG. 22 as will be described later, the photometry range in the image pickup plane is switched to a photometry range for "landscape photographing mode" as shown in FIG. 8 upon the switching of the photographing mode.

By the way, the parameter control in the program diagram as above described has the following features.

That is, as can be clearly understood from FIGS. 9 and 10, each control parameter is defined in a plurality of subdivided areas (A, B, C areas in this embodiment), each of which is selected depending on the change of the input parameter or object illuminance, and for each area, only one variable parameter is specified to be used with the AE control, with other two parameters fixed. This is shown in a table under the program diagram.

That is, in FIG. 9, the parameter (P1) is variable and others are fixed in the area A, namely, the shutter speed and the gain are fixed while the iris control is made.

In the area B, the parameter (P2) or the shutter speed is variable and others are fixed, while in the area C the parameter (P3) or the gain is variable and others are fixed.

Consequently, though the control is performed by varying three control parameters, the variable parameter is always only one in each area unit, and since the arithmetic processing of fixed parameters is unnecessary, the arithmetic processing is not different from that of the conventional single parameter.

That is, the present invention performs complex arithmetic operations naturally necessitated by the increased number of control parameters to cope with all photographing situations in such a manner that the parameter set region is divided into a plurality of areas, in each of which only one parameter is variable and others are fixed, so that the handling for various complex photographing conditions with a plurality of control parameters can be simplified, whereby the optimal AE control can be realized without the use of a large-scale logic or a large computer.

Note that this invention has another feature in the switching operation of control parameters as above mentioned.

That is, the present invention reduces the arithmetic operations by varying only one parameter with others fixed, but the feature specific to a video camera is that an object to be photographed is normally a dynamic picture image the photographing condition of which is momentarily changing.

When each control parameter is set correspondingly to the input parameter, the input parameter value may move among a plurality of divided areas with the change of photographing condition. At this time, the switching of control parameters may occur but the variation on the image plane may be greatly caused depending on the parameter, and if this variation frequently occurs, it is anticipated that the image plane is not excellently seen.

As a measure for this, it is contemplated that hysteresis is given in the area transfer to reduce the frequency of area transfers, but this is not effective when the switching occurs, and does not serve as a fundamental measure.

In this invention, for this measure, two parameters of adjacent areas are varied at the same time only in the limit areas B1 and B2 near the boundary of area, as shown in FIGS. 9 and 10.

In FIG. 9, the limit area B1 restricted by the broken line is an area where parameters P1 and P2 operate at the same time, while the limit area B2 is an area where parameters P2 and P3 operate at the same time.

In this way, the image change specific to each parameter will arise simultaneously and gradually by changing two parameters at the same time, whereby the change on the image plane can-be made visually undifferenced even when the transfer of parameter occurs between the areas.

The method of controlling the exposure in a plurality of photographing program modes has been described but according to this invention, a control signal for controlling a variety of image processings or various characteristics of the camera signal processing from a normal position in accordance with the photographing situation can be supplied via the D/A convertors 22, 23 based on an instruction from the system control circuit 25 upon the switching of the photographing mode.

That is, in order to represent each scene always optimally in various photographing places or situations, it is effective to control the camera signal processing circuit 6 and the image signal processing circuit 7 as shown in FIG. 3, in addition to manipulating the basic control parameters of the photographing.

Figure 12:
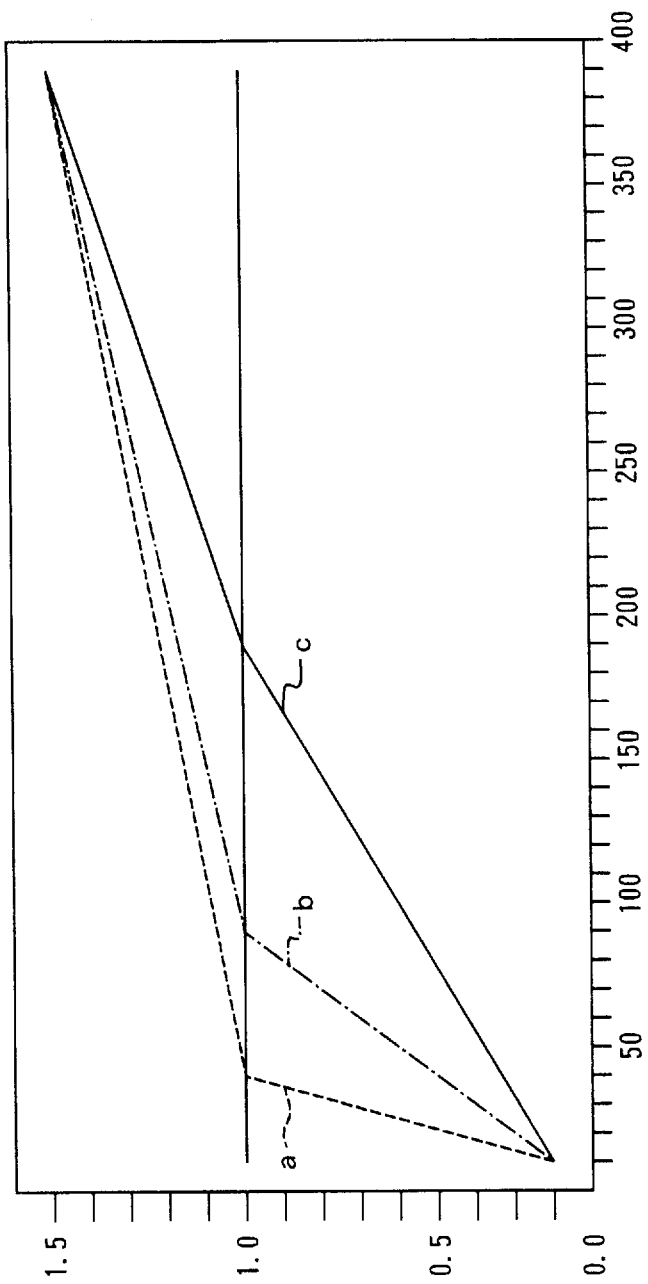
FIG. 12 is a diagram showing the characteristics of a camera signal processing circuit which is executed upon the switching of photographing mode in this invention.

Thus, in accordance with the photographing mode set in consideration of the image pickup plane corresponding to a typical set scene, the camera signal processing circuit 6 changes the non-linear conversion characteristics (knee characteristic or γ characteristic) according to the line indicated by a, b or c in FIG. 12, or controls the characteristics of an aperture correction circuit for changing the sharpness of image, and the image signal processing circuit 7 in the same figure gives an "fade effect" or "residual image effect" to a pickup video signal as the processing to attach the additional image effect, for example, FIG. 13 shows a configuration example of the image signal processing circuit 7 having a function of attaching such an additional effect, and the configuration and operation thereof are shown in the following.

A color signal generation circuit 30 generates a color signal (e.g., background of totally blue or white) specified by the control signal from the system control circuit 25, the color signal being supplied to a selection switch 31 for selecting one of three signals which are the color signal, the signal of which video output is delayed one picture by a field memory circuit 32, and a non-signal.

The information concerning-one of the three signals selected upon an instruction from the system control circuit 25 is supplied to an input terminal of a multiplier 33. The multiplier 33 executed the multiplication processing using a coefficient output by a multiplication coefficient generator 34 based on an instruction from the system control circuit 25. The multiplication result is added to a signal resulted from the same coefficient multiplication processing of a video input signal input via the input terminal 36 by the multiplier 38 and supplied to an output terminal 37.

In the processing of such a signal, if an OFF terminal of non-signal is selected by the selection switch, a video input signal is directly output (through) to the video signal output terminal 37 because a video signal from the input terminal 36 is only input into an adder 35. The coefficient of the multiplier 38 is 1.0 or through at this time.

If the output of the color signal generator 30 is selected by the selection switch 31, it is multiplied by the output of the multiplication coefficient generator 34 in accordance with an indication (start/stop timing or direct setting-of coefficient) of the system control circuit 25, and with a reverse operation (complementary relation of 1 for the coefficient) of the input video signal from the video input terminal 36, one signal appearing from 0 to 1 and the other signal disappearing from 1 to 0, so that the color signal and the input signal are exchanged.

Also, when the output of the field memory is selected, the coefficient of the multiplier 38 is related to the complement of 1 as previously described. The difference therebetween is that there is no temporal change, and the operation is fixed at 0.5.

In this case, since the output result of addition is added cyclically at a predetermined ratio with a delay of one picture, input image is represented as leaving a trail in a direction of the time axis.

If such a signal processing is operated in a so-called portrait photographing mode for mainly photographing a figure as will be described later, the frequency involved in the sharpness of visual characteristics of figure, or the frequency response near 2 to 3 MHz in the television signal can be lowered by changing the aperture characteristics in the camera signal processing circuit to attach a soft feeling to the image, thereby adjusting the image quality.

Also, if the circuit of FIG. 13 is operated, the effect of an special image processing can be automatically attached, such as the attaching of color fade to the image.

In the image pickup device of the present invention, a plurality of program photographing modes are provided to always make the optimal control in various photographing situations, but the setting procedure for each control parameter of iris, shutter speed and gain will be shown below, although the setting of each control parameter in individual program photographing mode, the setting of photometry range in the photographing mode, and the switching of the characteristics of signal processing system in accordance with the photographing mode will be described later.

Figure 11:
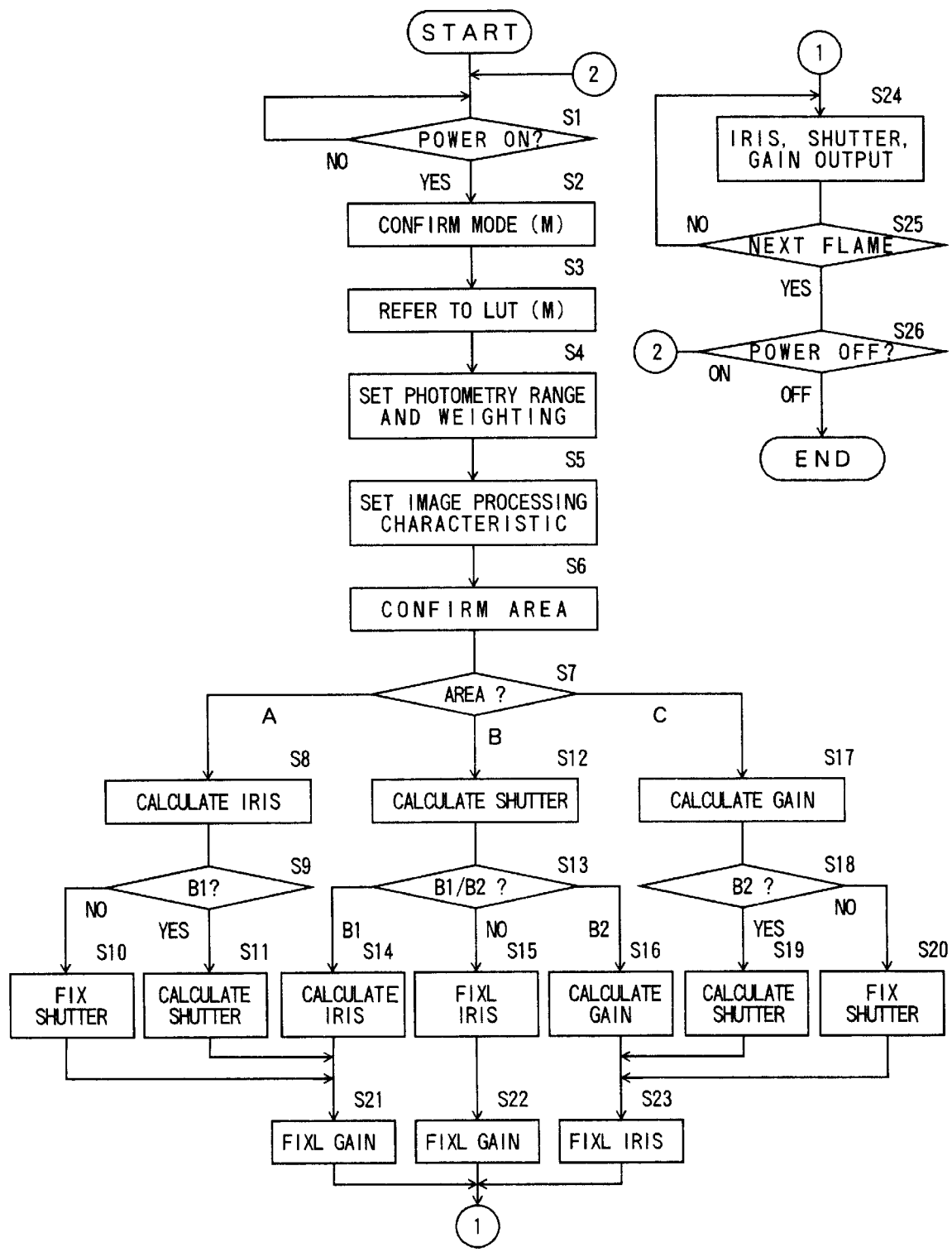
FIG. 11 is a flowchart for explaining the setting processing of parameters in FIGS. 9 and 10.

FIG. 11 is a flowchart showing a parameter setting operation including the parameter processing at the area boundary portion as previously described, in the program photographing mode using the program diagram of FIG. 9 for example.

In the same figure, if the control is started, power-on is monitored at S1. If the power-on is made, the operation proceeds to S2, where the photographing program mode (M) selected with the operation unit 20 is confirmed. At step S3, specified program characteristics are set by referring to LUT19a, 19b or 19c corresponding to a selected program mode (M). The details of individual photographing mode will be described later.

At S4, the weighting data for 24 divisions on the image pickup plane are read from the specified LUT, and the weighting in accordance with the selected photographing mode is applied as previously described. Then the operation proceeds to step S5.

At S5, the contents and characteristics of the image processing are read from the LUT in accordance with the specified photographing model and the adjustment of image quality with the aperture control, or the image processing with the color fade, as in the above example, is set in accordance with the photographing mode.

At S6, the current area in the reference parameter axis is confirmed based on the object illuminance corresponding to the input parameter.

Proceeding to S7, the branch destination is determined in accordance with the current area.

If the area A is determined, the operation proceeds to step S8, where the iris control parameter P1 is calculated. At S9, the limit area B1 is judged inside or outside. If outside the limit area B1, the operation proceeds to S10, where the shutter speed control parameter P2 is held and fixed, while if inside the limit area B1, the operation proceeds to S11, where the shutter speed control parameter P2 is calculated and updated. Then the operation proceeds to S21, where the gain control parameter P3 is held and fixed, and further proceeds to S24.

If the area B is determined at step S6, the shutter speed control parameter P2 is calculated at S12. Then the operation proceeds to S13, where the limit areas B1 and B2 are judged inside or outside. If inside B1, the iris control parameter P1 is calculated at S14, the gain control parameter P3 is held and fixed at S21, and then the operation proceeds to S24.

If inside B2, the operation proceeds to S16, where the gain control parameter P3 is calculated. At S23, the iris control parameter P1 is held and fixed, and then the operation proceeds to S24.

If outside both B1 and B2, the iris control parameter P1 is held and fixed at S15, the gain control parameter P3 is fixed at S22, and then the operation proceeds to S24.

If the area C is determined at S7, the operation proceeds to S17, where the gain control parameter P3 is calculated. Subsequently, the limit area B2 is judged inside or outside at S18. If outside the limit area B2, the operation proceeds to S20, where the shutter speed control parameter P2 is held and fixed, while if inside the limit area B2, the operation proceeds to S19, where the shutter speed control parameter P2 is calculated and updated. Then the operation proceeds to S23, where the iris control parameter P2 is held and fixed, and proceeds to S24.

At S24, each parameter value P1, P2, P3 set in the previous processing, i.e., each control value of iris, shutter speed and gain, is output by the system control circuit 25 so that the iris 2, the image pickup element 3 and the AGC circuit 5 are controlled in accordance with the program mode. At S25, the operation waits for the next processing time unit to come (the basic unit being one calculation per frame in this embodiment). At S26, the power-off is confirmed, and if the power is continued on, the operation returns to S1 to repeat the above-described processing, while if the power off is designated, the processing is terminated.

Thereby, various types of parameters can be controlled in accordance with the selected program mode, whereupon the exposure control is performed.

Since the photometry range in the image pickup plane, the characteristics of image signal processing system, and the additional functions, are changed appropriately according to the photographing situation when the photographing program mode is switched, the optimal automatic exposure control and photographing can be always made in accordance with each photographing situation.

Even if the photographing situation is changed, the switching to the optimal control mode can be made without any unnatural change in the photographing state of camera.

Each photographing mode as described is an automatic photographing mode in respective photographing situation, and if a photographing mode is selected, various types of control information are read out from the data table LUT corresponding to the photographing mode, whereby the setting and control of the control parameters are automatically performed.

The above procedure is one from the reading of the characteristics of each parameter from the data reference table LUT to the arithmetic operation of the AE control data. In the following, the photographing modes and the parameters stored in the LUTs corresponding to respective program photographing modes, as well as their definitions and characteristics and the actual AE control characteristics, will be described.

Figure 15:
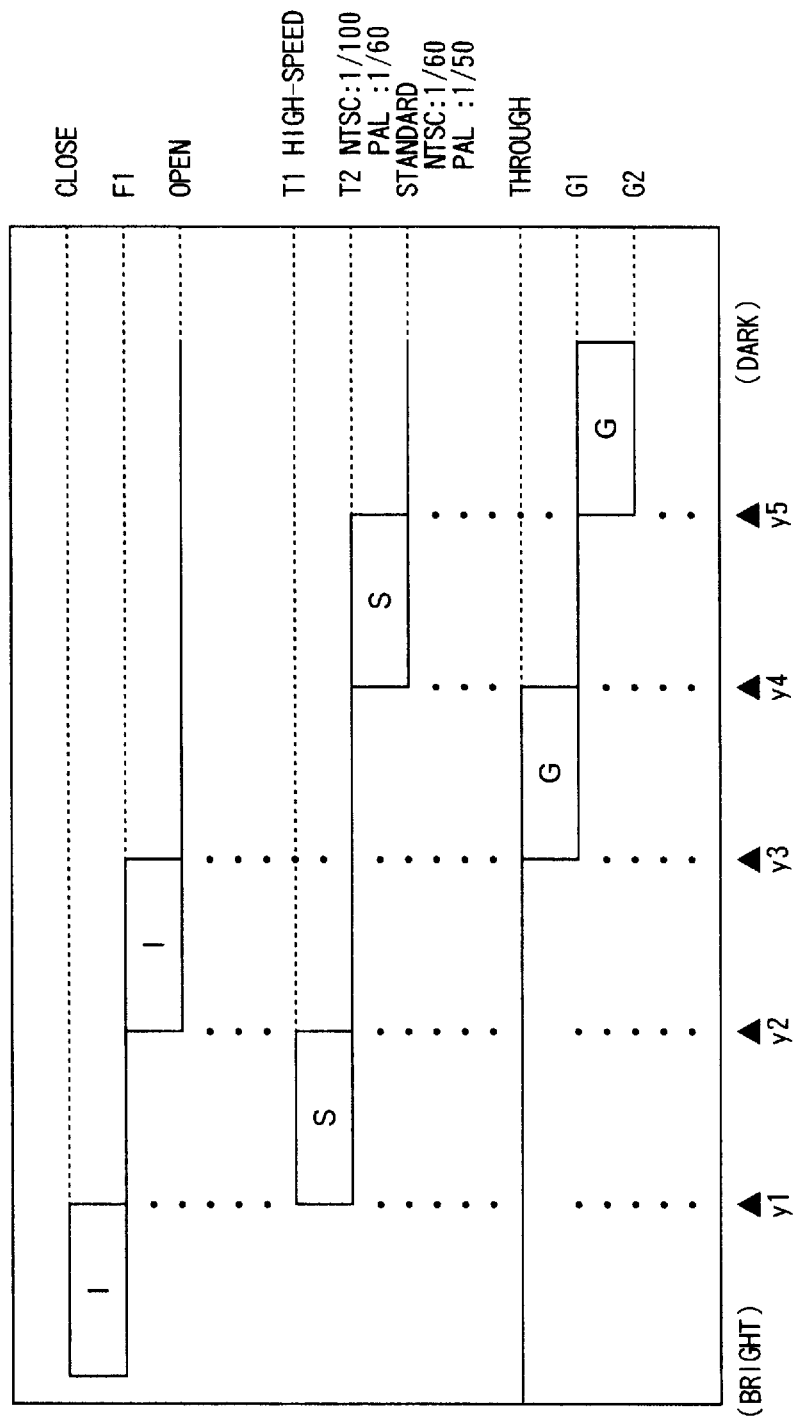
FIG. 15 is a program diagram for explaining the parameter processing based on FIG. 14 in accordance with the "full auto photographing model" in this invention.

FIG. 14 shows an internal structure of LUT storing the data for determining the control characteristics in the "full auto photographing mode" as above described, and FIG. 15 is a transition diagram of control parameters corresponding to the object illuminance or photographing luminance, which transition is performed based on the LUT of FIG. 14, like the program diagram as shown in FIGS. 9 and 10.

This "full auto photographing mode" is an automatic photographing mode capable of making the proper photographing under almost all normal photographing conditions. To this end, there are provided a plurality of data tables corresponding to the photographing situations as will be described later to widely cope with a variety of photographing situations.

Figure 17:
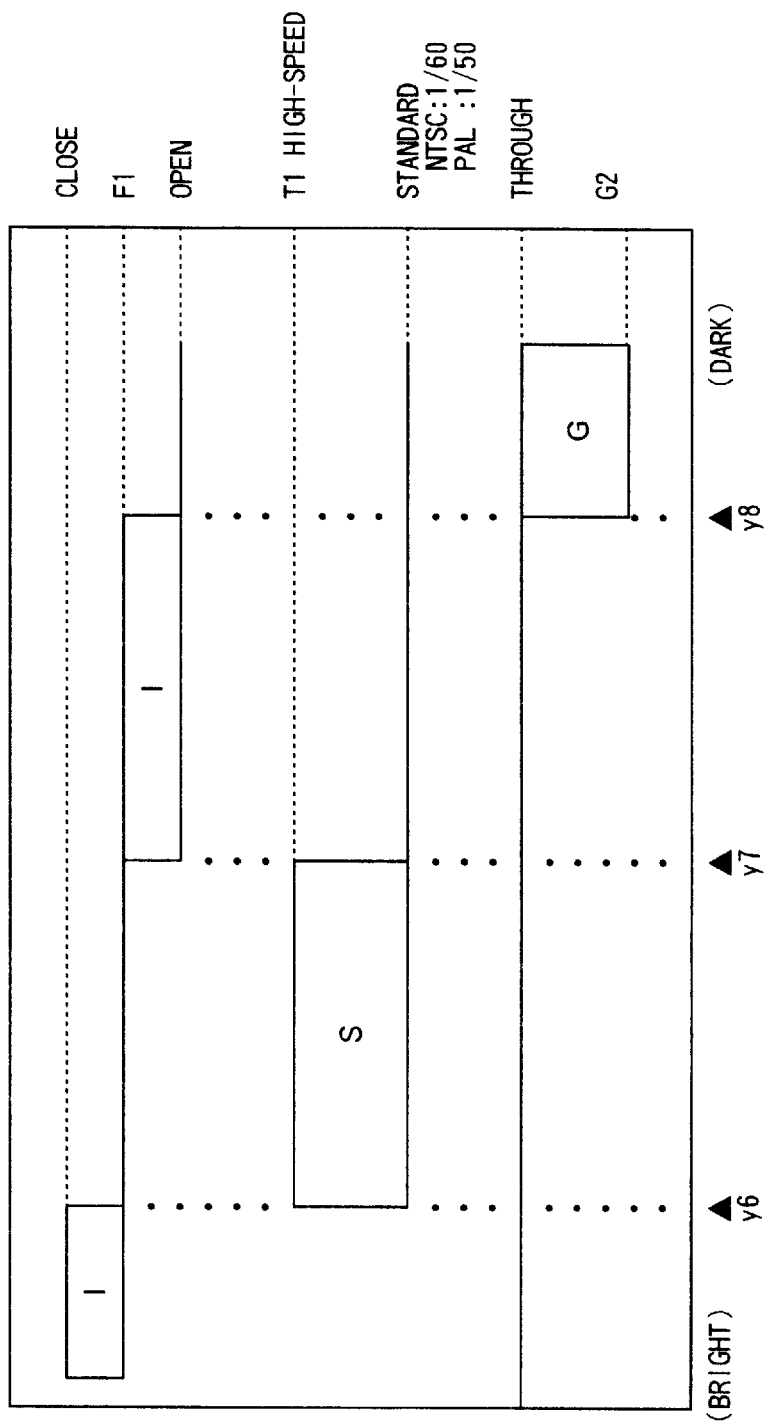
FIG. 17 is a program diagram for explaining the parameter processing based on FIG. 14 in accordance with the "full auto photographing mode" in this invention.

FIG. 16 shows an internal structure of LUT storing the data for determining another control characteristics to be referenced in a photographing situation different from that of the LUT of FIG. 14, in the same "full auto photographing mode", and FIG. 17 is a transition diagram of control parameters corresponding to the object illuminance or photographing luminance, which transition is carried out based on the LUT of FIG. 16, like the program diagram as shown in FIGS. 9 and 10.

It should be noted herein that FIGS. 14 and 15 show an indoor photographing mode suitable for the indoor photographing having the flicker, for example, and FIGS. 16 and 17 show a photographing mode suitable for a case of no flicker.

The transition diagram of control parameters of FIG. 15 is subdivided into six areas by five thresholds y1 to y5 in accordance with the value of input luminance level, each control parameter of I, S, G being set in each area, and as shown to the right in the same figure, the iris is varied from CLOSE through a predetermined value F1 to OPEN, the shutter is varied from high speed T1 through $\frac{1}{100}$sec T2 for flicker countermeasure to standard $\frac{1}{60}$ sec STANDARD, and the gain is varied from ±0dB THROUGH through a predetermined value G1 to a larger value G2. In the same figure, I, S and G are ranges of variable parameter involved.

Also, the transition diagram of control parameters of FIG. 17 is conceptually the same as that of FIG. 15, with the exception that the diagram is subdivided into four areas by three thresholds y6 to y8 in accordance with the value of input luminance level, for which area each control parameter is set.

That is, in this invention, if the full auto mode is set by the operation unit 20, the flicker in the image pickup signal is detected by the system control circuit 25, and the LUT is automatically switched to the optimal one of FIGS. 14 and 16, depending on the presence or absence of the flicker, so that in the single program photographing mode, the LUT can be appropriately switched in accordance with the photographing condition so as to always cope with any photographing condition. It will be appreciated that another LUT can be prepared in accordance with another photographing condition, rather than the flicker.

In the following, each parameter will be described in order.

(P1: iris control parameter)

The iris control parameter varies depending on the input parameter Y or the luminance level, and a function f(y) is defined as its attribution.

If the input luminance level is higher than a threshold y1 as shown in FIG. 15, the calculation is necessary as indicated by "→CAL", as will be seen from the data column to the right of FIG. 14.

The premise in this case is that the luminance is quite high, whereby the shutter speed is set slightly higher to prevent the decrease of resolution caused by the diffraction phenomenon of the light due to a small stop of the iris, so that the iris is set not to be too small, and the time setting T1 is such that the reflected component (what is called the flicker) in a direction of the time axis is not conspicuous, and the AGC gain is set at ±0dB (THROUGH) so that the S/N ratio is not degraded.

When the input luminance level lies between y1 and y2, the iris is fixedly set at an iris value F1, and the calculation is unnecessary, as indicated by "F" in the data column of FIG. 14. The value of F1 desirably is an iris value large enough to cause the diffraction phenomenon as above described.

When the input luminance level lies between y2 and y3, the calculation is necessary, as indicated by "→CAL". This is an area having the widest exposure range to be controlled by the iris.

As to other parameters, when the AGC gain is ±0dB and the flicker of a fluorescent lamp exist as shown in FIG. 15, the shutter speed is fixed at 1/100 second in NTSC or 1/60 second in PAL to cancel the variation of illumination energy of the fluorescent lamp owing to the AC power source, while when no flicker exists (FIGS. 16 and 17), the shutter speed is set at 1/60 second (NTSC) or 1/50 second (PAL) which is a standard television rate to secure the exposure time.

In FIGS. 14 and 15, when the luminance level is y3 or less, the setting of opening the iris is indicated by "→OPEN". Since the luminance is decreasing under this condition, the AGC gain is raised to the extent that the S/N degradation is not remarkable, and if the shutter speed is higher than the standard rate, the shutter speed is gradually decreased to the slowest standard rate.

In this way, for the iris, the control characteristic of the iris is defined with respect to the value of input parameter by dividing the entire area from high luminance to low luminance into four sections by three thresholds y1, y2, and y3.

(P2: shutter control parameter)

The shutter control parameter defines a luminance function f(Y) for the input parameter by the use of thresholds y1 to y5.

When the input luminance level is higher than y1, "→T1" is defined, so that the shutter speed is fixedly set at a high speed T1. In this case, the calculation is unnecessary.

Herein, T1 is set slightly higher to deal with a small stop, for example, in a range from 1/125 to 1/500 second, as previously described.

When the input luminance level lies between y1 and y2, "→CAL" is set, whereby the optimal shutter speed is calculated in accordance with the input luminance level, and the setting of parameter value is unnecessary.

Since the iris is once fixed at an iris value not causing the diffraction phenomenon as a measure of the small stop, it is necessary to set the shutter speed faster by the amount corresponding to the increase in the quantity of light. To this end, the above calculation is performed.

Also, when the input luminance level lies between y2 and y4, the shutter speed is fixedly set at a value T2. In this case the calculation is unnecessary.

This value T2 corresponds to a light accumulation time for preventing the flicker in the fluorescent lamp, and is set at 1/100 sec. in NTSC, or 1/60 sec. in PAL. However, under the condition where no flicker of the fluorescent lamp occurs, the photographing is controlled to be performed more excellently by adjusting the light accumulation time to be extended toward a standard value of the television signal.

Thus, FIG. 16 shows another LUT in view of no flicker, which defines the control characteristics that the shutter speed is never stopped at T2, and is used under no flicker condition of fluorescent lamp, while FIG. 17 shows the transition with respect to the luminance level which is an input parameter for three parameters. These figures can be understood in the same aspect as in FIGS. 14 and 15, and the detail explanation is omitted.

Note that the presence or absence of the flicker in the fluorescent lamp can be judged by monitoring each field at the luminance level in the system control circuit 25 in such a manner that if the periodical level variation is detected, there is flicker, and if the luminance level is almost stable for each field, there is no flicker.

The system control circuit 25 operates to perform the optimal control in accordance with the photographing situation by using either of two LUTs selectively in the same program mode called the full auto photographing mode, depending on the presence or absence of the flicker.

When the input luminance level lies between y4 and y5, "→CAL" is set, whereby the optimal shutter speed is calculated, and the setting of parameter value is performed.

That is, the shutter speed is set at a higher value than the standard television rate as a flicker countermeasure, but at the lower illuminance, it is important to perform the photographing at a slower shutter speed, whereby the above calculation is performed to set this low speed.

Around this area, the shutter speed can be set minutely for one step, so that the video image will not produce any different sense even if the shutter speed changes continuously.

If the input luminance level is y5 or less, "→standard value" is specified, so that the shutter speed is set at a standard value of the television signal, this standard value being 1/60 second in NTSC or 1/50 second in PAL.

In this state, only the AGC gain remains as a controllable parameter, whereby the exposure control is performed by raising the gain up in a permissible range of S/N degradation.

(P3: AGC gain)

When the AGC gain is a parameter to be processed, an input luminance function f(Y) is defined by a plurality of thresholds, in which when the input luminance level is higher than y3, "±0dB" is specified, whereby the AGC gain is fixed at ±0dB, and the setting of gain without providing amplification effect is made. This is because when the exposure control is allowed by the iris and the shutter, the S/N degradation is prevented by fixing the AGC gain, and the calculation is unnecessary in this case.

When the input luminance level lies between y3 and y4, "→CAL" is specified, whereby the optimal AGC gain is obtained by calculation, and the gain control parameter is set.

When the input luminance level lies between y4 and y5, the AGC gain is fixedly specified at a predetermined value G1. In this case the calculation is unnecessary.

Further, when the input luminance level is y5 or less, "→CAL" is specified so that the optimal AGC gain is calculated, and the gain control parameter is set.

The relation between the threshold definition and three parameters will be clearly seen from FIGS. 15 and 17. When no flicker exists in FIG. 15, the whole diagram is subdivided into six areas by five thresholds y1 to y5, and the parameters to be calculated are distributed so that only one parameter exists in each area, as shown in FIGS. 9 and 10, in the order of the iris (I), the shutter (S), the iris (I), the gain (G), the shutter (S), and the gain (G) from the side of higher luminance.

Also, when no flicker exists as shown in FIG. 17, the whole diagram is subdivided into four areas by the thresholds y6 to y8, and the parameters to be calculated are distributed so that only one parameter exists in each area in the order of I, S, I, G from the higher luminance side.

(P4: AE weighting parameter=setting of photometry range weighting)

As shown in FIGS. 7 and 8, this is a parameter for setting the photometry range distribution and their weighting within the image pickup plane, and stored in the form of a MAP, with the attribution being fixed, as seen from FIG. 14. That is, the attribute is different depending on the LUT according to the photographing mode, but fixed in one image pickup mode without being dependent upon the luminance signal level.

In this embodiment, the weighting is applied directly as the MAP to each of twenty four areas in the image pickup plane. In this full auto mode, 1.0 is allocated to central eight areas of 2×4, and 0.5 is allocated to peripheral sixteen areas to be a smaller factor than in the central areas, whereby the photometry range is specified as "central priority photometry" as shown in FIG. 7.

(P5: AE reference value parameter)

The AE reference value parameter shows the luminance level which is a reference for the exposure control, and is stored in the definition of numerical values. Based on this reference value, the excess or shortage of the exposure is judged, and this reference value is set at 50IRE in this embodiment. This parameter is constant in the photographing mode without being dependent upon the input luminance level.

(P6: image quality parameter adjustment parameter)

This is a parameter for specifying the image quality adjustment with the aperture control as previously described, and the content of processing is defined by a code, the attribute being fixed and set in accordance with the photographing mode without any change dependent upon the input luminance level.

In the full auto mode, "NORMAL" is specified, and the basic image quality is set at a standard value, without any special processing.

(P7: image effect processing parameter)

This is a parameter for specifying the image processing such as a fade as shown in FIG. 13, and the content of processing is defined by a code.

In the full auto mode, "NORMAL" is specified, and the basic image quality is set at a standard value, without any special processing.

The attribute is fixed and set in accordance with the photographing mode without any change dependent upon the input luminance level.

In this way, the definition and characteristics for parameters necessary for the control are stored in the data table LUT provided for each photographing mode in this invention, and a plurality of LUTs are provided corresponding to photographing modes and can be selected in accordance with the specified photographing mode, whereby the optimal control can be always made in any photographing situation and photographing environment.

Next, the setting and the control of "portrait photographing mode" in which a figure is supposed to be photographed will be described below.

The "portrait photographing mode" is set by the operation of the operation unit 20, and is fundamentally a photographing mode based on the central priority photometry in which the weighting is applied to the photometry range as shown in FIG. 7. The internal structure of the data table LUT storing the definition and characteristics of various control parameters necessary for the control which is referenced when the mode is selected is shown in FIG. 18.

The program diagram showing the operation of various control parameters defined and set in this LUT is shown in FIG. 19. The same figure shows the transition of each control parameter in the program diagram with respect to the luminance level of input parameter. The actual program diagram is depicted as in FIGS. 9 and 10, but for the simplicity, the operation range can be shown sequentially in the order of iris, shutter speed and gain from upward, as in FIGS. 14 and 15.

That is, in FIG. 19, two thresholds y1, y2 are provided for the object illuminance in the transversal axis which is an input parameter, whereby the whole diagram is subdivided into three areas, I indicating the iris control parameter (P1), S indicating the shutter speed control parameter (P2), and G indicating the gain control parameter (P3), and as shown to the right in the same figure, the iris control parameter (P1) is varied between CLOSE and OPEN, the shutter speed control parameter (P2) is varied between high speed (T1) and a standard 1/60 sec, and the gain control parameter (P3) is varied between ±0dB amplification factor (THROUGH as the input signal is directly output) and a predetermined value G1.

Note that the value of each parameter is varied by calculation in accordance with the luminance level which is an input parameter in the variable region, like the program diagram as shown in FIGS. 9 and 10.

In this portrait mode, the object is supposed to be a figure, and accordingly, the shallow depth of field is stressed.

In the following, each parameter will be described in the order.

(P1: iris control parameter)

The iris control parameter varies depending on the input parameter Y or the luminance level, and a function f(y) is defined as its attribution.

If the input luminance level is higher than a threshold y1 as shown in FIG. 19, the calculation is necessary as indicated by "→CAL", as will be seen from the data column to the right of FIG. 18.

To secure the S/N at high luminances, the iris is controlled to be fully opened to an open value beforehand, with the AGC gain being ±0dB (THROUGH), in consideration of a small stop countermeasure against the degradation of resolution caused by the light diffraction phenomenon due to the small stop of the iris.

If the input luminance level is y1 or less, "→OPEN" is designated to control the iris to be opened.

By controlling the iris in this way, it is set at the shallowest depth of field, whereby an object such as a figure to be photographed can be made in contrast to the background. This state is a basic state of control characteristics in the portrait photographing mode.

In this way, the control characteristics of the iris are defined by dividing the entire region ranging from high to low luminance into two sections at one threshold y1.

(P2: shutter control parameter)

The shutter control parameter defines a luminance function f(Y) for the input parameter by the use of thresholds y1 and y2.

When the input luminance level is higher than y1, "→T1" is specified, so that the shutter speed is fixedly set at a high speed T1. In this case, the calculation is unnecessary.

Herein, T1 is set at a slightly higher shutter speed, because of the shallow depth of field, in addition to the small stop countermeasure, as previously described.

In practice, it is selected in the range from about 1/250 to 1/4000 second.

Also, at this step, it is controlled without increasing the AGC gain if possible, even with the low luminance to improve the S/N.

When the input luminance level lies between y1 and y2, "→CAL" is set, whereby the optimal shutter speed is calculated in accordance with the input luminance level, and the setting of control parameter value is made.

Herein, the variable width of the control is between the T1 as previously described and the standard screen frequency of television (standard value).

If the input luminance level is y2 or less, "→standard value" is specified, so that the shutter speed is set at a standard value of the television signal.

This standard value of television signal referred to herein is 1/60 second in NTSC or 1/50 second in PAL.

In this state, only the AGC gain remains as a controllable parameter, whereby the exposure control is performed by raising the gain up in a permissible range of S/N degradation.

(P3: AGC gain)

When the AGC gain is a parameter to be processed, an input luminance function f(Y) is defined by a plurality of thresholds, in which when the input luminance level is higher than y2, "±0dB" is specified, whereby the AGC gain is fixed at ±0dB, and the setting of gain without providing amplification effect is made. This is because when the exposure control is allowed by the iris and the shutter, the S/N degradation is prevented by fixing the AGC gain, and the calculation is unnecessary in this case.

Since this interval is set to occupy most of the range for the object illuminance, the image pickup with the excellent S/N is allowed over the entire region.

When the input luminance level is y2 or less, "→CAL" is specified, so that the optimal AGC gain is obtained by calculation, and the gain control parameter is set.

Other parameters have been already set for a measure against low illuminance to the most extent, so that the controllable parameter left in this state is only an AGC gain, whereby the exposure control is performed by raising the gain up within a permissible range in consideration of the degradation of the S/N.

The relation between three areas divided by thresholds y1, y2 and three control parameters will be clear from FIG. 19, and the parameters to be calculated are distributed so that only one parameter exists in each area, whereby the simplification of calculation is made, the arrangement being I, S, G from the area on the higher luminance side.

(P4: AE weighting parameter=setting of photometry range weighting)

As shown in FIGS. 7 and 8, this is a parameter for setting the photometry range distribution and their weighting within the image pickup plane, and stored in the form of a MAP, with the attribution being fixed, as seen from FIG. 18. That is, the set value depends on the LUT according to the photographing mode, but is fixed in one image pickup mode without being dependent upon the luminance signal level.

In this embodiment, the weighting is applied directly as the MAP to each of twenty four areas. In this portrait photographing mode, 1.0 is allocated to central eight areas of 2×4, and 0.5 is allocated to peripheral sixteen areas to be a smaller factor than in the central areas, whereby the photometry range is specified as "central priority photometry" as shown in FIG. 7.

(P5: AE reference value parameter)

The AE reference value parameter shows the luminance level which is a reference for the exposure control, and is stored in the definition of numerical values. Based on this reference value, the excess or shortage of the exposure is judged, and this reference value is set at 50IRE in this embodiment. This parameter is constant in the photographing mode without being dependent upon the input luminance level.

(P6: image quality adjustment parameter)

This is a parameter for specifying the image quality adjustment with the aperture control as previously described, and the content of processing is defined by a code, the attribute being fixed and set in accordance with the photographing mode without any change dependent upon the input luminance level.

If "NORMAL" is specified, the basic image quality is a standard value, without any special image processing, and if "SOFT" is specified, the frequency characteristics are changed for a standard value of the basic image quality.

The setting in the portrait photographing mode is "SOFT", and specifically, by designating the frequency involved in the sharpness of visual characteristics of a figure, or the frequency characteristics with decreased response near 2 MHz to 3 MHz for the television as previously described, soft image quality can be obtained.

(P7: image effect processing parameter)

This is a parameter for specifying the image processing such as a fade as shown in FIG. 13, and the content of processing is defined by a code.

If "NORMAL" is specified, the basic image quality is set at a standard value, without performing any special processing.

In this portrait photographing mode, "WHITE-FADE" is specified, and has the effect of making the entire screen gradually white by activating a white fade circuit which is normally used in changing of the scene. Specifically, the circuit as shown in FIG. 11 is instructed by the system control circuit 25 so that the white color is generated in the color signal generator 30, and can be operated in such a manner that the switch is changed to the 30 side, and the multiplication factor is set at a value of about 0.1 to 0.5 so that the mixture ratio of white is more or less 30%.

The attribute of this parameter is fixed and set in accordance with the photographing mode without any change dependent upon the input luminance level.

In this way, in the portrait photographing mode, the central priority photometry is used for the photographing, and the image plane can be configured such that the open stop is given priority, the depth of field is shallow, and the background is obscured. Consequently, a main object such as a figure can be made in contrast to the background, the optimal automatic photographing for the portrait photographing can be made, and the joint use of the image quality adjustment and the image processing is quite effective.

In this way, the definition and characteristics for parameters necessary for the control are stored in the data table LUT of this invention, and a plurality of LUTs are provided corresponding to photographing modes and can be selected in accordance with the specified photographing mode, whereby the optimal control can be always made in any photographing situation and photographing environment.

Thus, the portrait photographing mode has been described with the data table LUT storing the control parameters defined and the operation characteristics of control parameters set therein.

Next, "sport photographing mode" will be described for the internal structure of the data table LUT and the control of control parameters set therein.

The "sport photographing modes" is a photographing mode suitable for a frequently moving object or rapidly moving object, which is selected by the operation of the operation unit 20, and is fundamentally a photographing mode based on the central priority photometry having the weighting applied to the photometry range as shown in FIG. 7. The internal structure of the data table LUT storing the definition and characteristics of various control parameters necessary for the control which is referenced when the mode is selected is shown in FIG. 20.

The program diagram showing the transition of various control parameters defined and set in this LUT with respect to the luminance level of input parameter is shown in FIG. 10. In the following explanation, to clarify the correspondence with the data table LUT, the control parameter transition diagram showing the operation range of control parameters with respect to the input luminance as the input parameter is used, as shown in FIG. 21.

Figure 21:
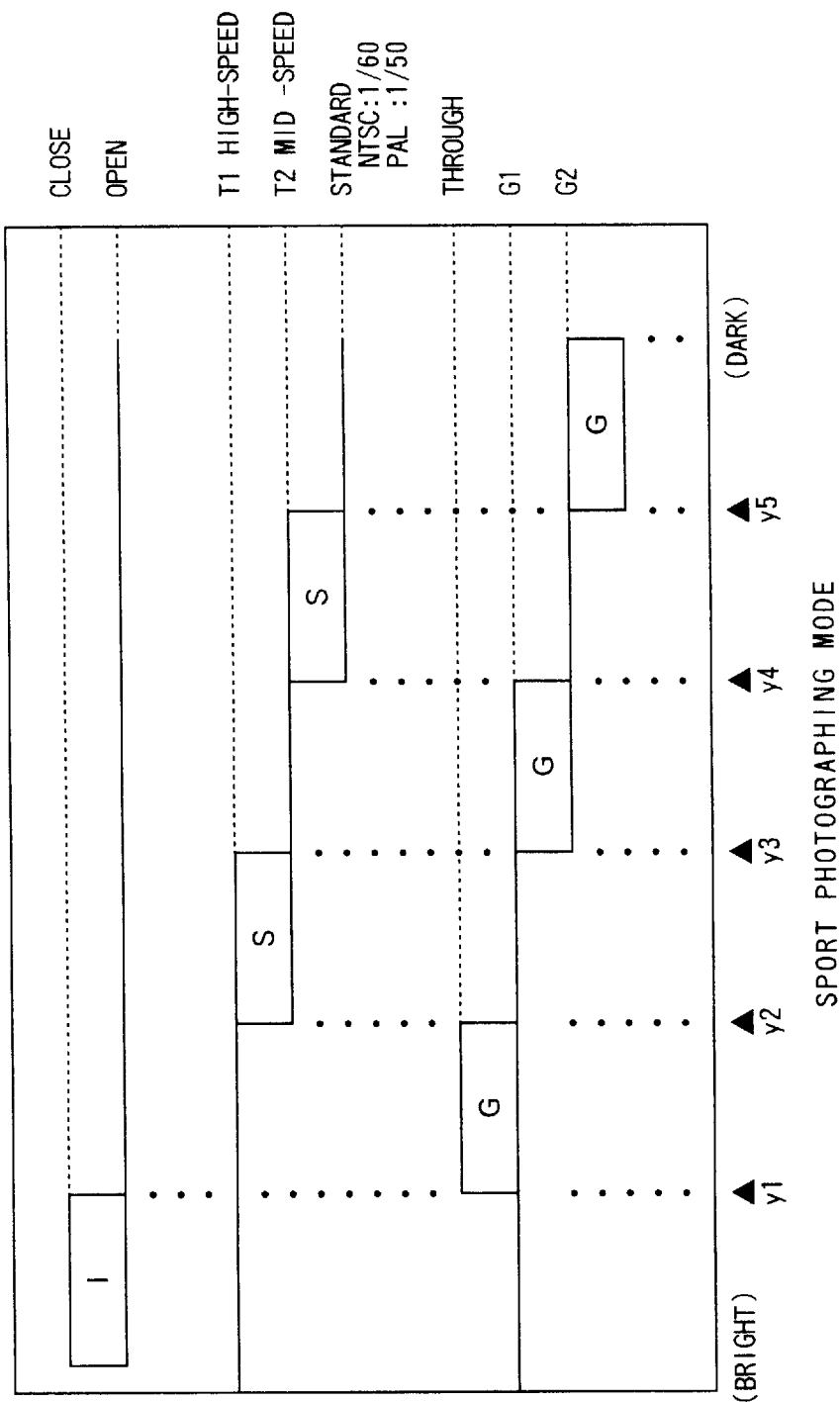
FIG. 21 is a program diagram for explaining the parameter processing in accordance with "sport photographing mode" in this invention.

That is, in FIG. 21, five thresholds y1 to y5 are provided for the object illuminance in the transversal axis which is an input parameter, whereby the whole diagram from high to low luminance is subdivided into six areas, in each of which one parameter for I: iris control parameter (P1), S: shutter speed control parameter (P2), or G: gain control parameter (P3) is set, and as shown to the right in the same figure, the iris control parameter (P1) is varied between CLOSE and OPEN, the shutter speed control parameter (P2) is varied between high speed (T1), medium speed T2, and standard 1/60 sec. (NTSC) STANDARD, and the gain control parameter (P3) is varied between ±0dB THROUGH, a predetermined value G1 and a greater G2. In the same figure, I, S and G indicate variable ranges of corresponding parameters.

In the following, each control parameter set in the data table for the landscape photographing mode will be described in order.

(P1: iris control parameter)

The iris control parameter varies depending on the input parameter Y or the luminance level, and a function f(y) is defined as its attribution.

If the input luminance level is higher than a threshold y1 as shown in FIG. 21, the calculation is necessary as indicated by "→CAL", as will be seen from the data column to the right of FIG. 20.

To secure the S/N at high luminances, the iris is controlled to be fully opened beforehand from the least stop to an open value, with the AGC gain being ±0dB (THROUGH), in consideration of the small stop countermeasure against the degradation of resolution caused by the light diffraction phenomenon due to the small stop of the iris.

If the input luminance level is y1 or less, "→OPEN" is designated to control the iris to be opened.

Since the light quantity will be insufficient for the shutter speed being currently set in this state, the AGC gain is first raised up to the extent that the S/N degradation is not very conspicuous, and the shutter speed is set at a value as high as possible, whereby a rapidly moving object can be dealt with.

In this way, the control characteristics of the iris are defined by dividing the entire region ranging from high to low luminance into two sections at one threshold y1.

(P2: shutter control parameter)

The shutter control parameter defines a luminance function f(Y) for the input parameter by the use of a plurality of thresholds.

When the input luminance level is higher than y2, "→T1" is specified, so that the shutter speed is set at a predetermined high speed T1. Accordingly, in this area, the calculation of shutter speed with respect to the input luminance is unnecessary.

Herein, T1 is set at a slightly higher shutter speed for a small stop countermeasure, as previously described, but in most cases, the practical value of T1 is selected in the range from about 1/250 to 1/1000/ second.

At this step, the shutter speed is fixed at T1, and the decrease of the luminance is compensated by opening the iris to an open value, but the light quantity is insufficient in the area between y1 and y2 as the iris is fully opened at y1. However, since the shutter speed is maintained at a speed as high as possible, the AGC gain is raised in a permissible range of the S/N degradation.

When the input luminance level lies between y1 and y2, "→CAL" is specified, whereby the optimal shutter speed is calculated and the setting of control parameter value is made. Herein, the variable width of control is between T1 and T2.

As a criterion for setting T2, the shutter speed is required to be capable of photographing a moving object substantially clearly.

In the area between y3 and y4, it is instructed that the shutter speed is fixed at T2. In this area, the calculation is unnecessary. The processing of the AGC gain is the same as in the area of y1 to y2 as previously described.

When the input luminance level lies between y4 and y5, "→CAL" is specified, whereby the optimal shutter speed is calculated in accordance with the input luminance and the control parameter value is set in a range of T2 or less.

That is, since the luminance level has already decreased considerably in this area, it is not preferable that the AGC gain is further increased from the viewpoint of the S/N of image, whereby the shutter speed must be shifted to the lower speed side at the expense of the resolution of the moving object.

Around this area, the shutter speed can be set minutely for one step, so that the video image will not produce any different sense even if the shutter speed changes continuously.

If the input luminance level is y5 or less, "→standard value" is specified, so that the shutter speed is set at a standard value of the television signal.

The standard value of television signal referred to herein is 1/60 second in NTSC or 1/50 second in PAL.

In this state, only the AGC gain remains as a controllable parameter, and is raised up in a permissible range of the S/N degradation, whereby the exposure control is performed.

(P3: AGC gain)

When the AGC gain is a parameter to be processed, an input luminance function f(Y) is defined by a plurality of thresholds y, in which when the input luminance level is higher than y1, "→0dB" is specified, whereby the AGC gain is fixed at ±0dB, and the setting of gain without providing amplification effect in the AGC circuit is made. This is because when the exposure control is allowed by the iris and the shutter, the S/N degradation is prevented by fixing the AGC gain, and the calculation is unnecessary in this case.

When the input luminance level lies between y1 and y2, "→CAL" is specified, whereby the optimal AGC gain with respect to the input luminance is obtained by calculation, and the gain control parameter is set.

When the input luminance level lies between y2 and y3, the AGC gain is fixedly specified at a predetermined value G1. In this case the calculation is unnecessary.

When the input luminance level lies between y3 and y4, "→CAL" is specified, whereby the optimal AGC gain with respect to the input luminance is obtained by calculation, and the gain control parameter is set.

When the input luminance level lies between y4 and y5, the AGC gain is fixedly specified at a predetermined value G2 which is higher than G1. In this case the calculation is unnecessary.

Further, when the input luminance level is y5 or less, "→CAL" is specified so that the optimal AGC gain is calculated, and the gain control parameter is set.

FIG. 21 shows the relation between the three parameters with the luminance in the transversal axis, in which the whole diagram is subdivided into six areas by five thresholds y1 to y5, and the parameters to be calculated are distributed so that only one parameter exists in each area. Therefore, the calculation is simplified, so that the extension of calculation scale can be suppressed even if the control parameters increase, and the calculation speed can be increased. The parameters to be calculated are in the order of I, G, S, G, S from the side of high luminance, in which the part "G, S" is repeated many times as necessary, whereby a more precise setting is allowed.

As above described, the whole operation is performed in such a sequence that the iris control is performed on the high luminance side, and the gain and the shutter are controlled alternately in the areas delimited by the appropriate variable width.

In the following, specific examples of each parameter will be listed below when the entire region is further subdivided into 10 areas.

| Area | Iris | Shutter | Gain |
| --- | --- | --- | --- |
| (Highest luminance | CLOSE | 1/1000 | ±0 dB) |
| No. 1 | CLOSE to OPEN | 1/1000 | ±0 dB |
| No. 2 | OPEN | 1/1000 | |
| No. 3 | OPEN | | +3 dB |
| No. 4 | OPEN | 1/500 | |
| No. 5 | OPEN | | +6 dB |
| No. 6 | OPEN | 1/250 | |
| No. 7 | OPEN | | +9 dB |
| No. 8 | OPEN | 1/125 | |
| No. 9 | OPEN | | +12 dB |
| No. 10 | OPEN | 1/60 | |
| (Lowest illuminance | OPEN | 1/60 | +15 dB) |

(P4: AE weighting parameter=setting of photometry range weighting)

As shown in FIG. 7, this is a parameter for setting the photometry range distribution and their weighting within the image pickup plane, and is stored in the form of a MAP, with the attribution being fixed, as seen from FIG. 20. That is, the set value depends on the LUT according to the photographing mode, but is fixed in one image pickup mode without being dependent upon the input luminance signal level.

In this embodiment, twenty four calculation factors are allocated directly as the MAP to respective twenty four areas.

In this "sport photographing mode", 1.0 is allocated to central eight areas of 2×4, and 0.5 is allocated to peripheral sixteen areas to be a smaller factor than in the central areas, whereby the photometry range is specified as "central priority photometry" as shown in FIG. 7.

(P5: AE reference value parameter)

The AE reference value parameter shows the luminance level which is a reference for the exposure control, and is stored in the definition of numerical values. Based on this reference value, the excess or shortage of the exposure is judged, and this reference value is set at 50IRE in this embodiment. This parameter attribute is constant in the photographing mode without being dependent upon the input luminance level.

(P6: image quality adjustment parameter)

This is a parameter for specifying the image quality adjustment with the aperture control as previously described, and the content of processing is defined by a code, the attribute being fixed and set in accordance with the photographing mode without any change dependent upon the input luminance level.

If "NORMAL" is specified, the basic image quality is a standard value, without any special image processing such as changing the image quality with the aperture control as previously described.

(P7: image effect processing parameter.)

This is a parameter for specifying the image processing such as a fade as shown in FIG. 13, and the content of processing is defined by a code.

"NORMAL" is specified, whereby the basic image quality is set at a standard value, without performing any special processing.

The attribute of this parameter is fixed, and set in accordance with the photographing mode, without any change dependent upon the input luminance level.

In this way, the "sport photographing mode" can implement the automatic exposure control in the high speed shutter priority, and allows for clear, excellent photographing without any blurring for a frequently moving object or rapidly moving object.

Thus, the sport photographing mode has been described with the data table LUT having the control parameters defined and the operation characteristics of control parameters set therein.

Next, the internal structure of the data table LUT for the "landscape photographing mode" and the control of control parameters as set in the LUT will be described below.

This landscape photographing mode supposes that the object is a landscape, so that there is less possibility that the flicker or a rapidly moving object exists as previously described, but the high luminance portion such as a space may possibly exist in the image plane information, as shown in FIG. 8, whereby it is necessary to set the control parameters in accordance with the object by varying the setting of photometry range such that the weighting factors upward of the image plane are smaller and those downward thereof are larger.

The "landscape photographing mode" is set by the operation of the operation unit 20. The internal structure of the data table LUT storing the definition and characteristics of various control parameters necessary for the control is shown in FIG. 22.

The program diagram showing the transition of each control parameter defined and set in the LUT with respect to the luminance level of input parameter is shown in FIG. 24. The actual program diagram is depicted as in FIGS. 9 and 10, but in FIG. 24, for simplicity, the operation range is shown sequentially in the order of iris, shutter speed and gain from the side of higher illuminance.

That is, in the same figure, I indicates the iris control parameter (P1), S indicates the shutter speed control parameter (P2), and G indicates the gain control parameter (P3), and as shown to the right in the figure, the iris control parameter (P1) is varied between CLOSE and OPEN, the shutter speed control parameter (P2) is constant, and the gain control parameter (P3) is varied between ±0dB amplification factor 1 (THROUGH as the input signal is directly output) and a predetermined value G1. Note that the value of each parameter is varied in accordance with the luminance level which is an input parameter in the variable region, like the program diagram as shown in FIGS. 9 and 10.

In the landscape photographing mode, the flicker or a rapidly moving object rarely exists, whereby the shutter speed (P2) is fixed at a standard 1/60 second, and the iris is mainly controlled, and after the iris has been opened, the gain (P3) is controlled.

That is, as shown in the same figure, the controllable range of parameter with respect to the object luminance value of input parameter is subdivided into two areas by a threshold y. The shutter speed (P2) is fixed at 1/60 second without respect to the object luminance of input parameter, the AGC gain (P3) is fixed at ±0dB until the luminance decreases down to y, whereby the iris is only controlled. After the iris is fully opened at the luminance of y or less, the AGC gain is changed so that the optimal exposure control is performed.

In this way, it is possible to make the optimal exposure control in all photographing situations by preparing a plurality of program modes corresponding to the photographing situations, and appropriately selecting one of them with the key operation on the operation unit 20.

Note that when the photographing program mode is switched in the operation unit 20, the setting of photometry range in the image pickup plane is also changed at the same time as previously described.

In the following, each control parameter set within the data table for the landscape photographing mode will be described below.

(P1: iris control parameter)

The iris control parameter varies depending on the input parameter Y or the luminance level, and a function f(y) is defined as its attribution.

If the input luminance level is higher than a threshold y1 as shown in FIG. 22, the calculation is necessary as indicated by "→CAL", as will be seen from the data column to the right of FIG. 20.

To secure the S/N at high luminances, the iris is controlled from the least stop to an open value, with the AGC gain being ±0dB (THROUGH).

If the input luminance level is y1 or less, "→OPEN" is designated to control the iris to be opened.

It is considered that the illuminance is considerably low in this state, and this is an area where when the photographing is preferentially continued at the expense of the S/N degradation, the AGC gain is raised to cope with the situation.

In this way, the control characteristics of the iris are defined by dividing the entire region ranging from high to low luminance into two sections at one threshold y1.

(P2: shutter control parameter)

The shutter control parameter is always fixed at a constant value without respect to the input luminance level, with the attribute fixed, because there is less possibility that the flicker or a rapidly moving object exists and the depth of field is not necessary to be shallow, in which the "→standard" is designated so that the shutter speed is set at a standard value of television specification. The calculation is unnecessary.

This standard value of television signal referred to herein is 1/60 second in NTSC or 1/50 second in PAL.

(P3: AGC gain)

When the AGC gain is a parameter to be processed, an input luminance function f(Y) is defined by a threshold y, in which when the input luminance level is higher than y1, "±0dB" is specified, whereby the AGC gain is fixed at ±0dB, and the setting of gain without providing amplification effect in the AGC circuit is made. This is because when the exposure control is allowed by the iris and the shutter, the S/N degradation is prevented by fixing the AGC gain, and the calculation is unnecessary in this case.

Since this interval is set to occupy most of the range for the object illuminance, the image pickup with the excellent S/N is allowed over the entire region.

When the input luminance level is y1 or less, "→CAL" is specified, so that the optimal AGC gain is obtained by calculation, and the gain control parameter is set.

In this state, the illuminance is considerably low, and this is an area where when the photographing is preferentially continued at the expense of the S/N degradation of image, the AGC gain is raised to cope with the situation.

Other parameters have been set for the countermeasure against low illuminance to the most extent, so that the controllable parameter left in this state is only the AGC gain, whereby the exposure control is performed by raising the gain up within a permissible range in consideration of the degradation of the S/N.

The relation between two areas divided by a threshold y1 and three control parameters will be clear from FIG. 24, and the parameters to be calculated are distributed so that only one parameter exists in each area, whereby the simplification of calculation is made, the arrangement being I, G from the area on the higher luminance side.

(P4: AE weighting parameter=setting of photometry range weighting)

As shown in FIGS. 7 and 8, this is a parameter for setting the photometry range distribution and their weighting within the image pickup plane, and stored in the form of a MAP, with the attribution being fixed, as seen from FIG. 22.

That is, the set value is different depending on the LUT according to the photographing mode, but is fixed in one photographing mode without being dependent upon the luminance signal level.

In this embodiment, twenty four calculation factors are allocated directly as the MAP to respective twenty four divided areas. In this "landscape photographing mode", 0.0 is allocated to uppermost six areas of 1×6, 0.5 is allocated to the next upper six areas of 1×6 to be a smaller factor than in the uppermost areas, and 1.0 is allocated to lower half areas of 2×6, whereby the photometry range is specified as "lower priority photometry" as show in FIG. 8.

Thereby, it is possible to prevent the obscured shadow detail of an object from occurring due to influence by the high luminance such as the sky.

Figure 1:
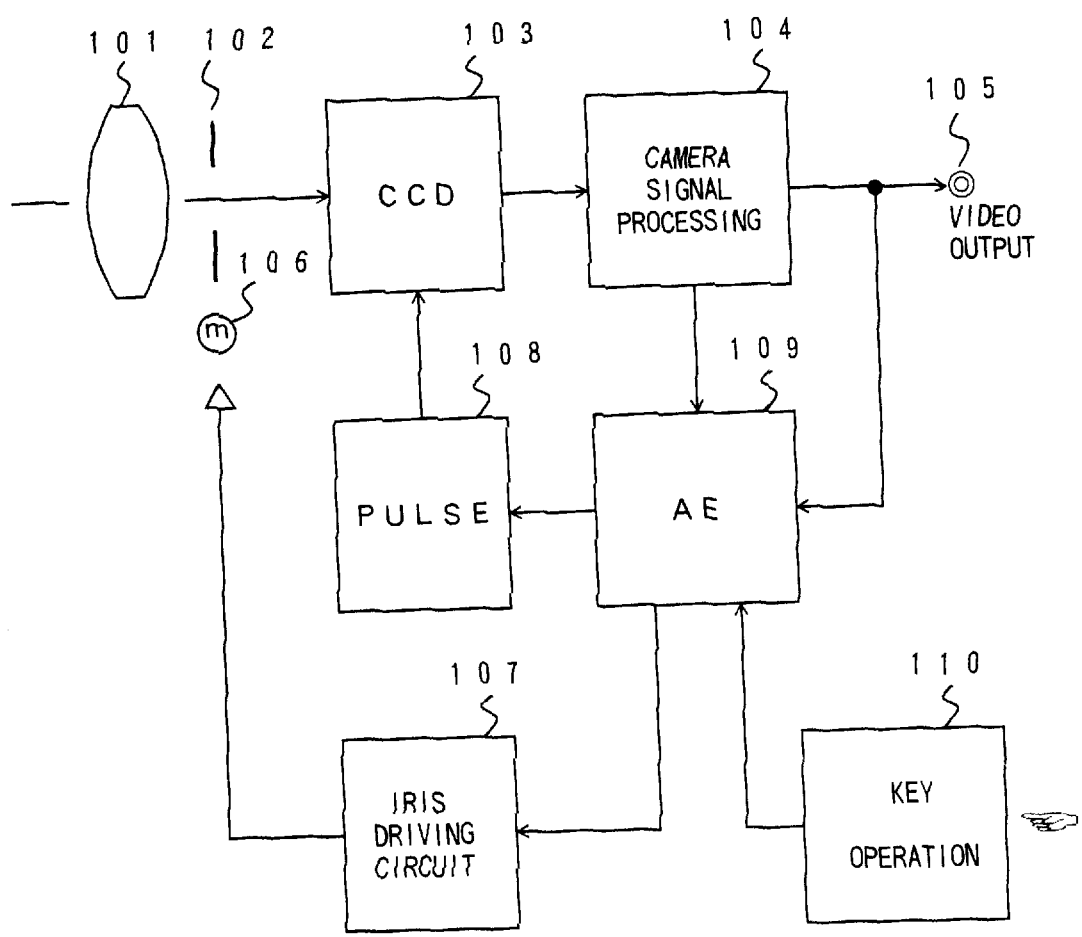
FIG. 1 is a block diagram showing a configuration of a typical image pickup device applied to an exposure control device of a video camera.

The photometry range distribution is not limited to a pattern as shown in FIG. 8, but other photometry range distributions may be implemented such that the weighting factor is 0.0 at upper two stages of No. 1 to No. 12 in the area number as shown in FIG. 6, and 1.0 at lower two stages of No. 13 to No. 24; or the weighting factor is 0.0 at uppermost one stage of No. 1 to No. 6, 0.5 at medium two stages of No. 7 to No. 18, and 1.0 at lowermost one stage of No. 19 to No. 24; or the weighting factor is 0.0 at upper two stages of No. 1 to No. 12, 1.0 at lower central stage of No. 14 to No. 17, and 0.5 at its side lower stage and lowermost one stage of No. 13, No. 18, No. 19 to No. 24. In particular, the last photometry distribution is effective when a highly luminous object also exists on the foreground of the image plane. And those distributions are stored in respective data tables, and appropriately selected, whereby the photographing range can be extended.

(P5: AE reference value parameter)

The AE reference value parameter shows the luminance level which is a reference for the exposure control, and is stored in the definition of numerical values. Based on this reference value, the excess or shortage of the exposure is judged, and this reference value is set at 50IRE in this embodiment. This parameter attribute is constant in the photographing mode without being dependent upon the input luminance level.

(P6: image quality adjustment parameter)

This is a parameter for specifying the image quality adjustment with the aperture control as previously described, and the content of processing is defined by a code, the attribute being fixed and set in accordance with the photographing mode without any change dependent upon the input luminance level.

In this landscape photographing mode, "NORMAL" is specified, in which the basic image quality is a standard value, without any special image processing such as varying the image quality with the aperture control as previously described.

(P7: image effect processing parameter)

This is a parameter for specifying the image processing such as a face as shown in FIG. 13, and the content of processing is defined by a code.

Herein, "NORMAL" is specified, whereby the basic image quality is set at a standard value, without performing any special processing.

This parameter attribute is also fixed, and set in accordance with the photographing mode, without being dependent upon the input luminance level.

In this way, the definition and characteristics for parameters necessary for the control are stored in the data table LUT of this invention, and a plurality of LUTs are provided corresponding to photographing modes and can be selected in accordance with the specified photographing mode, whereby the optimal control can be always made in any photographing situation and photographing environment.

Thus, the landscape photographing mode has been described in connection with the data table LUT storing the control parameters defined and the operation characteristics of control parameters set therein.

Next, a further program photographing mode "spotlight photographing mode" of this invention will be described, in connection with the setting and control of various photographing modes, the internal structure of the data table LUT and the control of control parameters as set in the LUT in this spotlight photographing mode.

The spotlight photographing mode normally supposes such a photographing situation that a highly luminous object, as a spot at one point in the dark background, is present, and is a photographing mode suitable to take a picture of an object illuminated with a spotlight located at one point in a dark room at a wedding or party, for example. This mode can be selected by the operation of the operation unit 20.

In general, in photographing an object illuminated with a spotlight located at one position in a dark background, if the average photometry is performed for the whole image pickup plane as conventionally done, a main object illuminated with the spotlight may be overexposed to produce a white skip because it is pulled by the low luminance portion which occupies most of the image plane.

Also, even if the central priority photometry is used, the spot portion is not always located centrally, and even within a region where the central portion has a large weight, if the area on the highly luminous portion is small, the correct exposure control is not performed.

The "spotlight photographing mode" of this invention is a program photographing mode in which an excellent exposure control is enabled in such a photographing situation, and will be described in detail below.

FIG. 23 shows an internal structure of the data table LUT storing the definition and characteristics of various control parameters necessary for the control corresponding to the spotlight photographing mode. The program diagram showing the transition of each control parameter defined and set in the LUT with respect to the luminance level of input parameter is the same as that of the "landscape photographing mode" shown in FIG. 24. Accordingly, FIG. 24 is used for the explanation of the control parameter, but the thresholds y1 and y2 are different depending on the mode.

That is, in FIG. 24, a threshold y1' is provided with respect to the object illuminance of input parameter in the transverse axis, and the entire region is subdivided into two areas, whereby the exposure control is performed by the iris and the gain, with the shutter speed fixed.

In the following, each control parameter set within the data table LUT for the spotlight photographing mode will be described below in due order.

(P1: iris control parameter)

The iris control parameter varies depending on the input parameter Y or the luminance level, and an input luminance function f(y) is defined as its attribution.

If the input luminance level is higher than a threshold y1' as shown in FIG. 17, the calculation is necessary as indicated by "→CAL", as will be seen from the data column to the right of FIG. 23.

To secure the S/N at high luminances, the iris is controlled from the least stop to an open value, with the AGC gain being ±0dB (THROUGH).

If the input luminance level is y1' or less, "→OPEN" is designated to control the iris to be opened.

It is considered that the illuminance is significantly low in this state, and this is an area where when the photographing is preferentially continued at the expense of the S/N degradation, the AGC gain is raised to cope with the situation.

In this way, the control characteristics of the iris are defined by dividing the entire region ranging from high to low luminance into two areas at one threshold y1'.

(P2: shutter control parameter)

The shutter control parameter is always fixed at a constant value without respect to the input luminance level, with the attribute fixed, in which the "→standard" is designated so as to be set at a standard value of television specification. The calculation is unnecessary.

This standard value of television signal referred to herein is 1/60 second in NTSC and 1/50 second in PAL.

(P3: AGC gain)

When the AGC gain is a parameter to be processed, an input luminance function f(Y) is defined by a threshold y, in which when the input luminance level is higher than y1', "→±0dB" is specified, whereby the AGC gain is fixed at ±0dB, and the setting of gain without amplification effect in the AGC circuit is made. This is because when the exposure control is allowed by the iris, the S/N degradation is prevented by fixing the AGC gain, and the calculation is unnecessary in this case.

Since this interval is set to occupy most of the range for the object illuminance, the image pickup with excellent S/N is allowed over the entire region.

When the input luminance level is y1' or less, "→CAL" is specified, so that the optimal AGC gain is obtained by calculation, and the gain control parameter is set.

In this state, the illuminance is significantly low, and this is an area where when the photographing is preferentially continued at the expense of the S/N degradation of image, the AGC gain is raised to cope with the situation.

The setting of other parameters for the measure for low illuminance has been made to the most extent, so that the controllable parameter left in this state is only the AGC gain, whereby the exposure control is performed by raising the gain up within a permissible range in consideration of the degradation of the S/N.

The relation between two areas divided by the threshold y1 and three control parameters will be clear from FIG. 24, and the parameters to be calculated are distributed so that only one parameter exists in each area, whereby the simplification of calculation is made, the arrangement being I, G from the area on the higher luminance side.

(P4: AE weighting parameter=setting of photometry range weighting)

This is a parameter for setting the photometry range distribution and their weighting within the image pickup plane, and the attribute is a function f(Y) of input luminance, as seen from FIG. 23. Specifically, this parameter is defined by a histogram created in dependence with the input luminance signal, in which the input luminance signal level in each of twenty four divided areas is detected to create a histogram of luminance level, whereby a highly luminous portion illuminated with the spotlight on the image pickup plane is correctly detected, and priority photometry is made on that area.

In this embodiment, each luminance level is detected for each of twenty four divided areas, and the upper level N (=2) areas are extracted from the histogram created using those luminance levels, whereby the AE control is performed only by the N areas.

Therefore, even with an illuminator such as a spotlight deflected on a part of the image pickup plane, it is possible to determine an adequate exposure value without being affected by a dark portion having no main object.

Figure 25:
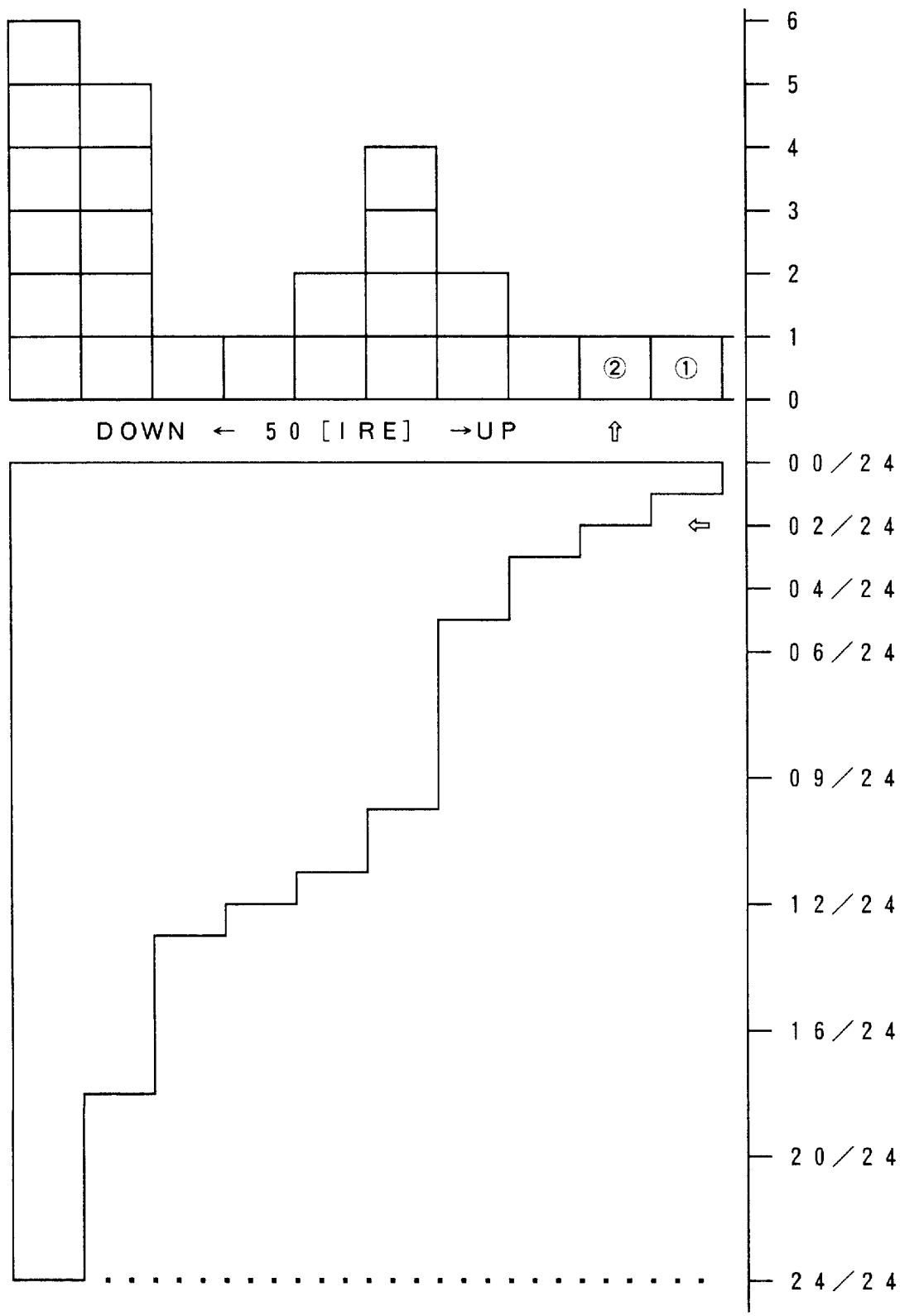
FIG. 25 is a diagram showing a luminance histogram for determining the photometry range in accordance with "spotlight photographing mode" in this invention.

The behavior of such a histogram is shown in FIG. 25. The upper portion in the same figure is a luminance histogram with the IRE level in the transversal axis, the level rising from left to right, and 0 to 6 in the longitudinal axis indicating the number of areas corresponding to each IRE level.

Also, the lower portion is an cumulative histogram for the luminance histogram as shown above. The longitudinal axis indicates the number of twenty four divided areas.

In the same figure, it is indicated that the upper two areas (①, ②) are extracted from twenty four areas in the cumulative histogram.

In this way, the highly luminous portion within the image pickup plane is detected, and the AE photometry characteristics with that portion stressed can be set, whereby the AE control can be implemented by excluding the influence of the portion where the main object does not exist.

(P5: AE reference value parameter)

The AE reference value parameter shows the luminance level which is a reference for the exposure control, and stored in the definition of numerical values. Based on this reference value, the excess or shortage of the exposure is judged, and this reference value is set at 50IRE in this embodiment. This parameter attribute is constant in the photographing mode without being dependent upon the input luminance level.

(P6: image quality adjustment parameter)

This is a parameter for specifying the image quality adjustment with the aperture control as previously described, and the content of processing is defined by a code, the attribute being fixed and set in accordance with the photographing mode without any change dependent upon the input luminance level.

In this spotlight photographing mode, "NORMAL" is specified, in which the basic image quality is a standard value, without any special image processing such as varying the image quality using the aperture control as previously described.

(P7: image effect processing parameter)

This is a parameter for specifying the image processing such as a fade as shown in FIG. 13, and the content of processing is defined by a code.

Herein, "NORMAL" is specified, whereby the basic image quality is set at a standard value, without performing any special processing.

This parameter attribute is also fixed, and set in accordance with the photographing mode, without being dependent upon the input luminance level.

In this way, the definition and characteristics for parameters necessary for the control are stored in the data table LUT of this invention, and a plurality of LUTs are provided corresponding to photographing modes and can be selected in accordance with the specified photographing mode, whereby the optimal control can be always made in any photographing situation and photographing environment.

Thus, the spotlight photographing mode has been described in connection with the data table LUT storing the control parameters defined and the operation characteristics of control parameters set therein.

Next, the "surf & snow photographing mode" will be described in detail in connection with the setting of each control parameter and the control operation.

The "surf & snow photographing mode" is set by the operation of the operation unit 20. The internal structure of the data table LUT storing the definition and characteristics of various control parameters necessary for the control which is referenced when this mode is selected is shown in FIG. 26.

The program diagram showing the operation of various control parameters defined and set in this LUT or the transition of each control parameter with respect to the input luminance level is the same as a design of the control parameter transition diagram in the portrait photographing mode shown in FIG. 19. Therefore, in this embodiment, the setting of control parameters in the surf & snow photographing mode is performed using FIG. 19.

However, the design is only the same, but two thresholds and the shutter speed and gain control values are separately set among these modes, and in order to distinguish these, it is assumed herein for the representation that two thresholds are y1' and y2', the high speed shutter speed is T1', and the gain control value is G1'.

In the following, each control parameter as shown in the diagram will be described below.

(P1: iris control parameter)

The iris control parameter varies depending on the input parameter Y or the luminance level, and a function f(y) is defined as its attribution.

If the input luminance level is higher than a threshold y1' as shown in FIG. 19, the calculation is necessary as indicated by "→CAL", as will be seen from the data column to the light of FIG. 26.

To secure the S/N at high luminance, the iris is controlled to be fully opened beforehand to an open value, with the AGC gain being ±0dB (THROUGH), in consideration of the measure of small stop against the decrease of resolution caused by the light diffraction phenomenon due to the small stop of the iris.

If the input luminance level is y1' or less, "→OPEN" is designated to control the iris to be opened.

In this way, the control characteristics of the iris are defined by dividing the entire region ranging from high to low luminance into two areas at one threshold y1'.

(P2: shutter control parameter)

The shutter control parameter defines a luminance function f(Y) of input parameter with thresholds y1' and y2'.

When the input luminance level is higher than y1', "→T1'" is specified, so that the shutter speed is fixedly set at a high speed T1. In this case, the calculation is unnecessary.

Herein, T1 is set at a slightly higher shutter speed because of the small stop countermeasure, as previously described.

In practice, it is selected in the range from about 1/125 to 1/500 second.

At this step, it is controlled without increasing the AGC gain if possible even in the low luminance to improve the S/N.

When the input luminance level lies between y1' and y2', "→CAL" is set, whereby the optimal shutter speed is calculated in accordance with the input luminance level, and the setting of control parameter value is made.

Herein, the variable width of the control is between the T1' as above described and the standard screen frequency of television (standard value).

If the input luminance level is y2' or less, "→standard value" is specified, so that the shutter speed is set at a standard value of the television signal.

This standard value of television signal referred to herein is 1/60 second in NTSC and 1/50 second in PAL.

In this state, only the AGC gain remains as a controllable parameter, whereby the exposure control is performed by raising the gain up in a permissible range of the S/N degradation.

(P3: AGC gain)

When the AGC gain is a parameter to be processed, an input luminance function f(Y) is defined by a plurality of thresholds, in which when the input luminance level is higher than y2', "→0dB" is specified, whereby the AGC gain is fixed at ±0dB, and the setting of gain without amplification effect is made. This is because when the exposure control is allowed by the iris and the shutter, the S/N degradation is prevented by fixing the AGC gain, and the calculation is unnecessary in this case.

Since this interval is set to occupy most of the range for the object illuminance, the image pickup with the excellent S/N is allowed over the entire region.

When the input luminance level is y2' or less, "→CAL" is specified, so that the optimal AGC gain is obtained by calculation, and the gain control parameter is set.

Other parameters already reach the limit, and the controllable parameter left in this state is only the AGC gain, whereby the exposure control is performed by raising the gain up within a permissible range in consideration of the degradation of the S/N.

The relation between three areas divided by thresholds y1', y2' and three control parameters will be clear from FIG. 19, and the parameters to be calculated are distributed so that only one parameter exists in each area, whereby the simplification of calculation is made, the arrangement being I, S, G from the area on the higher luminance side.

(P4: AE weighting parameter=setting of photometry range weighting)

This is a parameter for setting the photometry range distribution and their weighting within the image pickup plane, and the attribute is a function f(Y) of input luminance as shown in FIG. 24.

Specifically, this parameter is defined by a histogram created in dependence with the input luminance signal, in which the input luminance signal level in each of twenty four divided areas within the image pickup plane is detected to create a histogram of luminance level, whereby the distribution state for a high luminous portion and a low luminous portion is correctly detected, thereby determining the area for the priority photometry.

In this embodiment, each luminance level is detected for each of twenty four divide areas, and the upper 50% (i.e., 24/2=12) areas are extracted from the histogram created using those luminance levels, whereby the AE control is performed only by using those twelve luminance data.

Represented with the factors, 1.0 is allocated to the extracted areas, and 0.0 is allocated to the unextracted areas, whereby the arithmetic operation for the AE control is performed.

Figure 27:
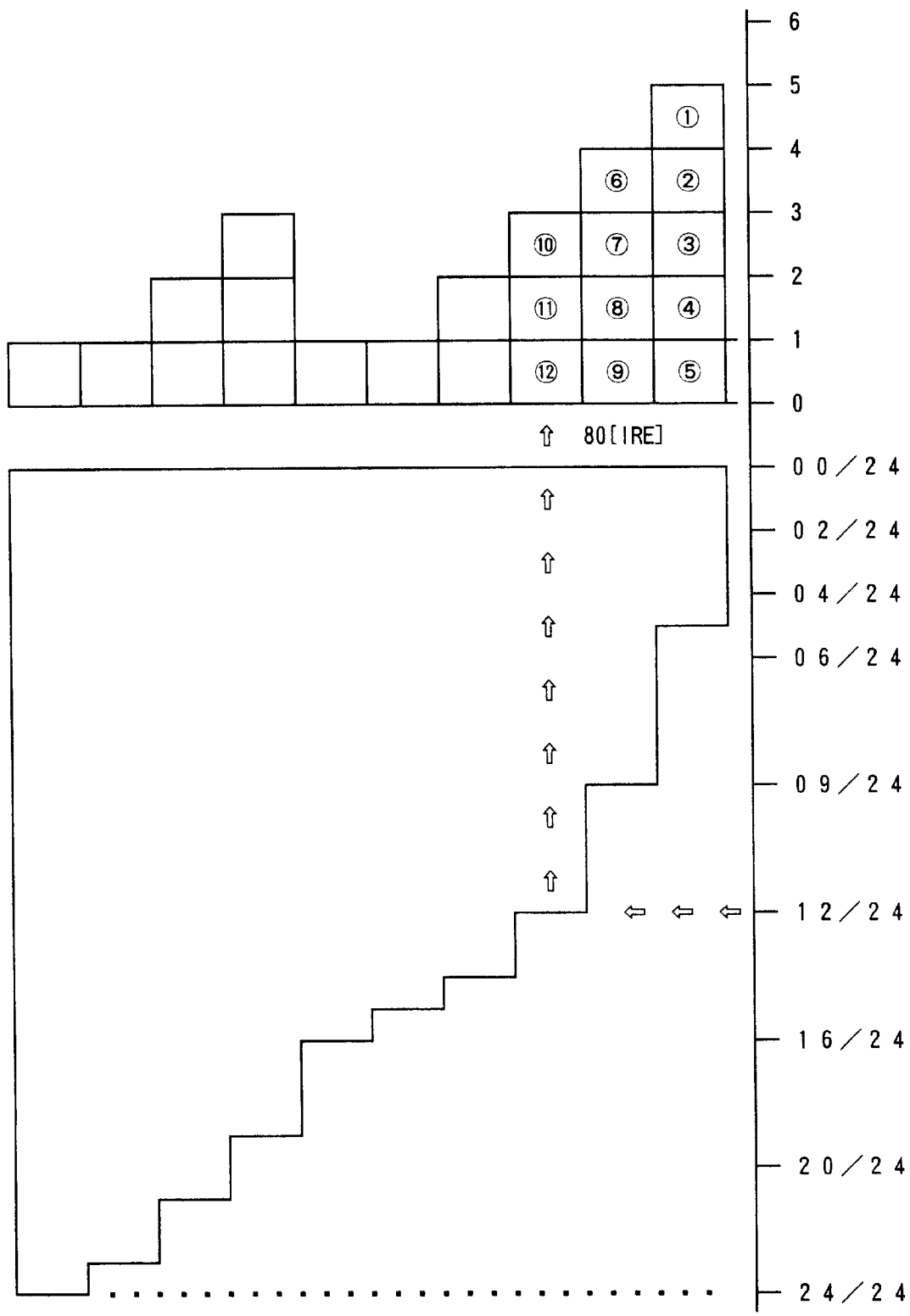
FIG. 27 is a diagram showing a luminance histogram for determining the photometry range in accordance with "surf and snow photographing mode" in this invention.

The behavior of such a histogram is shown in FIG. 27. The upper portion in the same figure is a luminance histogram with the IRE level in the transversal axis, the level rising from left to right, and 0 to 6 in the longitudinal axis indicating the number of areas corresponding to each IRE level.

Also, the lower portion is a cumulative histogram for the luminance histogram as shown above. The longitudinal axis indicates the number of twenty four divided areas.

In the same figure, it is indicated that the upper twelve areas (1–12) which correspond to 50% of twenty four areas in this cumulative histogram are extracted.

In this way, half or twelve areas from the higher luminous side within the image pickup plane are selected, and the AE photometry characteristics with that portion stressed can be set, whereby since the priority photometry is made widely on the portion having higher luminance within the image plane, the exposure compensation is made to prevent the obscured shadow detail of a main object or a part within the image plane in the photographing situation overall highly luminous such as snow landscape or sands, so that the natural photographed image can be obtained over the entire plane, while preventing the low-grade photographing such as the image on the high luminous portion within the image plane causing the white skip and becoming unnatural.

(P5: AE reference value parameter)

The AE reference value parameter shows the luminance level which is a reference for the exposure control, and stored in the definition of numerical values. Based on this reference value, the excess or shortage of the exposure is judged, and since in this embodiment this is a photographing mode supposing the photographing situation where high luminous portion mostly occupies within the image pickup plane such as snow landscape or sands, this reference value is set at 80IRE which is slightly higher than a typical value 50IRE in this embodiment, so that the high luminous object portion may be photographed clearly as a whole, thereby suppressing the occurrence of the white skip. This parameter attribute is constant in the photographing mode without being dependent upon the input luminance level.

(P6: image quality adjustment parameter)

This is a parameter for specifying the image quality adjustment with the aperture control as previously described, and the content of processing is defined by a code, the attribute being fixed and set in accordance with the photographing mode without any change dependent upon the input luminance level.

In this photographing mode, "NORMAL" is specified, in which the basic image quality is a standard value.

(P7: image effect processing parameter)

This is a parameter for specifying the image processing such as a fade as shown in FIG. 13, and the content of processing is defined by a code.

Herein, "NORMAL" is specified, whereby any special effects of the image are not employed.

In this way, in the "surf & snow photographing mode", the reference value is set at a higher value than a normal AE reference value, and by setting a photometry area on the high luminous portion (upper 50%) with the luminance histogram, the occurrence of white skip can be suppressed, the photographing can be made in such a way that "white" is more white and obscured shadow detail as occurs with a figure is reduced even on a high luminous image plane over a wide area such as the snowscape on a skiing ground.

Next, "manual photographing mode" will be described for the internal structure of the data table LUT and the setting of control parameters set therein.

The "manual photographing mode" is set by the operation of the operation unit 20, and is fundamentally a photographing mode based on the central priority photometry in which the weighting is applied to the photometry range, as shown in FIG. 7. The internal structure of the data table LUT storing the definition and characteristics of various control parameters necessary for the control which is referenced when the mode is selected is shown in FIG. 28.

Figure 29:
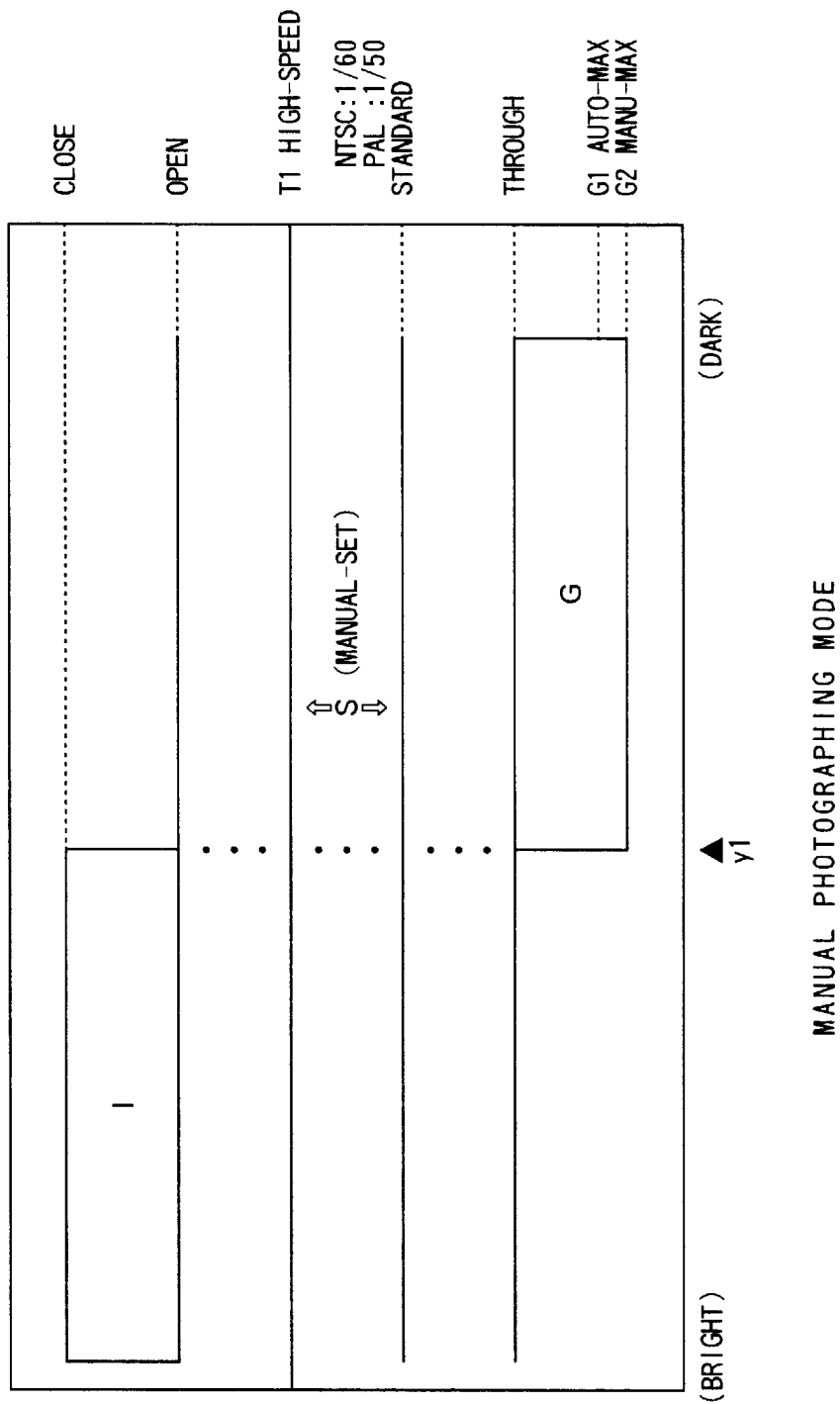
FIG. 29 is a program diagram for explaining the parameter processing in accordance with "manual photographing mode" in this invention.

The program diagram showing the transition of various control parameters defined and set by this LUT with respect to the luminance level of input parameter is shown in FIG. 29.

That is, in FIG. 29, a threshold y1 is provided for the object illuminance in the transversal axis which is an input parameter, whereby the whole diagram is subdivided into two areas.

This manual photographing mode is based on the AE control in the shutter priority mode, and is an automatic mode having the freedom of selectivity in which if the shutter speed is specified manually, the iris control value or the AGC gain is optimized correspondingly.

Accordingly, the manual photographing mode has a feature that the variable range of the AGC gain is widely set as compared with other photographing modes. Thereby, since operator's intent is not directly reflected in the normal automatic photographing mode, the increase of the AGC gain degrading the S/N is suppressed if possible, while since in the manual photographing mode the operator always monitors the photographing state, the photographing range is extended by enlarging the variable range of the AGC gain as compared with that in the automatic photographing mode.

In the following, each control parameter set in the data table LUT for the manual photographing mode will be described in the order.

(P1: iris control parameter)

The iris control parameter varies depending on the input parameter Y or the luminance level, and a function f(y) is defined as its attribution.

If the input luminance level is higher than a threshold y1 as shown in FIG. 29, the calculation is necessary as indicated by "→CAL", as will be seen from the data column to the right of FIG. 28.

To secure the S/N at high luminances, the iris is controlled from the least stop to a full open value, with the AGC gain being ±0dB (THROUGH). This area is in charge of the substantially entire region of the object illuminance.

If the input luminance level is y1 or less, "→OPEN" is designated to control the iris to be opened.

It is considered that the illuminance is significantly low in this state, and this is an area where when the photographing is preferentially continued at the expense of the S/N degradation, the AGC gain is raised to cope with the situation.

In this way, the control characteristics of the iris are defined by dividing the entire region ranging from high to low luminance into two areas at one threshold y1.

(P2: shutter control parameter)

The shutter speed control parameter is a manual setting parameter, and the attribute is manual, or does not change with respect to the input luminance level and manually set.

The variable range is from 1/10000 on the high speed side to the rate of standard television specification (1/60 second in NTSC or 1/50 second in PAL) on the low speed side, within which this parameter is manually changeable.

(P3: AGC gain)

When the AGC gain is a parameter to be processed, an input luminance function f(Y) is defined by a threshold y1, in which when the input luminance level is higher than y1, "→0dB" is specified, whereby the AGC gain is fixed at ±0dB, and the setting of gain without amplification effect in the AGC circuit is made. This is because when the exposure control is allowed by the iris, the S/N degradation is prevented by fixing the AGC gain, and the calculation is unnecessary in this case.

Since this interval is set to occupy most of the range for the object illuminance, the image pickup with the excellent S/N is allowed over the entire region.

When the input luminance level is y1 or less, "→CAL" is specified, so that the optimal AGC gain is obtained by calculation, and the gain control parameter is set.

In this state, the illuminance is significantly low, and this is an area where when the photographing is preferentially continued at the expense of the SIN degradation of image, the AGC gain is raised to cope with the situation.

The setting of other parameters for the measure for low illuminance has been made to the most extent, so that the controllable parameter left in this state is only the AGC gain, whereby the exposure control is performed by raising the gain up within a permissible range in consideration of the degradation of the S/N.

Under these conditions, this mode sets a wider variable range than other automatic photographing modes.

The relation between two areas divided by the threshold y1 and three control parameters will be clear from FIG. 29, and the parameters to be calculated are distributed so that only one parameter exists in each area, whereby the simplification of calculation is made, the arrangement being I, G from the area on the higher luminance side.

The manual photographing mode has a feature that the variable range of AGC is set more widely than in other photographing modes. As shown in FIG. 29, in other photographing modes (e.g., portrait photographing mode as shown in FIG. 19), the upper limit of AGC gain up is G1, while in the manual mode it is settable up to G2. The difference between G1 and G2, i.e., ΔG=G2−G1, is settable in a range of+3dB to 6dB, because the noise characteristics of an image pickup element such as a CCD have been presently improved. The control for the enlargement of the variable range may be automatically made, or intentionally made by providing a gain up switch and turning it on.

(P4: AE weighting parameter=setting of photometry range weighting)

As shown in FIGS. 7 and 8, this is a parameter for setting the photometry range distribution and their weighting within the image pickup plane, and stored in the form of a MAP as shown from FIG. 28, with the attribute fixed.

That is, this parameter is different for each LUT corresponding to the photographing mode, but is fixed in one photographing mode, and does not change depending on the luminance signal level.

In this embodiment, twenty four calculation factors are directly allocated to twenty four divided areas. In this "manual photographing mode", 1.0 is allocated to central eight areas of 2×4, and 0.5 is allocated to peripheral sixteen areas to be a smaller factor than the central areas, as shown in FIG. 7, whereby the photometry range is specified as the "central priority photometry" with the central portion of image pickup plane stressed.

(P5: AE reference value parameter)

The AE reference value parameter shows the luminance level which is a reference for the exposure control, and stored in the definition of numerical values. Based on this reference value, the excess or shortage of the exposure is judged, and this reference value is set at 50IRE in this embodiment. This parameter attribute is constant in the photographing mode without being dependent upon the input luminance level.

(P6: image quality adjustment parameter)

This is a parameter for specifying the image quality adjustment with the aperture control as previously described, and the content of processing is defined by a code, the attribute being fixed and set in accordance with the photographing mode without any change dependent upon the input luminance level.

In this manual photographing mode, "NORMAL" is specified, in which the basic image quality is a standard value, without any special image processing such as varying the image quality using the aperture control as previously described.

(P7: image effect processing parameter)

This is a parameter for specifying the image processing such as a fade as shown in FIG. 13, and the content of processing is defined by a code.

Herein, "NORMAL" is specified, whereby the basic image quality is set at a standard value, without performing any special processing.

This parameter attribute is also fixed, and set in accordance with the photographing mode, without being dependent upon the input luminance level.

Thus, the "manual photographing mode" has been described in connection with the data table LUT storing the control parameters defined and the operation characteristics of control parameters set therein. With this manual photographing mode, the degree of freedom in photographing can be greatly extended by the manual operation such as the arbitrary setting of the shutter speed and the positive or negative exposure correction. In particular, as the variable range of control parameter is extended as compared with the automatic photographing mode, a picture in a darker situation can be taken.

In this way, the data table LUT of this invention stores the definition and characteristics of various parameters necessary for the control, and a plurality of such LUTs are provided corresponding to the photographing modes, and can be selected in accordance with a specified photographing mode, whereby the optimal control can be always made in any photographing situation and photographing environment.

Figure 30:
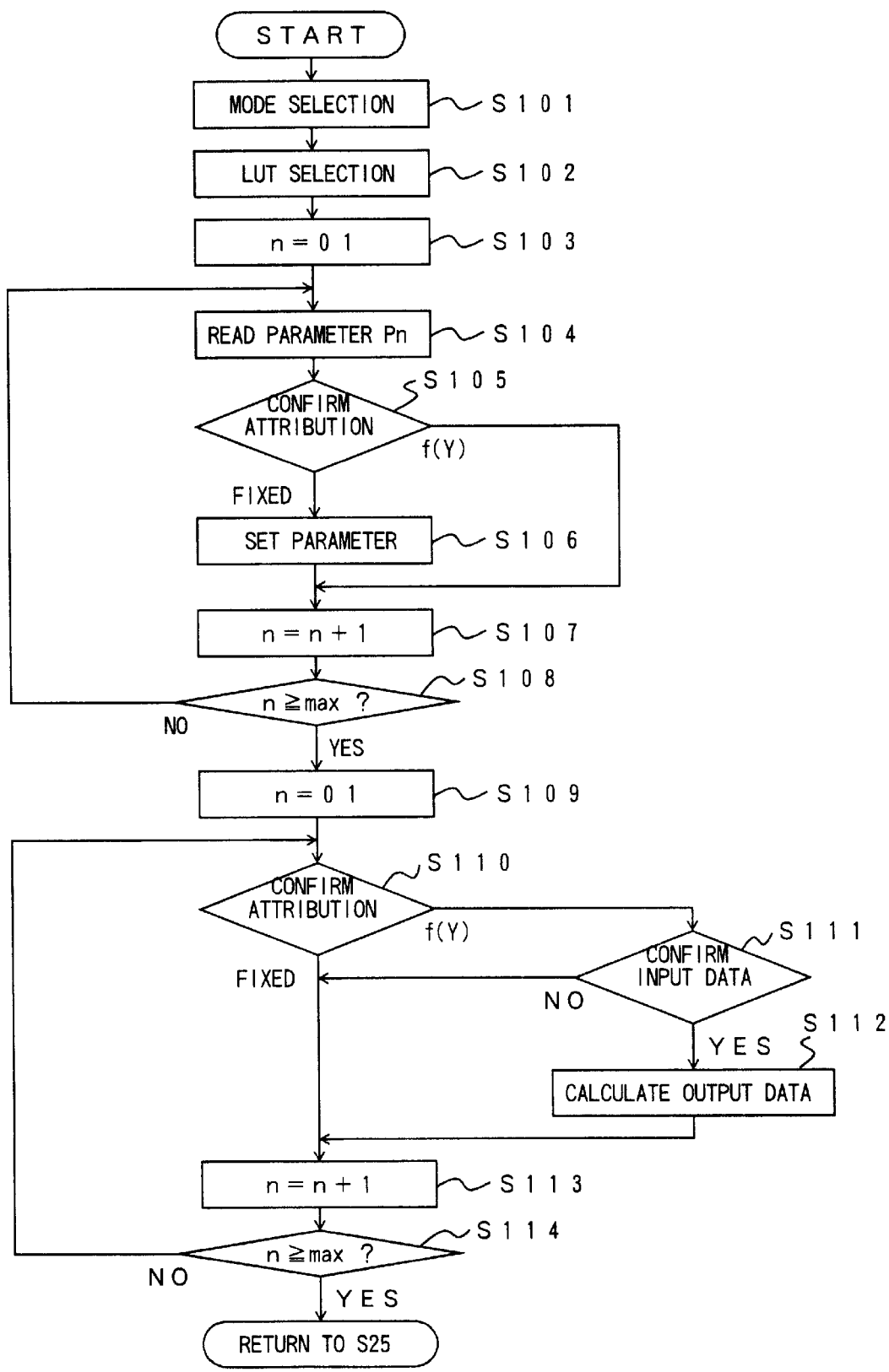
FIG. 30 is a flowchart for explaining in more detail a processing as shown in the flowchart of FIG. 10.

Next, the operation of reading the data from the LUT according to each photographing mode into the system control circuit, and calculating and setting the control parameters will be described in detail with reference to a flowchart as shown in FIG. 30.

These operations are essentially carried out in the process from a confirm processing of program photographing mode at S2 to the output processing of iris, shutter and gain control data based on each control parameter at S24 in the flowchart of FIG. 11.

FIG. 30 is an operation flowchart showing a procedure of data set for setting the control characteristics in accordance with the photographing program mode, and this is a routine to be executed in parallel in the process from S2 to S24 in the flowchart of FIG. 11, and after termination of this routine, returns to S25 of FIG. 11.

If the control is started, the photographing mode is selected by the operation unit 20 of FIG. 3 at S101, and the selected result is input to the system control circuit 25. At S102, the LUT in accordance with the selected photographing mode is selected from among LUT19a to 19b.

At S103, a parameter counter n for specifying the parameter is initialized at n=01, and at S104, data of parameter Pn specified at S103 is read.

The parameter specification is such that data concerning the iris for n=01, data concerning the shutter speed for n=02, data concerning the AGC gain for n=03, data concerning the AE weighting (weighting factor of photometry range) for n=04, data concerning the AE evaluation reference value or level as a reference for adjusting the luminance level to a constant value for n=05, data concerning the image quality adjustment for n=06, or data concerning the image processing for special effects for n=07 is read from each data table LUT into the system control circuit 25.

At S105, the attribute of read parameter is confirmed by making a judgment of whether it depends on the input parameter (f(Y)), or a fixed data corresponding to the mode not dependent upon the input parameter.

That is, as shown in the data table LUT, the attribute is changed according to a predetermined function f(Y) with respect to the input parameter or the object illuminance in this embodiment, or fixed without respect to the change of the input parameter. At S105, if the parameter attribute is f(Y) and depends upon the input parameter, the operation proceeds to S107, or if it is fixed, the operation proceeds to S106, where the parameter value is set as the data attribute is fixed irrespective of the luminance level.

At S107, the parameter counter n is incremented by 1 to obtain n+1. At S108, a check is made to determine whether or not n is greater than a maximum value within the LUT, and if it is not greater, the above operation of S104 to S107 is repeated until n reaches the maximum value, wherein the reading of parameter and the judgment operation of attribute are repeatedly performed, and upon n exceeding the maximum value, the operation transfers to the data output processing.

S109 and following steps are processings for performing the output operation of control data based on the parameter read from the LUT at S101 to S108. At S109, the parameter counter is reset to n=01.

At S110, the parameter attribute is confirmed by making a judgment of whether or not it depends on the input parameter (f(Y)) or is fixed in correspondence with the mode without being dependent upon the input parameter, whereby the operation proceeds to S111 if it is f(Y), or proceeds to S113 by skipping S111 and S112 if it is fixed.

At S111, the output of the integrator 10 is sampled into the A/D converter 11 per unit processing time (e.g., one field period) and the luminance signal level as the input parameter is input into the system control circuit 25. The LUT data definition is referenced in accordance with the value of input signal to make a judgment of whether or not the data calculation is needed. If the calculation condition is met, the operation proceeds to S112, where only the parameter indicated in the current state is changed for the AE control to calculate the optimal value of that parameter to make the proper exposure adjustment.

If it is judged that the calculation is unnecessary at S111, the operation proceeds to S113 by skipping the calculation processing of control output at S112.

At S113, the parameter counter n is incremented by 1 to obtain n+1, and if the parameter counter n is less than the maximum value of LUT parameter number at S114, the operation returns to S110, whereby the above operation of S110 to S113 is repeatedly performed for all the parameters, and if the parameter counter n exceeds the maximum value of LUT parameter number, the operation proceeds to S115 to thereby return to the processing at S25 in the flowchart of FIG. 11.

The above operation is a processing procedure from the reading of parameter characteristics from the data reference table LUT to the calculation of the AE control data, whereby the optimal photographing can be performed by reading the control data suitable for the photographing situation from the LUT according to the set photographing mode and making the control.

Next, a variety of displays within EVF to notify the operator of a variety of program photographing modes in this invention will be described.

In this invention, the display for a variety of photographing modes is made on a screen of electronic viewfinder (EVF).

Figure 31:
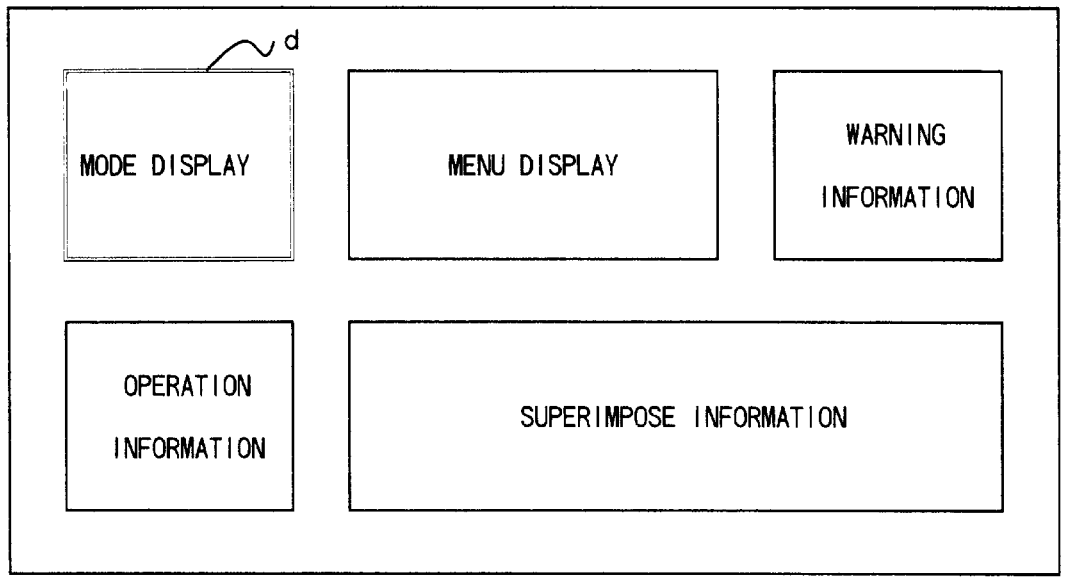
FIG. 31 is a diagram for explaining the display of various operation modes and control parameters within EVF.
Figure 32:
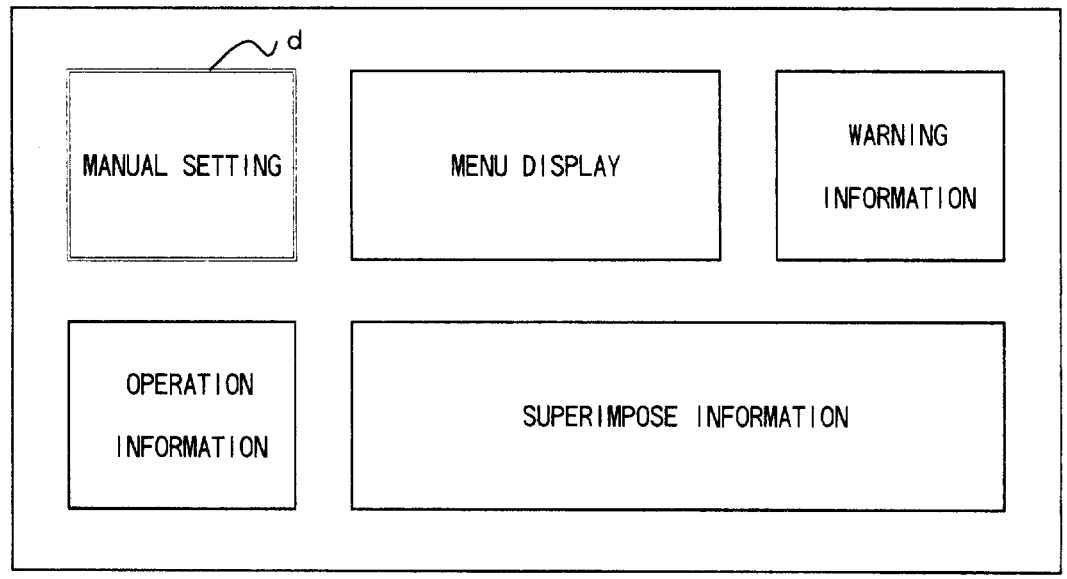
FIG. 32 is a diagram for explaining the display of various operation modes and control parameters within EVF.

FIG. 31 is an example of display area distribution, and FIG. 32 is an example of display area distribution in the manual photographing mode.

Each figure shows an example of display screen within the EVF 26, an area d as indicated left upward by the double line is one for displaying the photographing mode name and the parameter set value at manual operation, and at automatic photographing mode, other than the manual photographing mode, the photographing mode name is displayed, while at manual photographing mode, the set parameter value at the manual photographing mode is displayed at the same position.

Other frames within the EVF as indicated by the solid line include the display of a menu screen such as image processing content or self timer setting, the display of various warnings such as battery exhaustion, the display of various operation states including a video recorder unit (VTR) such as recording or pose, and the display of superimpose information such as insert record information to be superimposed at the recording of VTR. This portion is common to the manual and automatic modes.

At the automatic photographing mode, the photographing mode such as "sport mode", "portrait mode", etc., is displayed over two lines.

At the manual photographing mode, the parameter value such as "S:1/1000" or "+3dB" is displayed over two lines.

As previously described, at the photographing mode other than the manual photographing mode, the iris, the shutter or the AGC gain can not be operated manually, but only the shutter can be operated manually at the manual mode.

Thus, the program photographing modes have been described. In the following, the mode switching control for switching the plurality of photographing modes will be described.

As previously described, the device of this invention comprises a plurality of photographing modes according to the photographing situations, and the optimal photographing is always allowed by switching them with the operation unit 20, but when the photographing condition actually changes during the photographing and the switching of the photographing mode is required, there is a risk that the image quality may be degraded owing to the occurrence of conspicuous changes on the image as the setting conditions of control parameters are greatly different depending on the mode before and after the switching.

Hence, according to this invention, there is provided a neutral mode which is neutral to the photographing modes, as shown below, and when the photographing mode is switched, it is switched to once the neutral mode and then to a designated photographing mode.

Figure 33A:
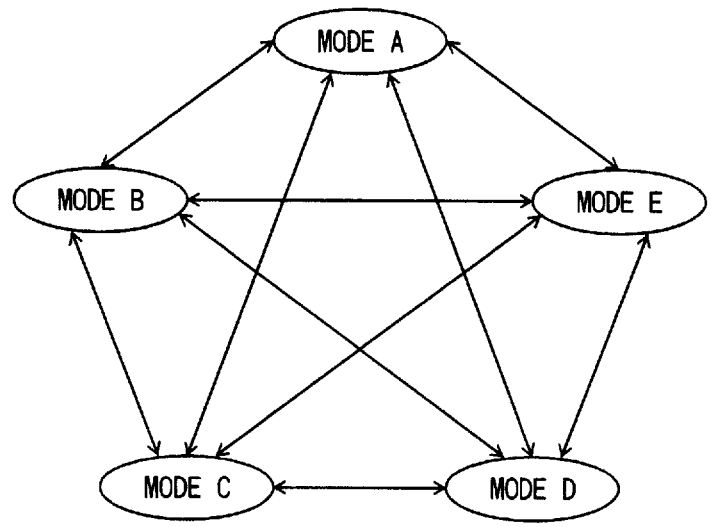
FIGS. 33A and 33B are charts for explaining a neutral mode.
Figure 33B:
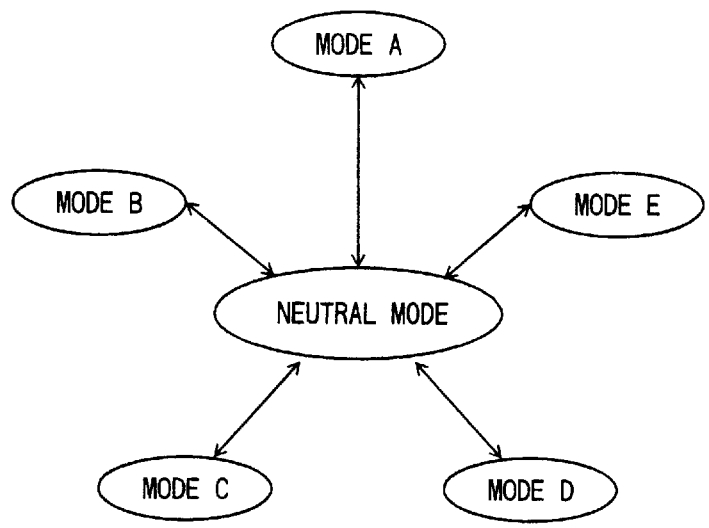

FIGS. 33A and 33B are diagrams for explaining a concept of the neutral mode, FIG. 33A showing a mode transfer without neutral mode. Herein, the total number of combinations of the mode switching is (mode number−1)×mode number/2 and the number of mode switching ways required to minimize the shock in the mode switching is also the same as the number expressed in the above formula. In FIG. 33A, the number of modes is assumed to be 5, so that the total number is 10.

In the other hand, FIG. 33B shows the mode transfer via the neutral mode. In this case, the number of switching ways is the same as the number of modes, namely, 5 in the same figure, which is about half that of FIG. 33A.

And the abrupt or great variation of control parameters in switching the mode is prevented by selecting the setting condition of characteristic common or close among the modes as the neutral mode, so that a smooth mode switching not causing any unnatural variation on the image plane can be realized.

FIG. 34 shows an example of the data table LUT storing various control data in the neutral mode, which is similar to that of the "spotlight mode" shown in FIG. 24, in the same example, with the exception that the setting of the AE weighting for the parameter (P4) is different although the attribute is fixed and the weighting is based on the luminance signal and defined in the form of MAP.

In the same figure, twenty four calculation factors are allocated directly to respective twenty four divided areas in the form of the map, 1.0 being allocated to central eight area of 2×4, and 0.5 being allocated to peripheral sixteen areas to be a smaller factor than in the central areas. Thereby, the setting of AE photometry characteristics with the central portion stressed is enabled, and constant in this mode without respect to the input luminance signal.

Figure 35:
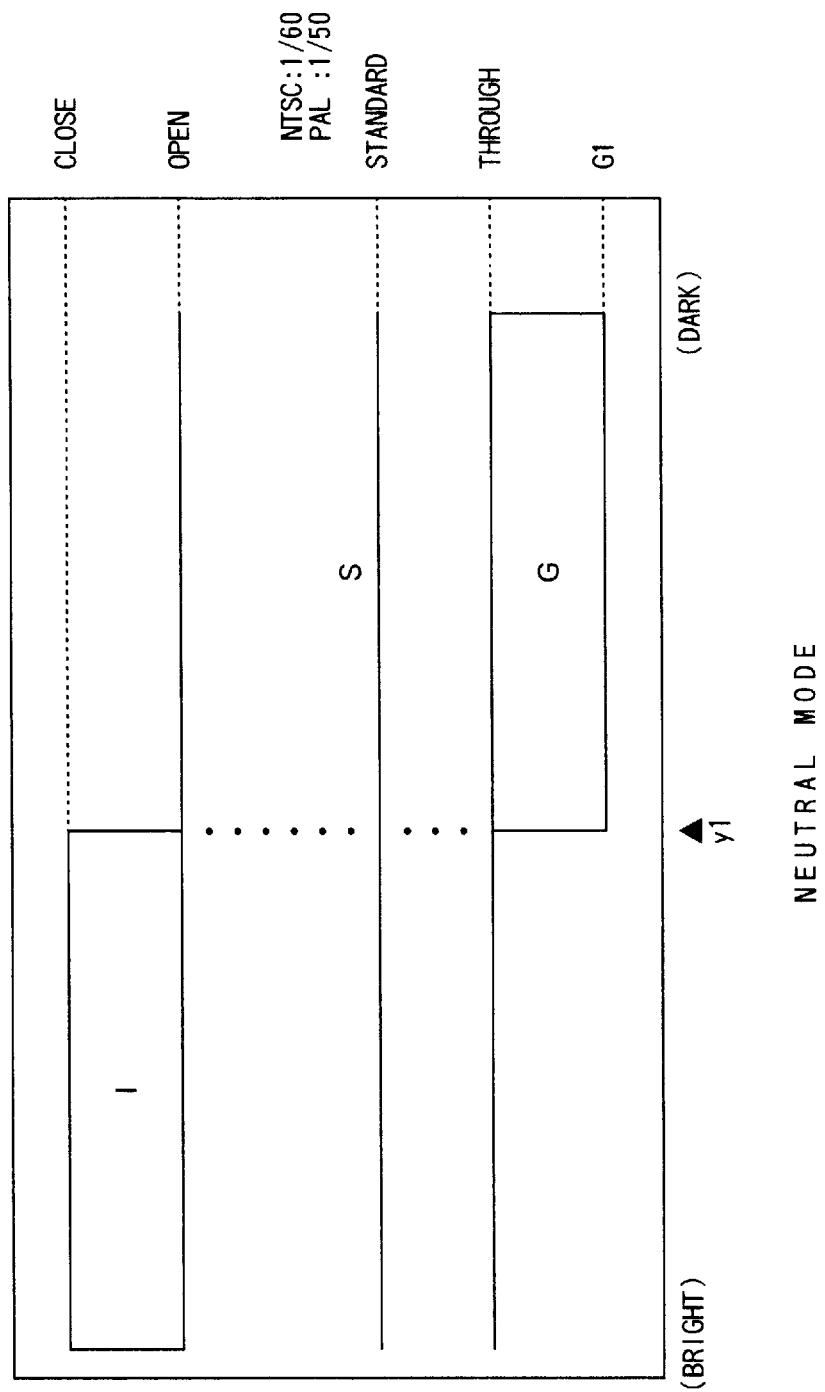
FIG. 35 is a program diagram for explaining the parameter processing in accordance with "neutral mode" in this invention.

FIG. 35 is a parameter transition diagram showing the relation and the setting for three parameters of iris, shutter and AGC gain included in the LUT of FIG. 34, with the input luminance level in the transversal axis.

The entire diagram is subdivided into two areas by one threshold y1, and the parameters to be calculated are distributed so that only one parameter exists in each area. And the parameter to be calculated is I, G in the order from the high luminance side.

Figure 36:
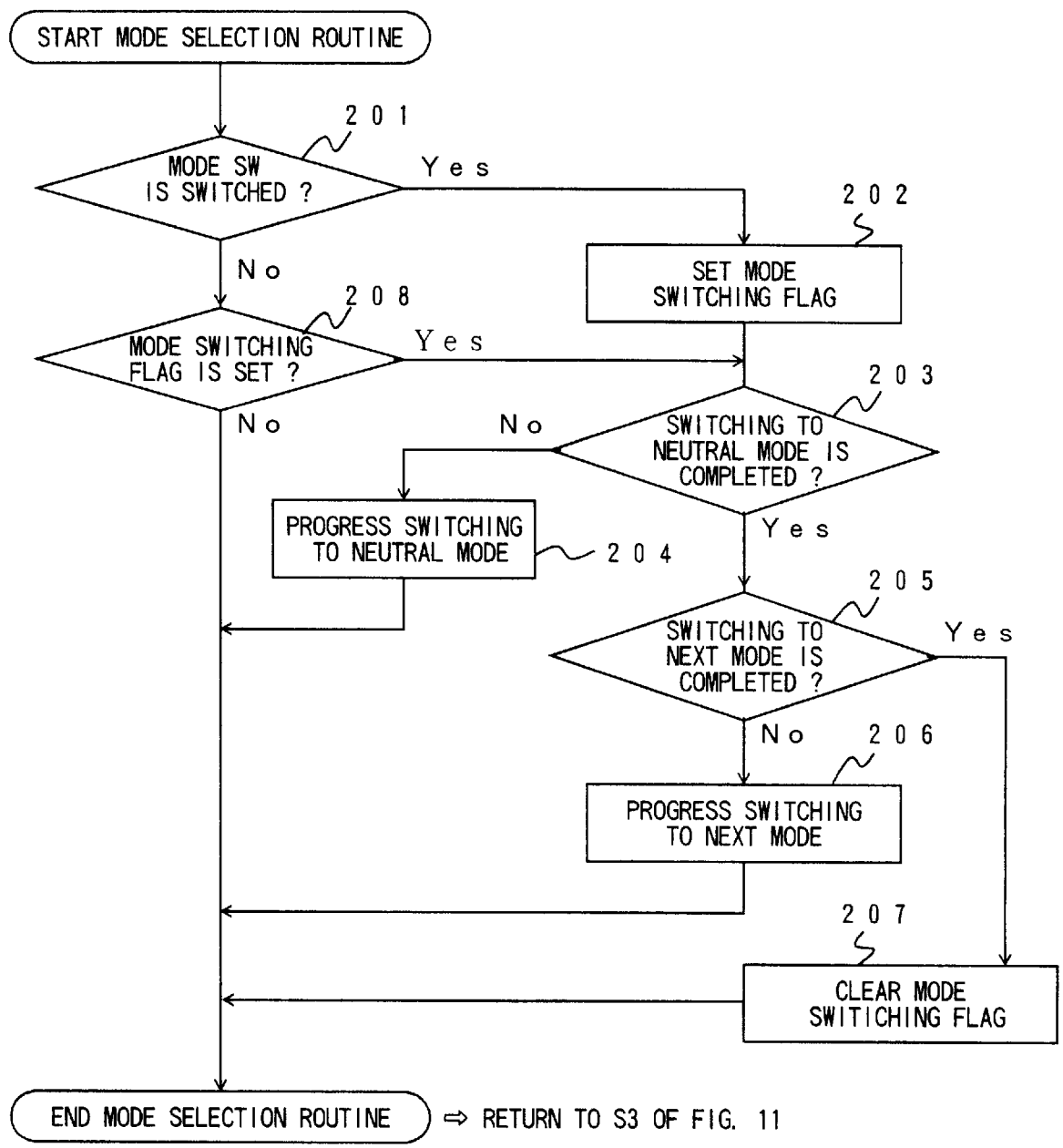
FIG. 36 is a flowchart for explaining a mode transfer operation.

Next, an algorithm for making the switching between a plurality of photographing modes by the key operation on the operation unit 20 will be described using a flowchart of FIG. 36.

The processing in this flowchart is involved in the detail of the mode selection and confirm processing as indicated by S2 in the flowchart of FIG. 11 previously described.

In the same figure, if the operation is started, a check is made at S201 to determine whether or not a signal selected and input by the key operation of the operation unit 20 indicates a photographing mode (first mode) being currently selected. If they are different, the operation proceeds to S202, while if they are the same, the operation proceeds to S208.

At S202, a mode transfer flag meaning the mode change indication is set as an indication for changing the current photographing mode has been issued, and the operation proceeds to the next step S203. Also, at S202, a reference for comparison of whether or not the mode has changed at S201 in the next execution is set to the photographing mode (second mode) after alteration.

At S203, a check is made to determine whether or not the switching from the first mode before alteration to the neutral mode has been completed. If the switching is not completed, the operation proceeds to S204, where the switching to the neutral mode is made, and exits from a mode judgment routine. If completed, the operation proceeds to S205, where a check is made to determine whether or not the switching from the neutral mode to the second mode is completed.

If the switching to the second mode is not completed at S205, the switching from the neutral mode to the second mode is performed, and the operation exits from the mode judgment routine, while if the switching to the second mode is completed, the operation proceeds to S207, where the mode transfer flag is cleared and then exits from the mode judgment routine.

If there is no mode change indication issued at S201, a check is made at S208 to determine whether or not the mode transfer flag is set. If the flag is set, the operation proceeds to S203 because the mode switching operation is not completed, while if the flag is not set, the operation exits from the mode selection routine because the mode switching operation is completed.

After the exit from the mode selection routine, the operation returns to S3 in the flowchart of FIG. 9.

Next, there will be described a simple example in which the mode switching operation is actually performed via the neutral mode, by selecting the "spotlight photographing mode" as the first mode currently set and the "landscape photographing mode" as the second mode to be set next.

As will be clearly seen from FIGS. 23, 24 and FIGS. 34, 35, the difference between the "spotlight photographing mode" and the "neutral mode" involves only the setting of AE weighting or the allocation of weighting factors to twenty four divided areas within the image pickup plane, and as will be clearly seen from FIG. 22, FIG. 24, FIG. 34 and FIG. 35, the difference between the "landscape photographing mode" and the "neutral mode" involves only the AE weighting.

Upon instructing the mode transfer by the operation of the operation unit 20, the processing is executed to make the mode switching operation, whereby it is necessary that the steps S1 to S26 in the flowchart of FIG. 11 are repeated three times by the time when the mode switching operation is completed. This will be described below using the flowchart of FIG. 36.

(First cycle)
If it is judged at S201 that a request of switching the photographing mode from the "spotlight photographing mode" to the "landscape photographing mode" is issued, the operation proceeds to S202, where a mode transfer flag is set, and proceeds to S203.

In this case, the transfer to the neutral mode is not completed at S203, so that the operation proceeds to S204, where the parameter (P04) of AE weighting is changed to the setting of the neutral mode, and exits from the mode selection routine.

(Second cycle)
Since the switching operation of the operation unit is terminated and the key operation of the operation unit 20 is not performed as a result of the judgment for the state of the operation unit 20 at S201, the operation proceeds to S208, where a check is made to determine whether or not the mode transfer flag is set. In this case, the mode transfer flag remains set at the first cycle, so that the operation proceeds to S203. Since the alteration of the data table LUT to the neutral mode is completed, the operation proceeds to S205. At S205, the switching to the "landscape photographing mode" is not completed, so that the operation proceeds to S206, where the data table LUT is switched from the neutral mode to the "landscape photographing mode", or more specifically, the parameter of AE weighting is changed. Then the operation exits from the mode selection routine.

(Third cycle)
Since there is no key operation performed as a result of judging the state of the operation unit 20 at S201, the operation proceeds to S208. In this case, the mode transfer flag has been set, so that the operation proceeds to S203.

Since the switching of the LUT to the neutral mode is already completed at S203, the operation proceeds to S205. Also, in this case, the switching to the "landscape photographing mode" is already completed, so that the operation proceeds to S207, where the mode transfer flag is cleared. Then the operation exits from the mode selection routine.

As above described, when the photographing mode is switched, it is always bypassed to the neutral mode before the transfer to the next photographing mode, whereby it is possible to switch the photographing mode smoothly and naturally without causing any disorder or unnatural change in the image owing to abrupt or great variation in the setting and characteristics of control parameters.

Thus, the switching from the spotlight photographing mode to the landscape photographing mode has been described as an example, but the switching between other photographing modes can be performed in the exact same way. When a plurality of control parameters are altered, the switching is likewise performed.

In the above example, the neutral mode is provided apart from other photographing modes, but other photographing modes may be used as the neutral mode in accordance with the photographing mode to be switched.

As above described, an image pickup device of this invention comprises a plurality of photographing modes according to the photographing situations, wherein when the photographing mode is switched, it is not directly switched to the destination photographing mode, but once bypassed to the neutral mode in which the control parameters intermediate to various photographing modes are set, whereby the process of switching the photographing mode can be simplified, and achieved smoothly and naturally without causing any disorder or unnatural change in the image owing to abrupt or great variation in the setting or characteristics of control parameters.

Thus, the neutral mode, which is provided so that the change of control parameters is not remarkable in the image when the photographing mode is switched, has been described, but in the following, another embodiment for making the switching between the photographing modes smoothly will be described.

The circuit configuration and the photographing modes are the same as in the previous embodiment.

According to this embodiment, when the switching operation between photographing modes is made, the switching is not directly made, but after a predetermined delay, the actual switching is performed, as shown below, whereby the switching of photographing mode can be more gently performed even with abrupt key operation, resulting in a smoother transfer of the mode without causing any disorder in the image.

Figure 37:
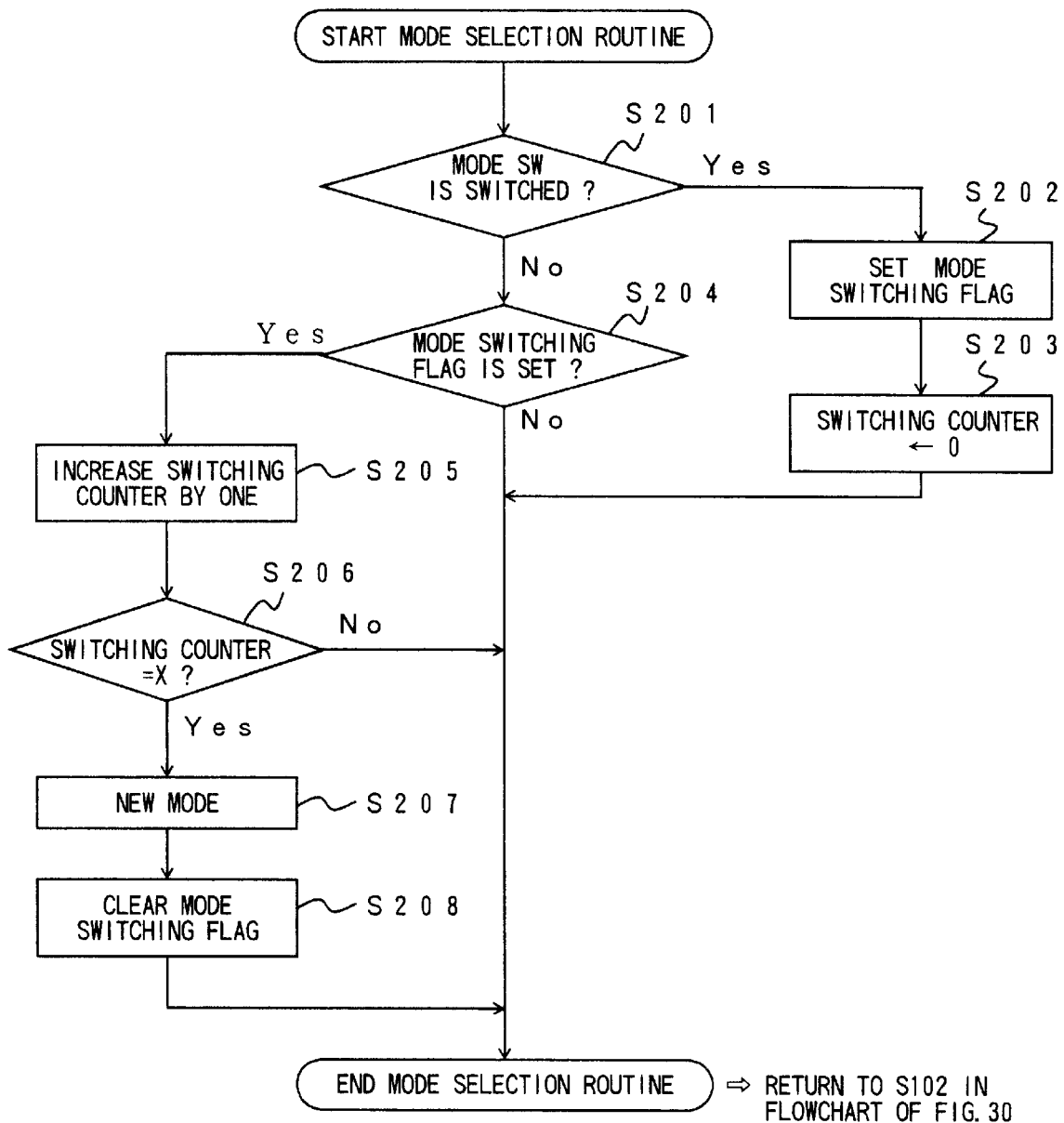
FIG. 37 is a flowchart for explaining another embodiment of photographing mode switching operation by means of photographing mode switching means of this invention.

FIG. 37 is an algorithm for making the switching between a plurality of photographing modes with the key operation of the operation unit 20, which describes in more detail the photographing mode selection process at S101 in the flowchart of FIG. 30.

In the same figure, if the operation is started, at S201, a check is made to determine whether or not a signal selected and input by the key operation of the operation unit 20 indicates a photographing mode (first mode) being currently selected. If they are different, the operation proceeds to S202, while if they are the same, the operation proceeds to S204.

At S202, a mode transfer flag meaning the mode change indication is set as an indication for changing the current photographing mode has been issued, and the operation proceeds to the next step S203. Also, at S202, a reference for comparison of whether or not the mode has changed at S201 in the next execution is set to the photographing mode (second mode) after alteration.

At S203, a mode in-transfer counter for counting the time during the mode transfer is reset to zero, and the operation exits from the mode selection routine.

At S204, a check is made to determine whether or not the mode transfer flag is set when there is no key operation for changing the current mode at S201, and if it is set, the mode is during the transfer and the operation proceeds to S205, where the in-transfer counter is incremented by one. If it is not set, the mode transfer operation is not being performed or terminated, and the operation exits from the mode selection routine.

At S206, a check is made to determine whether or not the mode in-transfer counter reaches a predetermined value X. If it is equal to X, the operation proceeds to S207, where the switching is made to a new photographing mode. And at S208, the mode transfer flag is cleared. Then, the operation exits from the mode selection routine.

After the exit from the mode selection routine, the operation returns to S102 in the flowchart of FIG. 30.

With this process, the actual switching of photographing mode is performed a predetermined delay since the photographing mode is switched on the operation unit 20, whereby any disorder or unnatural change will not be caused in the image even by the abrupt switching operation.

Figure 38:
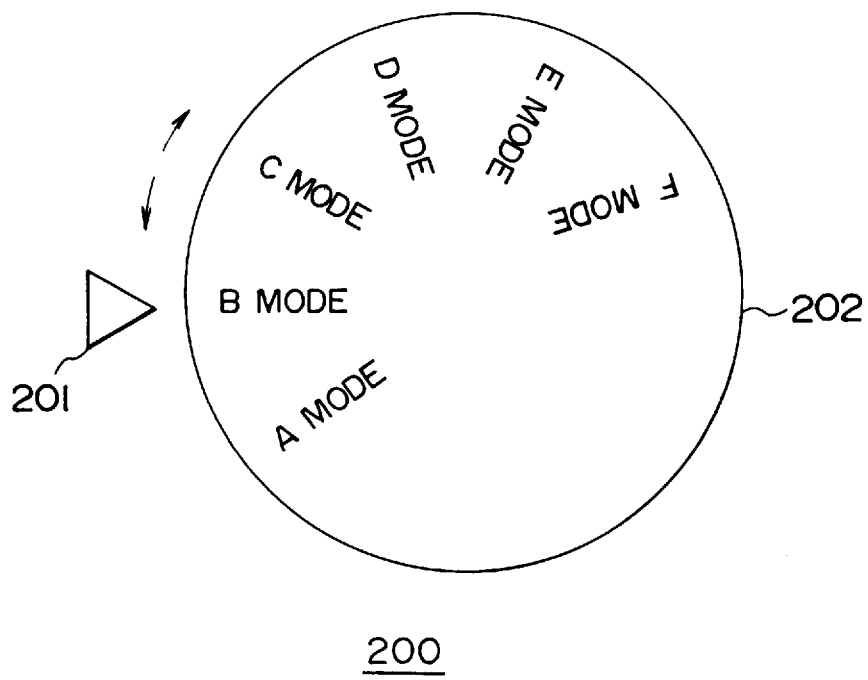
FIG. 38 is a diagram for explaining a configuration of an operation portion for switching the photographing mode.

A further description will be given below with reference to FIGS. 38 and 39. FIG. 38 is a photographing mode switching dial 200 on the operation unit 20, wherein the mode can be selected by aligning one mode indication of dial portion 202 (six modes A, B, C, D, E, F selectable for the convenience of explanation) with a selection index 201.

Figure 39:
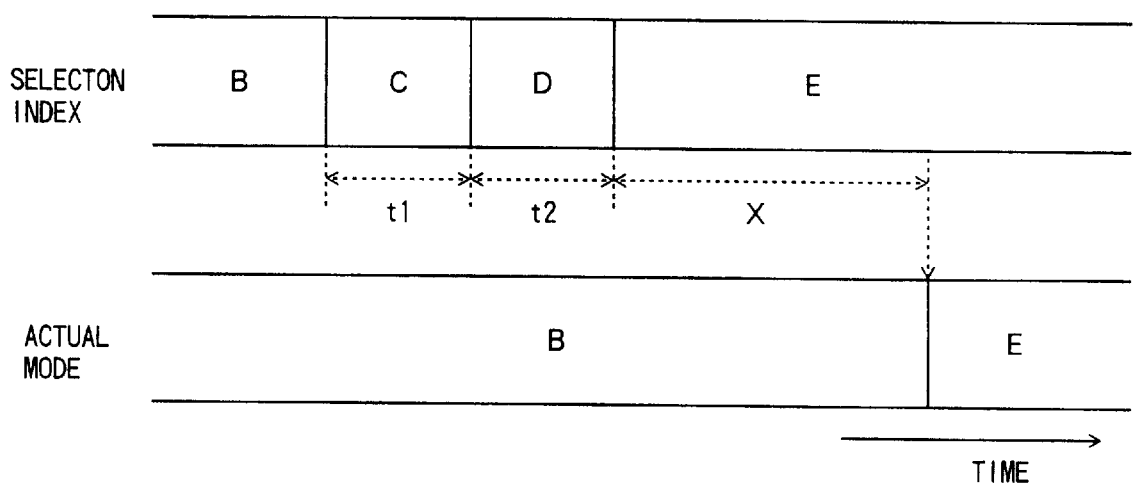
FIG. 39 is a time chart showing the relation between the switching operation and the actual transfer for the photographing mode.

FIG. 39 is a time chart when the dial portion 202 is rotated rapidly from B mode to E mode in FIG. 38.

The transversal axis in the same figure is time, the upper stage indicates a mode located at the selection index 201, and the lower stage indicates the transfer of mode being actually operated, whereby the temporal relation of them can be seen.

In the figure, X corresponds to a predetermined value X in the flowchart of FIG. 37, and indicates a delay time for which, since the photographing mode on the upper stage is switched by the operation unit 20, the photographing mode is actually transferred as shown on the lower stage.

And X has the following relation for the time t1, t2 required to switch the mode C, D in the same figure, $t1, t2 < X$ Hence, the mode transfer is not influenced by the photographing modes C, D passing intermediately in transferring from the photographing mode B to the photographing mode E, and can be smoothly made without causing any unnatural change in the image.

While in the above embodiment the actual transfer of operation mode is delayed from the switching operation of photographing mode, and thus stabilized so that any shock in switching may not appear in the image, in an embodiment as described below, when the photographing mode is switched during the recording, the actual transfer of photographing mode is controlled to be delayed from the switching operation of photographing mode so that any disorder in the image may not be recorded, and during the nonrecording, since it does not matter that the disorder in the image may appear in switching the photographing mode, the photographing mode is immediately switched with the mode switching operation, whereby the preparation for the next photographing and the confirmation of mode switching can be rapidly made.

Figure 40:
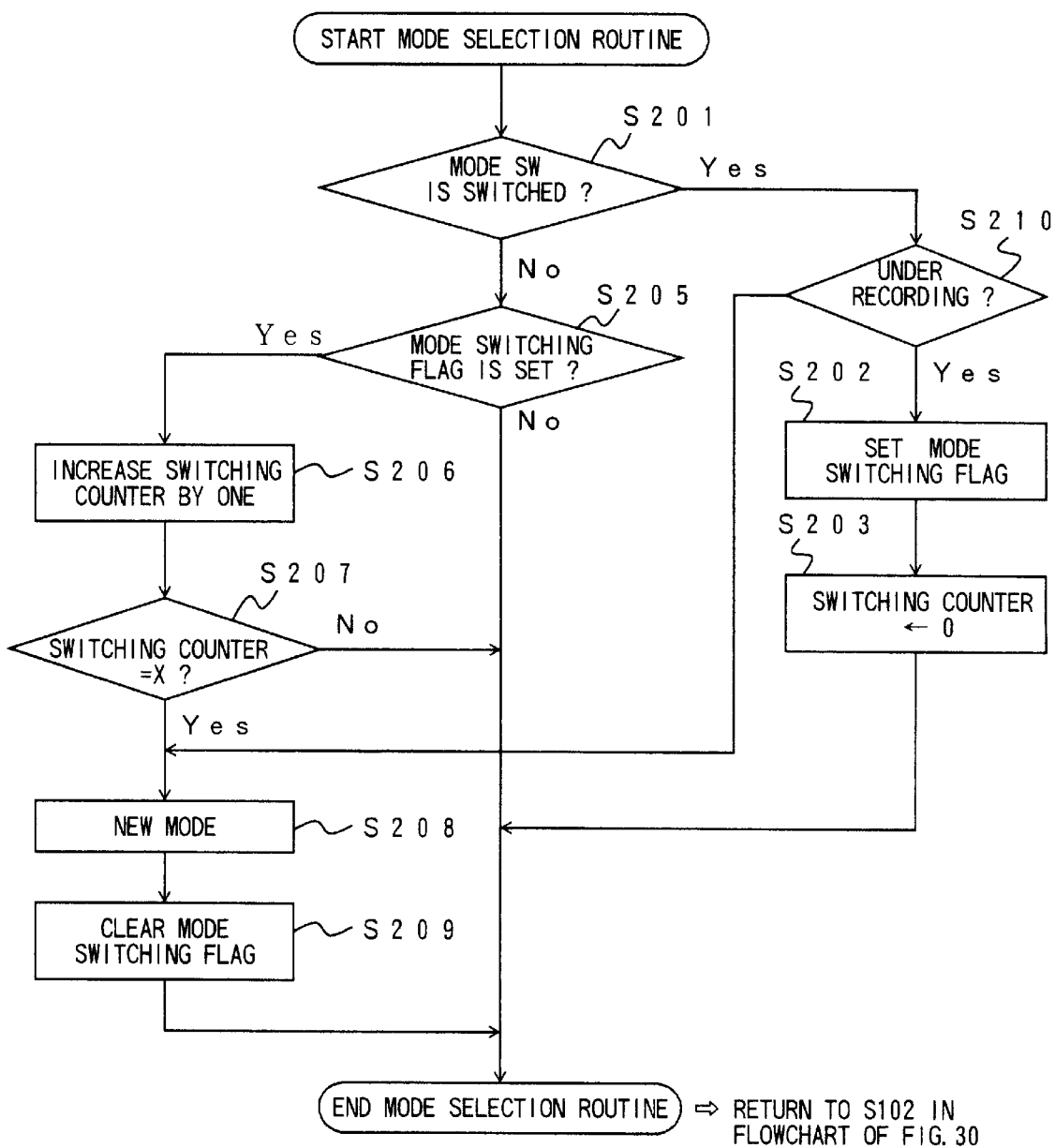
FIG. 40 is a flowchart for explaining the photographing mode transfer operation in accordance with an operation mode of VTR.

FIG. 40 is a flowchart for explaining such a control operation, which shows the photographing mode selection process at S101 in the flowchart of FIG. 30, like the flowchart of FIG. 37. In FIG. 40 and FIG. 37, the steps for performing the same processings are designated by the same numerals, and the explanation is omitted.

FIG. 40 is different from FIG. 37 in that when the current photographing mode at S201 and a photographing mode input by the key operation of the operation unit 20 are different, namely, when the mode switching operation is performed, the processing at S210 is performed before the process of setting the mode transfer flag at S203, whereby the recording is judged.

And if the recording is being performed, the operation proceeds to S202, where the same processing as in the flowchart of FIG. 37 is performed subsequently, and the actual transfer of photographing mode is delayed by a predetermined time X from the photographing mode switching operation as shown in FIG. 39, whereby the mode switching is performed so that transient disorder, noise or unnatural change may not appear, while if not recording, the operation proceeds to S207, where the photographing mode is immediately switched with the photographing mode switching operation by the operation unit 20.

Figure 41:
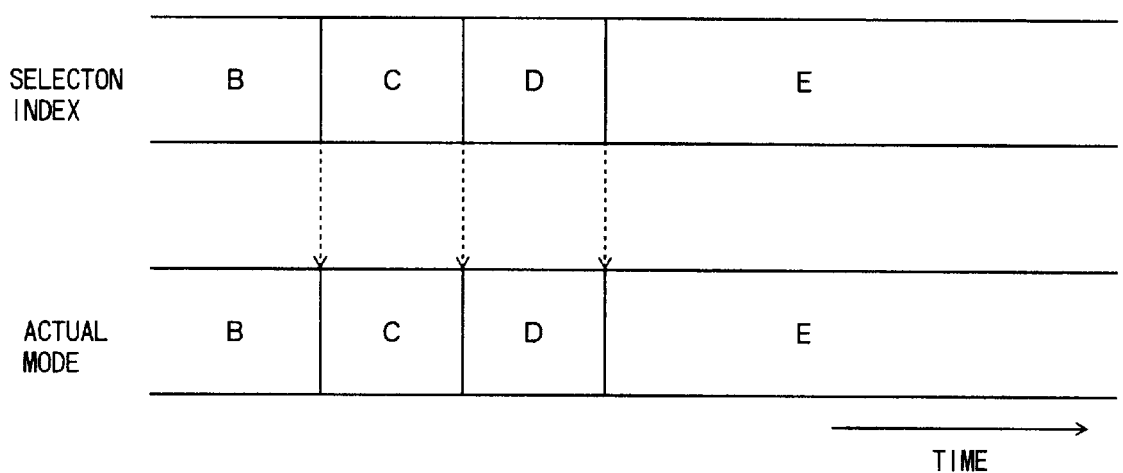
FIG. 41 is a time chart showing the relation between the switching operation and the actual transfer for the photographing mode in the embodiment of FIG. 40.

This behavior is shown in a time chart of FIG. 41. That is, if the recording is not being performed, any shock produced by the switching of photographing mode which may occur more or less in the image is not recorded, whereby when the switching of the photographing mode is made, the photographing mode is immediately switched without any delay of predetermined time X, and the preparation for the next photographing and the confirmation of mode switching can be rapidly made.

Other processings are the same as the processings as shown in the flowchart of FIG. 37.

In this way, with this embodiment, the photographing mode transfer speed is varied in accordance with the operation mode of VTR (video recorder), and when the photographing mode is switched during the recording, the actual transfer of photographing mode is delayed from the switching operation of photographing mode, whereby the actual mode transfer can be gently performed even if the mode switching operation is abruptly made, so that the stable photographing recording operation can be made without causing any disorder in the image in switching the mode, while during the non-recording, since it does not matter that the disorder in the image may appear in switching the photographing mode, the photographing mode is immediately switched with the mode switching operation, and the preparation for the next photographing and the confirmation for mode switching can be rapidly made.

As above described, an image pickup device of this invention comprises a plurality of photographing modes according to the photographing situations, wherein when the photographing mode is switched, it is not directly switched to the destination photographing mode, but delayed for a predetermined time before the actual transfer, whereby the actual transfer of photographing mode can be made smoothly and naturally even if the operation unit is abruptly changed, and without causing any disorder or unnatural change in the image owing to abrupt or great variation in the setting and characteristics of control parameters.

In particular, in switching the photographing mode, when a change-over switch interferes with a contact point with any other photographing mode if the switching operation is abruptly made in a short time, the switching to that other photographing mode will not be made every time of the contact to cause the control state to be unstable or produce unnatural variation in the image, whereby the switching of current photographing mode can be made quite smoothly.

According to another embodiment, the photographing mode switching speed is varied in accordance with the operation mode of VTR (video recorder), whereby the actual mode transfer can be gently performed during the recording even if the photographing mode switching operation is abruptly made, so that the stable photographing recording operation can be made without causing any disorder in the image in switching the mode, while during the non-recording, since the photographing mode is immediately switched with the photographing mode switching operation, the preparation for the next photographing and the confirmation for mode switching can be rapidly made, and the rapid mode setting and the mode confirmation are allowed until the recording is performed. Accordingly, it is possible to provide a video camera which is always stable, reliable, and excellent in the operativity.

What is claimed is:

1. An image pickup device having a plurality of photographing modes in each of which control characteristics are set in accordance with the photographing condition, comprising:
   a) mode selection means for selecting arbitrary photographing mode from said plurality of photographing modes, and;
   b) control means for transferring said photographing mode via a common mode to the photographing mode newly selected by said mode selection means when the photographing mode is selected by said mode selection means, wherein a control characteristic of said common mode is different from control characteristics of said plurality of photographing modes.

2. The image pickup device according to claim 1, wherein said plurality of photographing modes are exposure control modes.

3. The image pickup device according to claim 2, wherein said control characteristics are set by a plurality of control parametric signals, and said plurality of photographing modes involve different settings of control parametric signals, respectively.

4. The image pickup device according to claim 3, wherein said control parametric signals include three control signals of an iris control signal, a shutter speed control signal and a gain control signal, the characteristics of each being set in accordance with an input parametric signal.

5. The image pickup device according to claim 4, wherein said input parametric signal is a signal in accordance with the luminance level of an object.

6. The image pickup device according to claim 5, further comprising:
   c) image pickup means;
   d) an iris for controlling the quantity of incident light upon said image pickup means which is operated by said iris control signal;
   e) shutter means for controlling the exposure time of said image pickup means which is operated by said shutter speed control signal; and
   f) a gain control circuit for controlling the gain of an output signal from said image pickup means which is operated by said gain control signal.

7. The image pickup device according to claim 6, wherein said shutter means is an electronic shutter for controlling the accumulation time of said image pickup means.

8. The image pickup device according to claim 6, further comprising a memory storing respective control characteristics in said plurality of photographing modes, and in which said mode control means reads the control characteristics corresponding to a photographing mode selected by said mode selection means from said memory and controls said iris, said shutter means and said gain control circuit.

9. The image pickup device according to claim 1, wherein said common mode has the control characteristics intermediate to respective control characteristics of said plurality of photographing modes.

10. The image pickup device according to claim 9, wherein said common mode is a mode other than the photographing modes selectable by said mode selection means.

11. The image pickup device according to claim 1, wherein said image pickup device is a video camera.

12. An image pickup device having a plurality of photographing modes in each of which control characteristics are set in accordance with the photographing condition, comprising:
   a) mode selection means for selecting arbitrary photographing mode from said plurality of photographing modes; and
   b) control means for transferring said photographing mode via a common mode having control characteristics other than those of any of said photographing modes to the photographing mode selected by said mode selection means when the photographing mode is selected by said mode selection means.

13. The image pickup device according to claim 12, wherein said plurality of photographing modes are exposure control modes.

14. The image pickup device according to claim 13, wherein said control characteristics are set by a plurality of output control parametric signals with respect to an input parametric signal, and said plurality of photographing modes involve different settings of said control parametric signals with respect to said input parametric signal.

15. The image pickup device according to claim 14, wherein said input parametric signal is a signal in accordance with the luminance level of an object, and said control parametric signals include three control signals of an iris control signal, a shutter speed control signal and a gain control signal, the characteristics of each being set in accordance with said input parametric signal.

16. The image pickup device according to claim 15, further comprising:
   c) image pickup means;
   d) an iris for controlling the quantity of incident light upon said image pickup means which is operated by said iris control signal;
   e) shutter means for controlling the exposure time of said image pickup means which is operated by said shutter speed control signal; and
   f) a gain control circuit for controlling the gain of an output signal from said image pickup means which is operated by said gain control signal.

17. The image pickup device according to claim 16, further comprising a memory storing respective control characteristics in said plurality of photographing modes, and in which said mode control means reads the control characteristics corresponding to a photographing mode selected by said mode selection means from said memory and controls said iris, said shutter means and said gain control circuit.

18. The image pickup device according to claim 12, wherein said common mode has the control characteristics (Neutral) intermediate to control characteristics of said plurality of photographing modes.

19. The image pickup device according to claim 18, wherein said common mode is a mode other than the photographing modes selectable by said mode selection means.

20. An image pickup device having a plurality of photographing modes in each of which control characteristics are set in accordance with the photographing condition, comprising:
   a) mode selection means for selecting arbitrary photographing mode from said plurality of photographing modes; and
   c) mode control means for transferring the photographing mode in which when a second photographing mode is selected by said mode selecting means while a first photographing mode is selected, the first photographing mode is switched to the second photographing mode selected by said mode selection means via a common photographing mode having the control characteristics different from those of the first and second photographing modes.

21. The image pickup device according to claim 20, wherein said common mode is a mode having intermediate control characteristics which buffer the change in the control characteristics accompanied by the switching between said first and second photographing modes.

22. The image pickup device according to claim 21, wherein said control characteristics are set by a plurality of output control parametric signals with respect to an input parametric signal, and said plurality of photographing modes involve different settings of said control parametric signals with respect to said input parametric signal.

23. The image pickup device according to claim 22, wherein said plurality of photographing modes are concerned with the exposure control, said input parametric signal is a signal in accordance with the luminance level of an object, and said control parametric signals include three control signals of an iris control signal, a shutter speed control signal and a gain control signal, the characteristics of each being set in accordance with an input parametric signal.

24. The image pickup device according to claim 23, further comprising:
   c) image pickup means;
   d) an iris for controlling the quantity of incident light upon said image pickup means which is operated by said iris control signal;
   e) accumulation time control means for controlling the exposure time of said image pickup means which is operated by said shutter speed control signal;
   f) a gain control circuit for controlling the gain of an output signal from said image pickup means which is operated by said gain control signal; and
   g) a memory for storing the control characteristics in said plurality of photographing modes.

25. The image pickup device according to claim 24, wherein said mode control means reads the control characteristics corresponding to a photographing mode selected by said mode selection means from said memory and controls said iris, said shutter means and said gain control circuit.

26. A video camera device in which a plurality of control characteristics are settable in accordance with the photographing condition, comprising:
   a) characteristic selection means for selecting arbitrary control characteristic from said plurality of control characteristics; and
   b) characteristic control means for transferring the control characteristic in which, when a second control characteristic mode is selected by said characteristic selection means while a first control characteristic mode is selected, the control characteristic is transferred from said first control characteristic to said second control characteristic selected by said characteristic selection means via a common control characteristic different from the first and second control characteristic.

27. The video camera device according to claim 26, wherein said plurality of control characteristics are used for the exposure control.

28. The video camera device according to claim 26, wherein said control characteristics are set by a plurality of control parametric signals, and said plurality of photographing modes involve different settings of said control parametric signals.

29. The video camera device according to claim 28, wherein said control parametric signals include three control signals of an iris control signal, a shutter speed control signal and a gain control signal, the characteristics of each being set in accordance with an input parametric signal concerning the luminance level of an object.

30. The video camera device according to claim 29, further comprising:
   c) image pickup means;
   d) an iris for controlling the quantity of incident light upon said image pickup means which is operated by said iris control signal;
   e) shutter means for controlling the exposure time of said image pickup means which is operated by said shutter speed control signal; and
   f) a gain control circuit for controlling the gain of an output signal from said image pickup means which is operated by said gain control signal.

31. The video camera device according to claim 30, further comprising a memory storing said plurality of control characteristics, and in which said mode control means reads the control characteristics corresponding to a photographing mode selected by said mode selection means from said memory and controls said iris, said shutter means and said gain control circuit.

32. The video camera device according to claim 26, wherein said common control characteristic has the control characteristic intermediate to said first and second control characteristics.

33. A video camera having a plurality of photographing modes each having different control characteristics in accordance with the photographing condition, comprising:
   a) mode selection means for selecting arbitrary photographing mode from said plurality of photographing modes; and
   b) mode control means for delaying an execution of change of said control characteristic of said photographing mode to that of a newly selected photographing mode until a predetermined time is passed when the photographing mode is switched by said mode selection means.

34. The video camera according to claim 33, wherein said control characteristics are set by a plurality of output control parametric signals with respect to an input parametric signals, and said plurality of photographing modes involve different settings of said control parametric signals with respect to said input parametric signal.

35. The video camera according to claim 34, wherein said input parametric signal is a signal in accordance with the luminance level of an object, and said control parametric signals include three control signals of an iris control signal, a shutter speed control signal and a gain control signal, the characteristics of each being set in accordance with said input parametric signal.

36. The video camera according to claim 33, further comprising:
   c) image pickup means;
   d) an iris for controlling the quantity of incident light upon said image pickup means which is operated by said iris control signal;
   e) shutter means for controlling the exposure time of said image pickup means which is operated by said shutter speed control signal;
   f) a gain control circuit for controlling the gain of an output signal from said image pickup means which is operated by said gain control signal; and
   g) a memory storing respective control characteristics in said plurality of photographing modes, wherein said mode control means reads the control characteristics corresponding to a photographing mode selected by said mode selection means from said memory and controls said iris, said shutter means and said gain control circuit.

37. A video camera apparatus having a plurality of photographing modes each having different control characteristics in accordance with the photographing condition, comprising:
   a) mode selection means for selecting arbitrary photographing mode from said plurality of photographing modes; and
   b) mode control means for setting the delay time for delaying an execution of change of said control characteristic of said photographing mode to that of newly selected photographing mode, said mode control means varying the delay time which is set, in accordance with an operation state of said video camera apparatus when the photographing mode is switched by said mode selection means.

38. The video camera apparatus according to claim 37, wherein said control characteristics are set by a plurality of output control parametric signals with respect to an input parametric signal, said input parametric signal is a signal corresponding to the luminance level of an object, and said control parametric signals include three control signals of an iris control signal, a shutter speed control signal and a gain control signal, wherein said plurality of photographing modes involve different settings of said control parametric signals with respect to said input parametric signal.

39. The video camera apparatus according to claim 38, further comprising:
   c) image pickup means;
   d) an iris for controlling the quantity of incident light upon said image pickup means which is operated by said iris control signal;
   e) shutter means for controlling the exposure time of said image pickup means which is operated by said shutter speed control signal;
   f) a gain control circuit for controlling the gain of an output signal from said image pickup means which is operated by said gain control signal; and
   g) a memory storing respective control characteristics in said plurality of photographing modes, wherein said mode control means reads the control characteristics corresponding to a photographing mode selected by said mode selection means from said memory and controls said iris, said shutter means and said gain control circuit.

40. The video camera apparatus according to claim 37, wherein said mode control means alters the delay time required to change the photographing mode in accordance with the operation mode of the video camera apparatus, wherein the change of photographing mode is gently performed during the recording while it is rapidly performed during the non-recording.

41. A control device for controlling a plurality of photographing modes of a camera in each of which control characteristics are set in accordance with the photographing condition, comprising:
   a) mode selection means for selecting arbitrary photographing mode from said plurality of photographing modes; and
   b) mode control means for transferring the photographing mode in which when a second photographing mode is selected by said mode selection means while a first photographing mode is selected, the first photographing mode is switched to the second photographing mode selected by said mode selection means via a common photographing mode having the control characteristics different from those of the first and second photographing modes.

42. The control device according to claim 41, wherein said third mode is a mode having intermediate control characteristics which buffer the change in the control characteristics accompanied by the switching between said first and second photographing modes.

43. The control device according to claim 42, wherein said control characteristics are set by a plurality of output control parametric signals with respect to an input parametric signal, and said plurality of photographing modes involve different settings of said control parametric signals with respect to said input parametric signal.

44. The control device according to claim 43, wherein said plurality of photographing modes are concerned with the exposure control, said input parametric signal is a signal in accordance with the luminance level of an object, and said control parametric signals include three control signals of an iris control signal, a shutter speed control signal and a gain control signal, the characteristics of each being set in accordance with an input parametric signal.

45. The control device according to claim 44, further comprising:
   a) image pickup means;
   b) an iris for controlling the quantity of incident light upon said image pickup means which is operated by said iris control signal;
   c) accumulation time control means for controlling the exposure time of said image pickup means which is operated by said shutter speed control signal;
   d) a gain control circuit for controlling the gain of an output signal from said image pickup means which is operated by said gain control signal; and
   e) a memory for storing the control characteristics in said plurality of photographing modes.

46. A control device for controlling a plurality of photographing modes of a camera, each having different control characteristics in accordance with the photographing condition, comprising:
  a) mode selection means for selecting arbitrary photographing mode from said plurality of photographing modes; and
  b) mode control means for delaying change of said photographing mode to a newly selected photographing mode for passage of a predetermined time when the photographing mode is switched by said mode selection means.

47. The control device according to claim 46, wherein said control characteristics are set by a plurality of output control parametric signals with respect to an input parametric signals, and said plurality of photographing modes involve different settings of said control parametric signals with respect to said input parametric signal.

48. The control device according to claim 47, wherein said input parametric signal is a signal in accordance with the luminance level of an object, and said control parametric signals include three control signals of an iris control signal, a shutter speed control signal and a gain control signal, the characteristics of each being set in accordance with each input parametric signal.

49. The control device according to claim 46, further comprising:
  a) image pickup means;
  b) an iris for controlling the quantity of incident light upon said image pickup means which is operated by said iris control signal;
  c) shutter means for controlling the exposure time of said image pickup means which is operated by said shutter speed control signal;
  d) a gain control circuit for controlling the gain of an output signal from said image pickup means which is operated by said gain control signal; and
  e) a memory storing respective control characteristics in said plurality of photographing modes, wherein said mode control means reads the control characteristics corresponding to a photographing mode selected by said mode selection means from said memory and controls said iris, said shutter means and said gain control circuit.

50. A camera control method for controlling a video camera having a plurality of photographing modes each having different control characteristics in accordance with the photographing condition, comprising:
  a) selecting arbitrary photographing mode from said plurality of photographing modes; and
  b) delaying an execution of change of said control characteristic of said photographing mode to that of a newly selected photographing mode until a predetermined time is passed when the photographing mode is switched as a result of the selecting step.

51. The camera control method according to claim 50, wherein said control characteristics are set by a plurality of output control parametric signals with respect to an input parametric signals, and said plurality of photographing modes involve different settings of said control parametric signals with respect to said input parametric signal.

52. The camera control method according to claim 51, wherein said input parametric signal is a signal in accordance with the luminance level of an object, and said control parametric signals include three control signals of an iris control signal, a shutter speed control signal and a gain control signal, the characteristics of each being set in accordance with said input parametric signal.

53. The camera control method according to claim 52, further comprising:
  c) controlling the quantity of incident light upon an image pickup means using said iris control signal;
  d) controlling the exposure time of said image pickup means using said shutter speed control signal;
  e) controlling the gain of an output signal from said image pickup means using said gain control signal; and
  f) storing respective control characteristics in said plurality of photographing modes, wherein said delaying step includes reading the control characteristics corresponding to a photographing mode selected in said mode selection step from said memory and controlling said iris, said shutter and said gain control signals using the read control characteristics.

54. A camera control method for controlling a plurality of photographing modes of a camera in each of which control characteristics are set in accordance with the photographing condition, comprising:
  a) selecting arbitrary photographing mode from said plurality of photographing modes; and
  b) transferring the photographing mode in which when a second photographing mode is selected in said mode selecting step while a first photographing mode is selected, the first photographing mode is switched to the second photographing mode selected in said mode selection step via a common photographing mode having the control characteristics different from those of the first and second photographing modes.

55. The camera control method according to claim 54, wherein said third mode is a mode having intermediate control characteristics which buffer the change in the control characteristics accompanied by the switching between said first and second photographing modes.

56. The camera control method according to claim 55, wherein said control characteristics are set by a plurality of output control parametric signals with respect to an input parametric signal, and said plurality of photographing modes involve different settings of said control parametric signals with respect to said input parametric signal.

57. The camera control method according to claim 56, wherein said plurality of photographing modes are concerned with the exposure control, said input parametric signal is a signal in accordance with the luminance level of an object, and said control parametric signals include three control signals of an iris control signal, a shutter speed control signal and a gain control signal, the characteristics of each being set in accordance with an input parametric signal.

58. The camera control method according to claim 57, further comprising:
  b) controlling the quantity of incident light upon an image pickup means using said iris control signal;
  c) controlling the exposure time of said image pickup means using said shutter speed control signal;
  d) controlling the gain of an output signal from said image pickup means using said gain control signal; and
  e) storing the control characteristics in said plurality of photographing modes.

59. A camera control device for controlling a plurality of photographing modes of a camera, each having different control characteristics in accordance with the photographing condition, comprising:
  a) mode selection means for selecting arbitrary photographing mode from said plurality of photographing modes, b) mode control means for delaying change of said photographing mode to a newly selected photographing mode for passage of a predetermined time when the photographing mode is switched by said mode selection means; and c) control means for varying the predetermined time according to the newly selected photographing mode.

60. The control device according to claim 59, wherein said control characteristics are set by a plurality of output control parametric signals with respect to an input parametric signal, and said plurality of photographing modes involve different settings of said control parametric signals with respect to said input parametric signal.

61. The control device according to claim 60, wherein said input parametric signal is a signal in accordance with the luminance level of an object, and said control parametric signals include three control signals of an iris control signal, a shutter speed control signal and a gain control signal, the characteristic of each being set in accordance with each input parametric signal.

62. A camera control device for controlling a plurality of photographing modes each having different control characteristics in accordance with the photographing condition, comprising:

a) mode instruction means for instructing a selection of arbitrary photographing mode from said plurality of photographing modes; and b) mode control means for inhibiting an execution of change to the photographing mode instructed by said mode instruction means during the selection operation of said mode instruction means and for a predetermined time after the selection operation is completed.

63. The camera control device according to claim 62, wherein said control characteristics are set by a plurality of output control parametric signals with respect to an input parametric signal, and said plurality of photographing modes involve different settings of said control parametric signals with respect to said input parametric signal.

64. The camera control device according to claim 63, wherein said input parametric signal is a signal in accordance with the luminance level of an object, and said control parametric signals include three control signals of an iris control signal, a shutter speed control signal and a gain control signal, the characteristics of each being set in accordance with said input parametric signal.

65. The camera control device according to claim 64, further comprising:

c) image pickup means;

d) an iris for controlling the quantity of incident light upon said image pickup means which is operated by said iris control signal;

e) shutter means for controlling the exposure time of said image pickup means which is operated by said shutter speed control signal;

f) a gain control circuit for controlling the gain of an output signal from said image pickup means which is operated by said gain control signal; and g) a memory storing respective control characteristic in said plurality of photographing modes, wherein each said mode control means reads the control characteristics corresponding to a photographing mode selected by said mode instruction means from said memory and controls said iris, said shutter means and said gain control circuit.

66. The camera control device according to claim 62, wherein said mode instruction means includes a mode dial having a plurality of stop positions corresponding to the plurality of the photographing modes, and said mode control means inhibits the execution of the photographing modes during said mode dial is being operated.

* * * * *

UNITED STATES PATENT AND TRADEMARK OFFICE
CERTIFICATE OF CORRECTION

PATENT NO. : 5,883,666

DATED : March 16, 1999

INVENTOR(S) : Kenji Kyuma et al.

It is certified that error appears in the above-identified patent and that said Letters Patent is hereby corrected as shown below:

Col. 8, line 43, delete "m" and insert -- $\mu$ --.
Col. 8, line 46, delete "FIG. B" and insert -- FIG. 3 --.
Col. 13, line 4, after "can", delete "-".
Col. 20, line 4, after "for", delete "the".
Col. 23, line 65, after "1/1000", delete "/".
Col. 24, line 44, delete ",0dB" and insert -- $\pm$0dB --.
Col. 30, line 20, delete "FIG. 17" and insert -- FIG. 24 --.
Col. 36, line 9, delete ",0dB" and insert -- $\pm$0dB --.
Col. 36, line 22, delete "SIN" and insert -- S/N --.
Col. 46, line 31, before "control", insert -- mode --.
Col. 47, line 22, delete "c)" and insert -- b) -- .

Signed and Sealed this

Twenty-first Day of March, 2000

Attest:

Attesting Officer

Q. TODD DICKINSON

Commissioner of Patents and Trademarks